(12) United States Patent
Dequine et al.

(10) Patent No.: US 10,308,290 B1
(45) Date of Patent: Jun. 4, 2019

(54) VEHICLE FLOOR AND SUBASSEMBLIES THEREOF

(71) Applicants: Dustin L. Dequine, Sunnyvale, CA (US); Matthew I. Woods, Livermore, CA (US); Kevin P. Makowski, Simi Valley, CA (US); Toni Ristoski, Sunnyvale, CA (US)

(72) Inventors: Dustin L. Dequine, Sunnyvale, CA (US); Matthew I. Woods, Livermore, CA (US); Kevin P. Makowski, Simi Valley, CA (US); Toni Ristoski, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/709,872

(22) Filed: Sep. 20, 2017

Related U.S. Application Data

(60) Provisional application No. 62/397,005, filed on Sep. 20, 2016, provisional application No. 62/397,056, filed on Sep. 20, 2016.

(51) Int. Cl.
*B60J 7/00* (2006.01)
*B62D 25/20* (2006.01)
*B60K 1/04* (2019.01)
*B62D 29/00* (2006.01)

(52) U.S. Cl.
CPC ............ *B62D 25/20* (2013.01); *B60K 1/04* (2013.01); *B62D 29/005* (2013.01); *B60K 2001/0438* (2013.01)

(58) Field of Classification Search
CPC .... B29D 99/0057; B60N 3/044; B60N 3/048; B60R 21/02; G06F 17/5086; A47F 5/137; A47F 7/163; A47F 7/16; A01K 1/0135; A01K 1/015
USPC ............................ 296/193.07, 184.1, 97.23
See application file for complete search history.

(56) References Cited

U.S. PATENT DOCUMENTS

| | | | |
|---|---|---|---|
| 5,042,395 A | 8/1991 | Wackerle et al. | |
| 5,501,289 A * | 3/1996 | Nishikawa | B60K 1/04 180/68.5 |
| 5,555,950 A * | 9/1996 | Harada | B60K 1/04 180/232 |
| 5,833,023 A * | 11/1998 | Shimizu | B62D 21/00 180/68.5 |
| 6,085,854 A * | 7/2000 | Nishikawa | B60K 1/04 180/68.5 |
| 6,188,574 B1 * | 2/2001 | Anazawa | B60K 1/04 180/68.5 |
| 6,843,525 B2 | 1/2005 | Preisler | |
| 7,784,856 B2 | 8/2010 | Fuchs et al. | |
| 8,733,487 B2 * | 5/2014 | Usami | B60K 1/04 180/68.5 |
| 8,939,246 B2 | 1/2015 | Yamaguchi et al. | |
| 9,517,687 B2 * | 12/2016 | Nakajima | B60K 1/04 |
| 9,533,600 B1 * | 1/2017 | Schwab | B60L 11/1879 |
| 9,738,324 B1 | 8/2017 | Vigil et al. | |

(Continued)

*Primary Examiner* — Kiran B Patel
(74) *Attorney, Agent, or Firm* — Young Basile Hanlon & MacFarlane, P.C.

(57) ABSTRACT

A floor assembly for a passenger vehicle includes a lower floor assembly and an upper floor subassembly coupled to and positioned above the lower floor assembly. The lower floor assembly includes one or more compartments for containing one or more batteries. The upper floor subassembly is a sandwich structure composite.

18 Claims, 32 Drawing Sheets

(56) References Cited

U.S. PATENT DOCUMENTS

| | | | |
|---|---|---|---|
| 9,758,028 B2* | 9/2017 | Ikeda | B60K 1/04 |
| 9,809,101 B2* | 11/2017 | Ikeda | B62D 29/001 |
| 9,849,768 B2* | 12/2017 | Hayashi | B60R 16/04 |
| 9,884,544 B2* | 2/2018 | Berger | B60K 1/04 |
| 9,937,781 B1* | 4/2018 | Bryer | B60K 1/04 |
| 9,987,913 B2* | 6/2018 | Hara | B60K 1/04 |
| 10,086,880 B2* | 10/2018 | Son | B60K 1/04 |
| 10,099,546 B2* | 10/2018 | Hara | B60K 1/04 |
| 10,112,470 B2* | 10/2018 | Hamilton | B60K 1/04 |
| 2003/0067209 A1* | 4/2003 | Marrero | F41H 7/005 |
| | | | 301/5.23 |
| 2004/0016580 A1* | 1/2004 | Kronner | B60R 16/04 |
| | | | 180/68.5 |
| 2004/0226765 A1* | 11/2004 | Mathews | B60K 1/04 |
| | | | 180/68.5 |
| 2005/0264042 A1 | 12/2005 | Abe et al. | |
| 2005/0274556 A1* | 12/2005 | Chaney | B60K 1/04 |
| | | | 180/68.5 |
| 2006/0289224 A1* | 12/2006 | Ono | B60K 1/04 |
| | | | 180/311 |
| 2008/0173489 A1* | 7/2008 | Takasaki | B60K 1/04 |
| | | | 180/68.5 |
| 2008/0190679 A1* | 8/2008 | Sato | B60K 1/04 |
| | | | 180/68.5 |
| 2009/0179461 A1 | 7/2009 | Fuchs et al. | |
| 2010/0307848 A1* | 12/2010 | Hashimoto | B60K 1/04 |
| | | | 180/68.5 |
| 2013/0022851 A1 | 1/2013 | De Oliveira | |
| 2013/0118824 A1* | 5/2013 | Maeda | B62D 21/157 |
| | | | 180/68.5 |
| 2013/0133961 A1* | 5/2013 | Matsuda | B60K 6/40 |
| | | | 180/65.22 |
| 2014/0017538 A1* | 1/2014 | Nakamori | H01M 2/1077 |
| | | | 429/99 |
| 2014/0021744 A1* | 1/2014 | Imamura | B62D 21/157 |
| | | | 296/187.08 |
| 2014/0182958 A1* | 7/2014 | Rawlinson | B60K 1/04 |
| | | | 180/68.5 |
| 2015/0145288 A1 | 5/2015 | Kellner | |
| 2016/0114667 A1* | 4/2016 | Ikeda | B60K 1/04 |
| | | | 180/68.5 |
| 2016/0114699 A1 | 4/2016 | Hokazono et al. | |
| 2016/0229456 A1 | 8/2016 | Boettcher et al. | |
| 2016/0236713 A1* | 8/2016 | Sakaguchi | B60K 1/04 |
| 2016/0301120 A1* | 10/2016 | Katsuno | H01M 10/663 |
| 2016/0311301 A1 | 10/2016 | Ikeda et al. | |
| 2016/0375750 A1* | 12/2016 | Hokazono | B60K 1/04 |
| | | | 180/68.5 |
| 2017/0015361 A1 | 1/2017 | Koch et al. | |
| 2017/0025655 A1* | 1/2017 | Klimek | H01M 2/1077 |
| 2017/0029034 A1* | 2/2017 | Faruque | B60K 1/04 |
| 2017/0144706 A1 | 5/2017 | Bach | |
| 2017/0217297 A1* | 8/2017 | Li | B60K 1/04 |
| 2017/0225587 A1* | 8/2017 | Newman | B60L 11/1879 |
| 2017/0305249 A1 | 10/2017 | Hara | |
| 2017/0305250 A1 | 10/2017 | Hara | |
| 2017/0305251 A1 | 10/2017 | Hara et al. | |
| 2018/0126933 A1* | 5/2018 | Kawase | B60K 1/04 |
| 2018/0134318 A1 | 5/2018 | Hata | |
| 2018/0134320 A1 | 5/2018 | Jeong | |
| 2018/0148106 A1 | 5/2018 | Ayukawa | |
| 2018/0222530 A1 | 8/2018 | Hofer | |
| 2018/0272852 A1* | 9/2018 | Ajisaka | B60K 1/04 |
| 2018/0312199 A1 | 11/2018 | Kawase | |
| 2018/0312200 A1 | 11/2018 | Kawase et al. | |
| 2018/0334192 A1 | 11/2018 | Terada et al. | |
| 2018/0337377 A1* | 11/2018 | Stephens | H01M 2/1083 |
| 2018/0370573 A1 | 12/2018 | Yang et al. | |
| 2019/0009661 A1* | 1/2019 | Okamura | B60K 1/04 |
| 2019/0023323 A1 | 1/2019 | Uehata | |

* cited by examiner

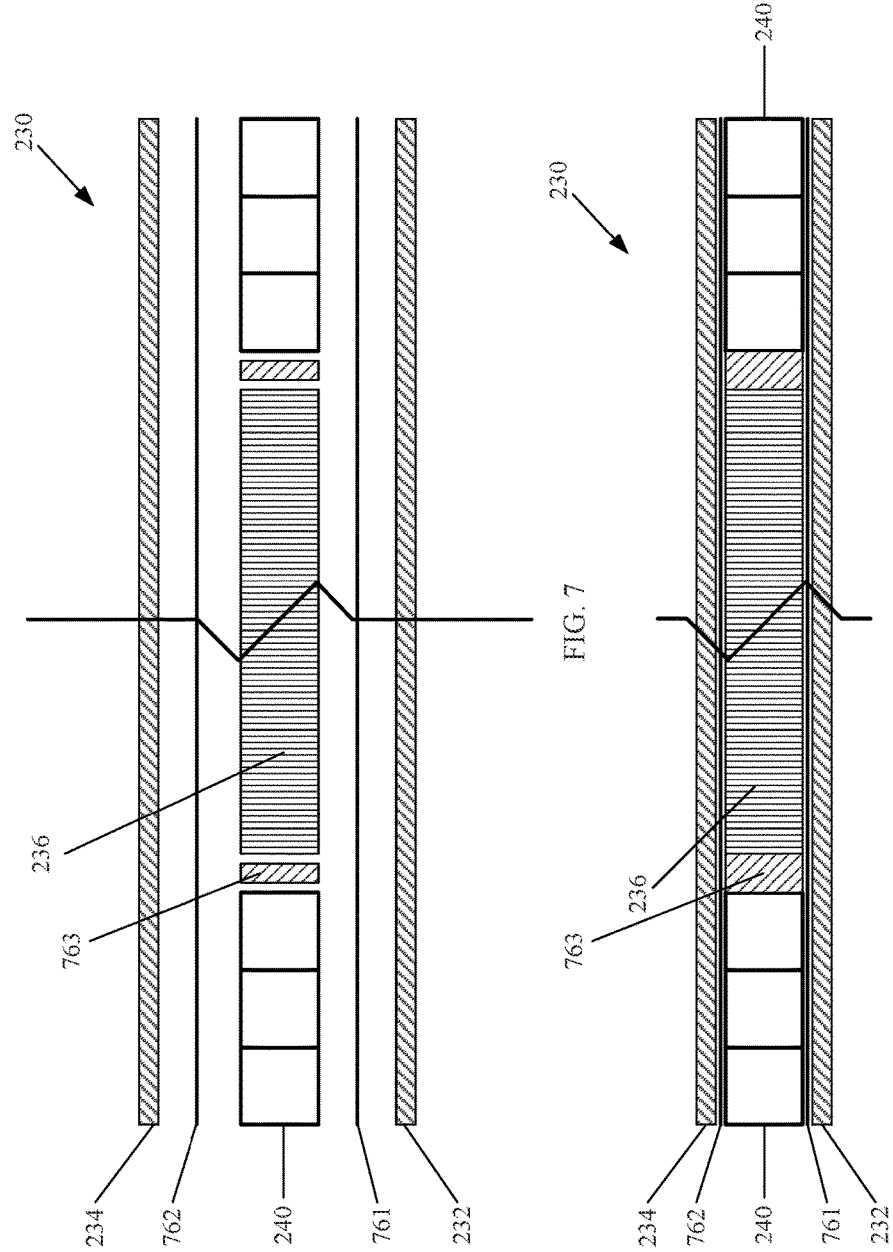

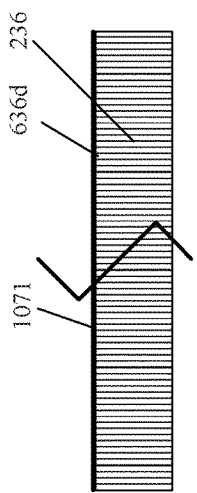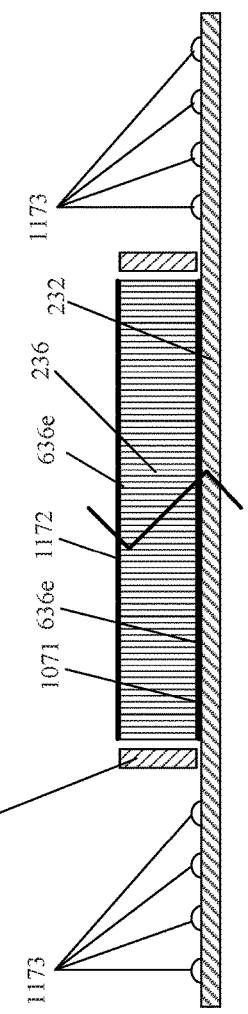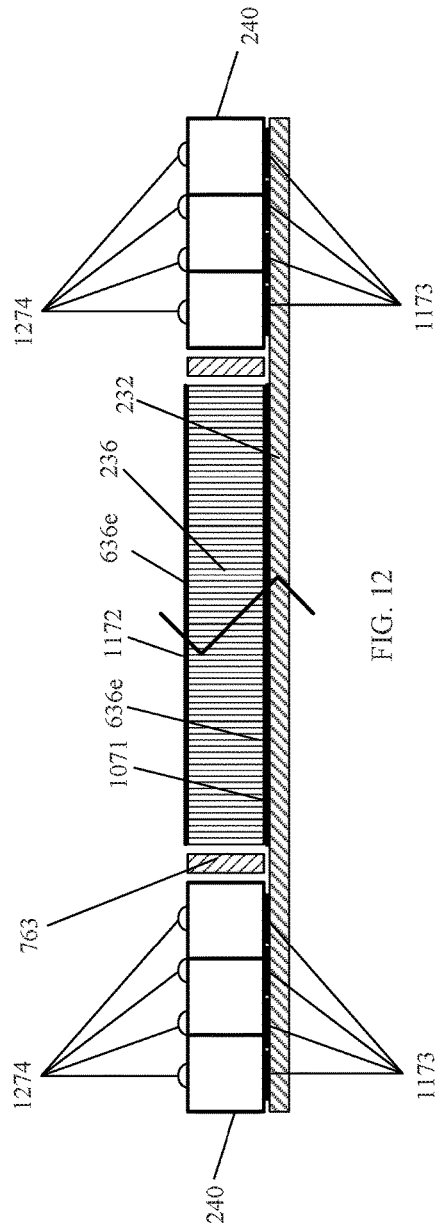

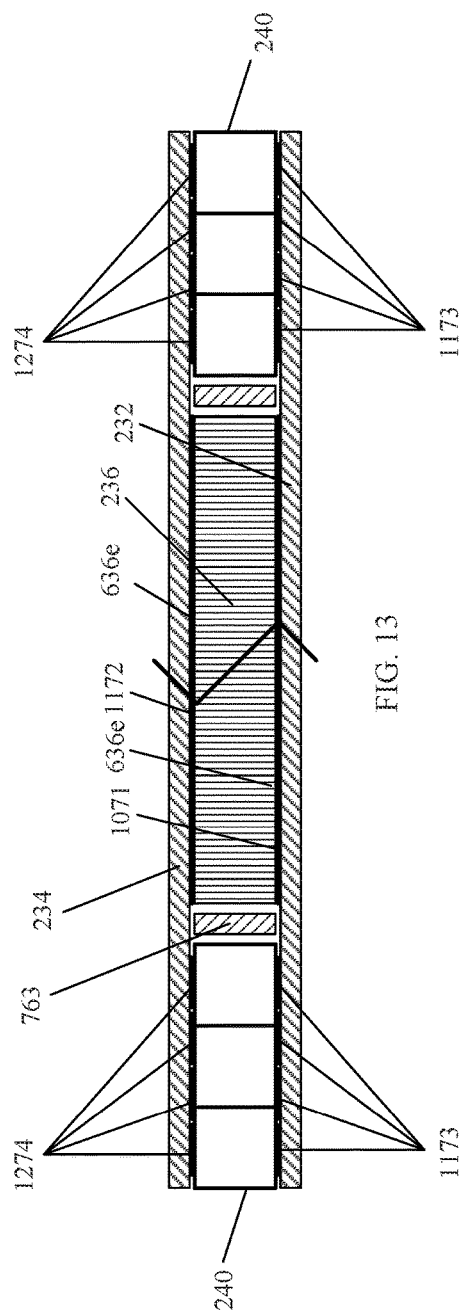
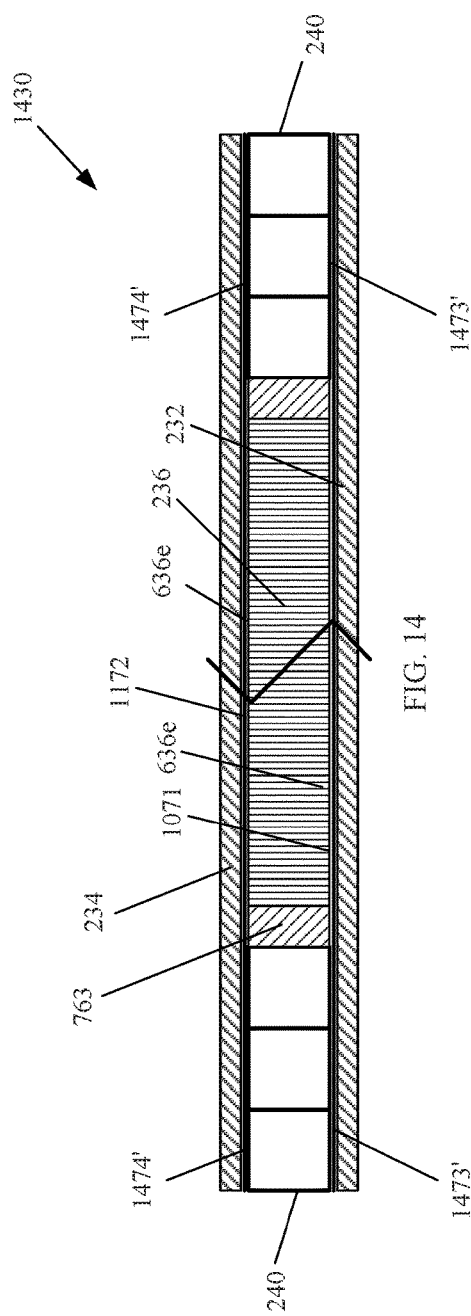
FIG. 13
FIG. 14

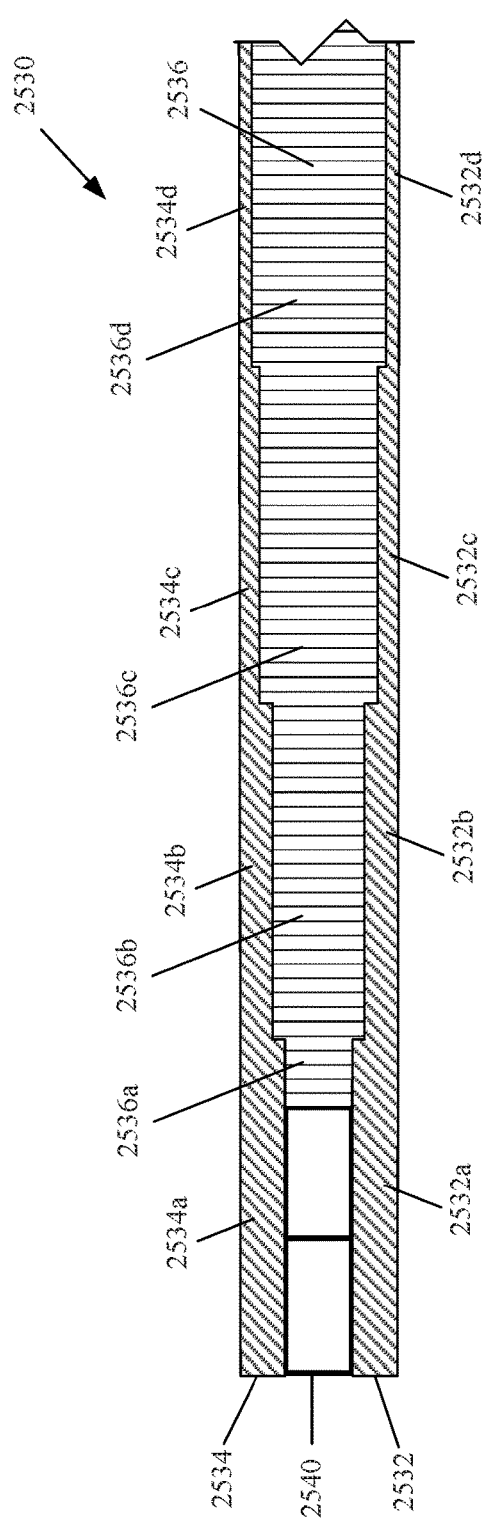
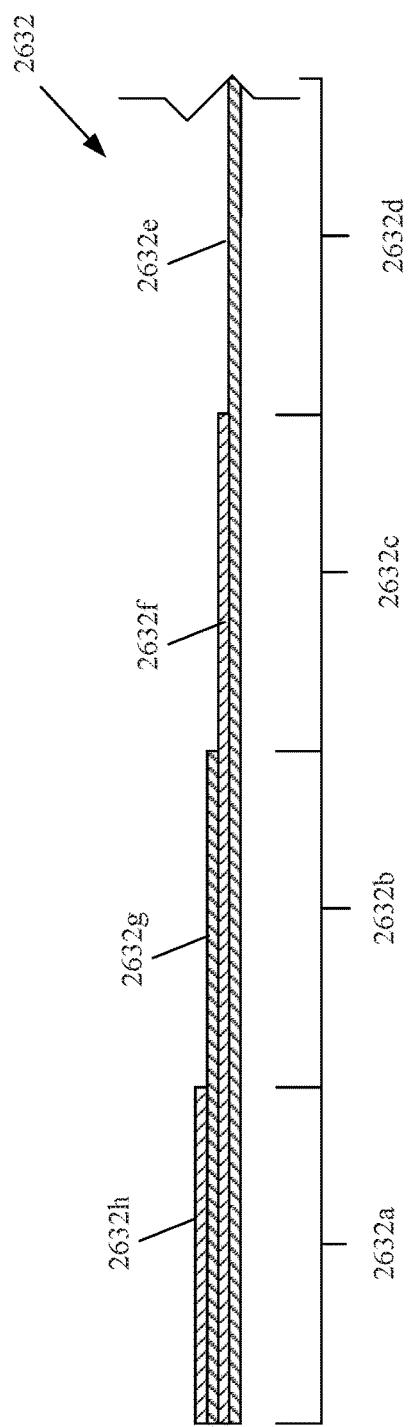
FIG. 25
FIG. 26

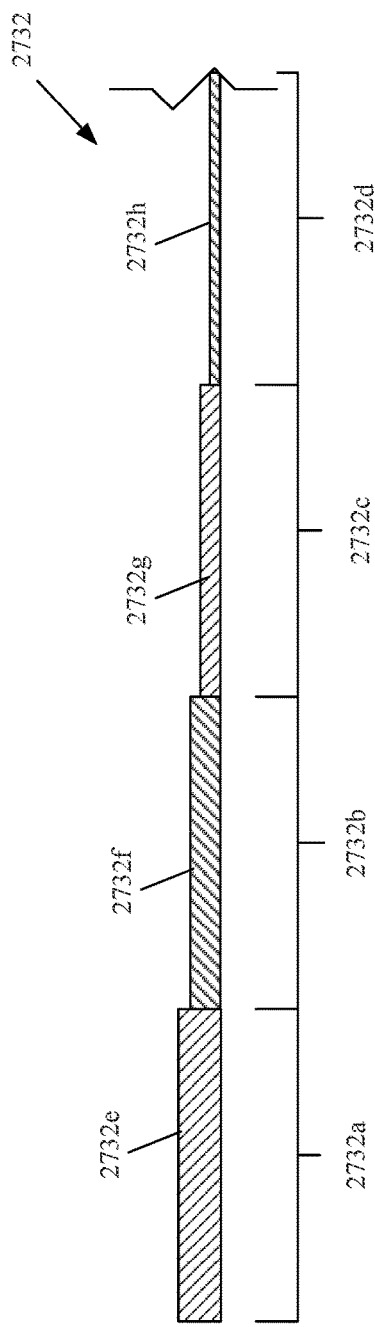
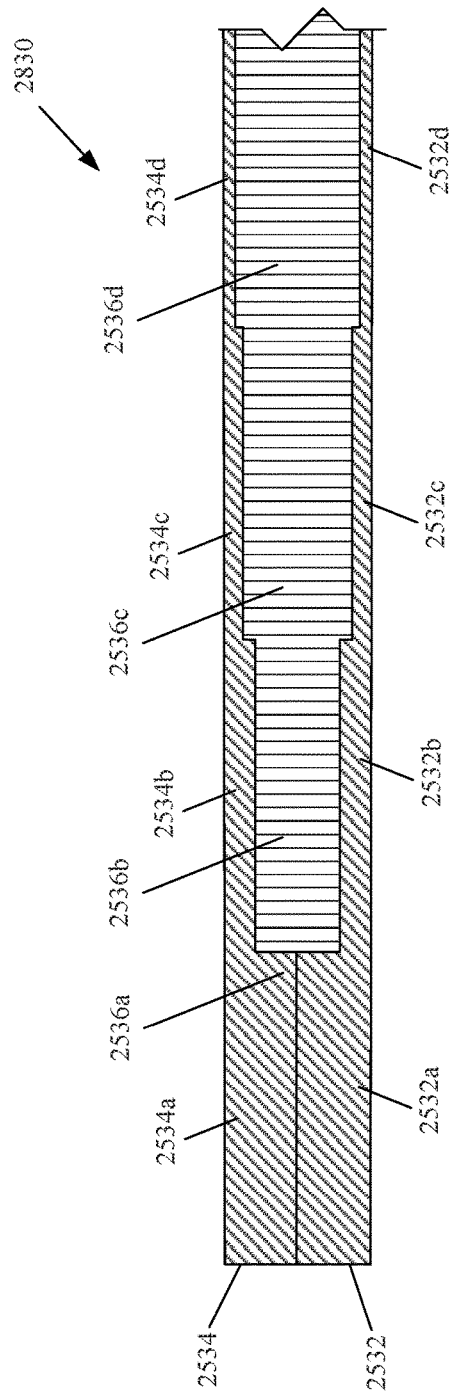
FIG. 27
FIG. 28

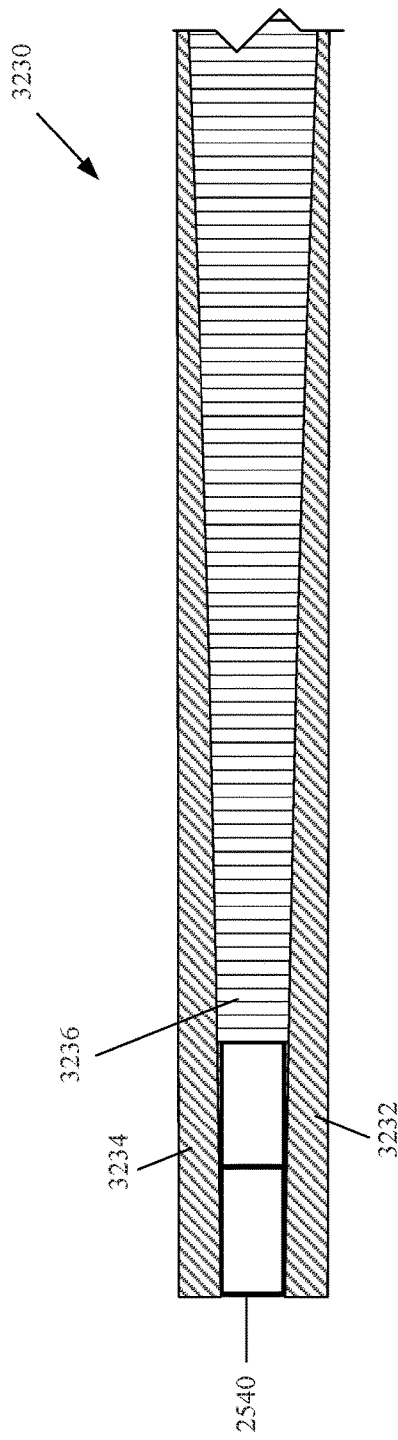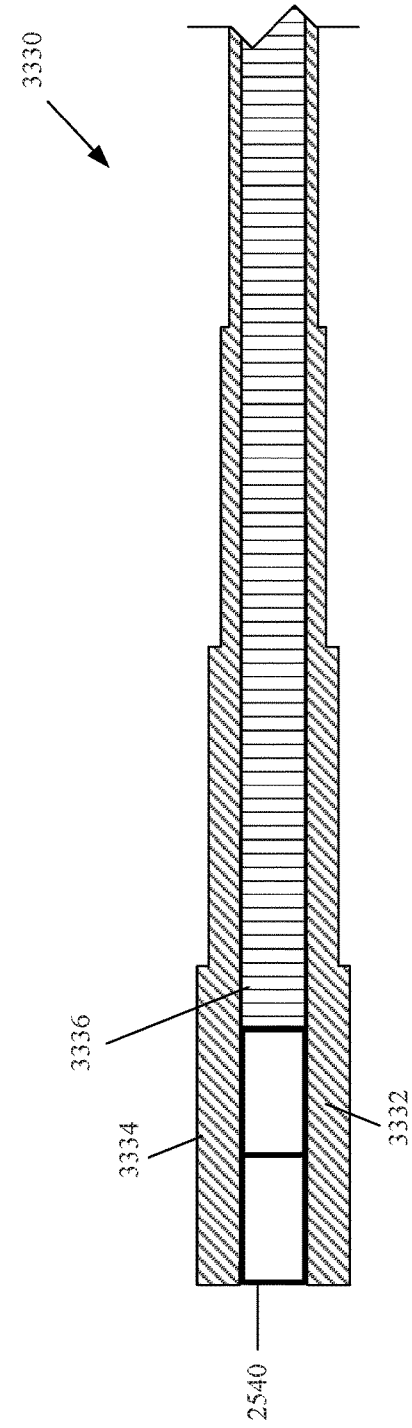
FIG. 32
FIG. 33

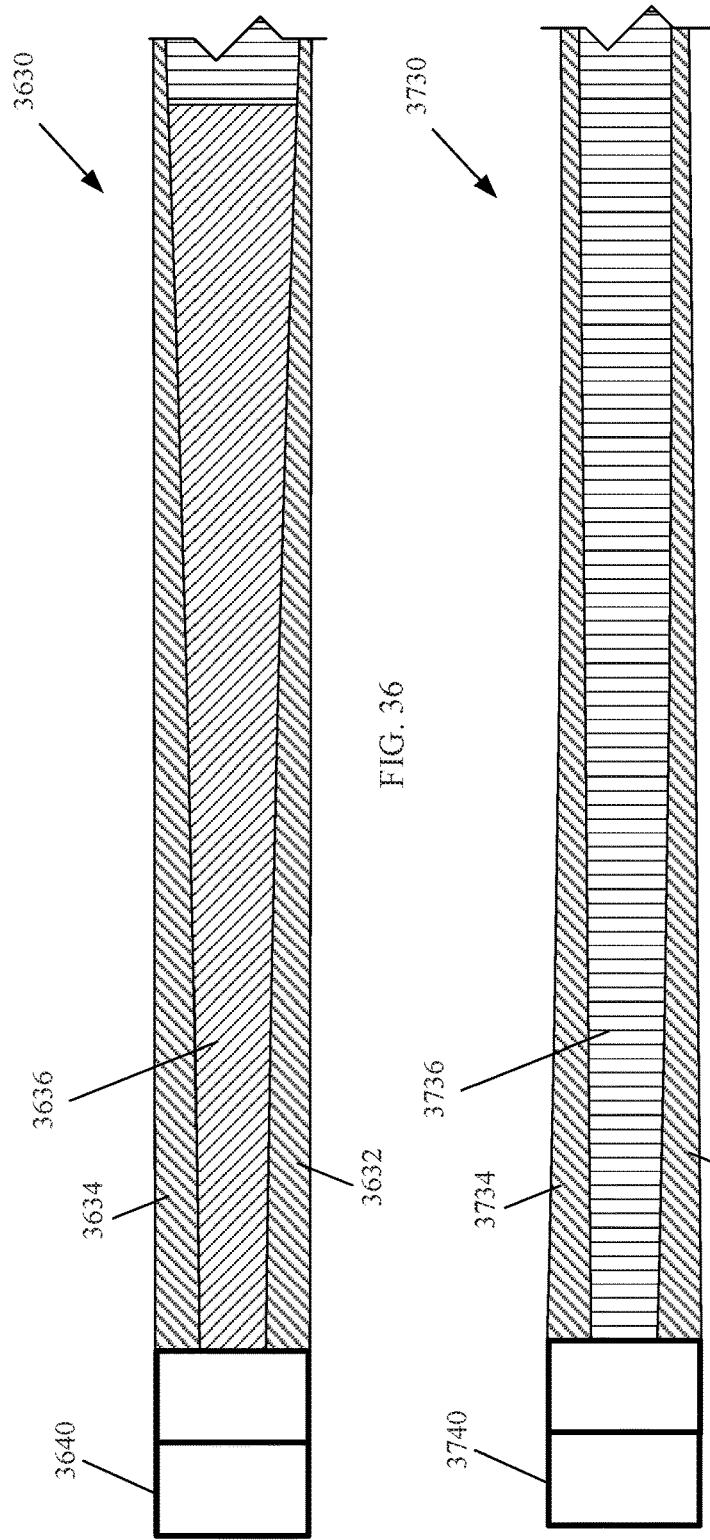

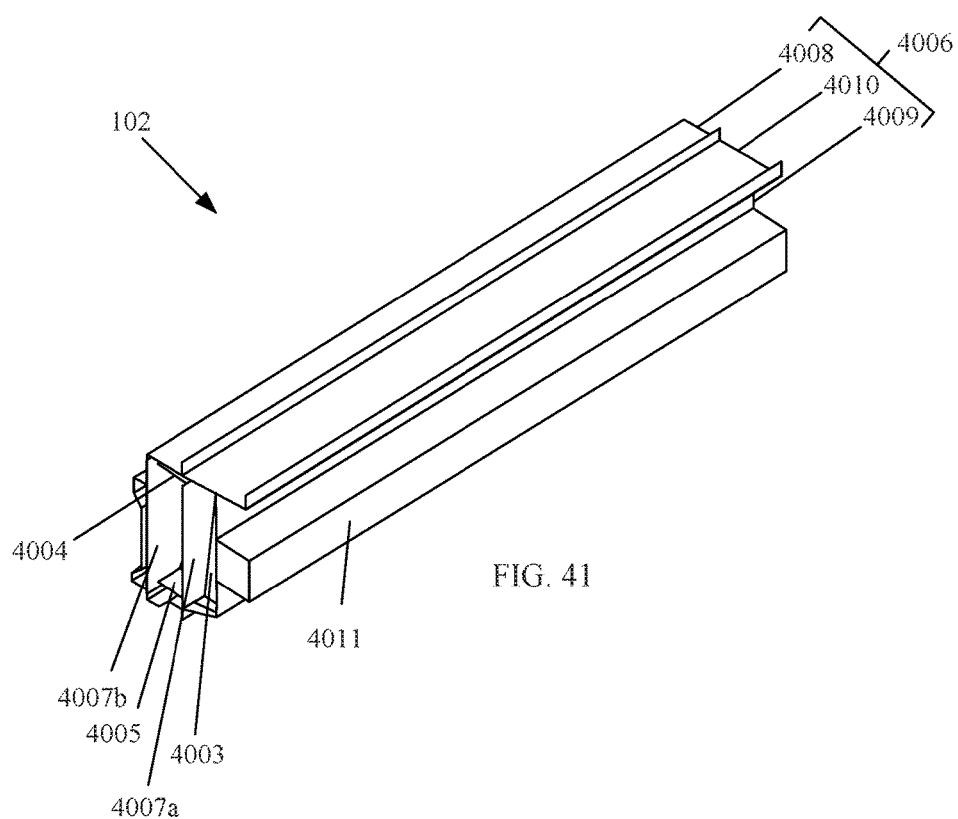

VEHICLE FLOOR AND SUBASSEMBLIES THEREOF

CROSS-REFERENCE TO RELATED APPLICATION(S)

This application claims priority to and the benefit of U.S. Provisional Patent Application No. 62/397,005, filed Sep. 20, 2016, and U.S. Provisional Patent Application No. 62/397,056, filed Sep. 20, 2016, the entire disclosures of which are hereby incorporated by reference.

TECHNICAL FIELD

The present disclosure pertains to vehicles and, in particular, floor structures for passenger vehicles.

BACKGROUND

Passenger vehicles for roadways, such as cars, trucks, or other automobiles, include floor structures. It would be advantageous to provide such a floor structure that distributes forces from outboard impacts and/or minimizes a height thereof to maximize space for other uses (e.g., battery storage).

SUMMARY

In one aspect, a floor assembly for a passenger vehicle includes a lower floor assembly and an upper floor subassembly coupled to and positioned above the lower floor assembly. The lower floor assembly includes one or more compartments for containing one or more batteries. The upper floor subassembly is a sandwich structure composite.

In another aspect, a floor assembly for a passenger vehicle includes a lower plate, an upper plate, first and second outboard structures, and a core. The first and second outboard structures are positioned vertically between and coupled to the lower plate and the upper plate. The core is positioned laterally between the first and second outboard structures, and is positioned vertically between and affixed to the lower plate and the upper plate.

In a still further aspect, a method is provided for manufacturing a floor assembly of a passenger vehicle. The method includes providing a bottom plate, a top plate, two outboard extrusions, and a core. In another operation, a first adhesive is applied to one of a bottom surface of the core or an upper surface of the bottom plate, and the core is subsequently positioned on the bottom plate. In another operation, a second adhesive is applied to the upper surface on each side of the core, and the outboard structures are subsequently positioned on the second adhesive on each side of the core. In another operation, a third adhesive is applied to an upper surface of the core, a fourth adhesive is applied to upper surfaces of the outboard structures, and subsequently the upper plate is positioned on the third adhesive and on the fourth adhesive. In a further operation, the bottom plate, the top plate, the two outboard extrusions, and the core are pressed together at a temperature for a duration to cure the first adhesive, the second adhesive, the third adhesive, and the fourth adhesive.

In another aspect, a sill assembly for a vehicle includes an energy-absorbing region and a force-spreading region. The energy-absorbing region is elongated in a fore-aft direction and includes an inboard subregion and an outboard subregion. The outboard subregion is arranged outboard of and proximate to the inboard subregion. The force-spreading region is elongated in the fore-aft direction and is arranged outboard of and proximate to the energy-absorbing region and spreads force from outboard loading to the energy-absorbing region. Along the fore-aft direction, the force-spreading region has greater inboard compressive strength than the outboard subregion, and the outboard subregion has greater compressive strength than the inboard subregion. A floor assembly for a vehicle includes an inner floor assembly and two of the sill assemblies. The inner floor assembly includes an upper floor subassembly, a lower floor subassembly, and an intermediate floor subassembly positioned vertically between the upper floor subassembly and the lower floor subassembly and also containing one or more batteries. The two sill assemblies are positioned on opposite outboard sides of the inner floor assembly. Each sill assembly is configured to distribute substantially greater amounts of force from outboard loading to the upper floor subassembly and the lower floor subassembly than to the intermediate floor subassembly.

In yet another aspect, a floor assembly includes an inner floor assembly and two sill assemblies. The inner floor assembly includes an upper floor subassembly, a lower floor subassembly, and an intermediate floor subassembly positioned vertically between the upper floor subassembly and the lower floor subassembly and also containing one or more batteries. The two sill assemblies are positioned on opposite outboard sides of the inner floor assembly. Each sill assembly is configured to distribute substantially greater amounts of force from outboard loading to the upper floor subassembly and the lower floor subassembly than to the intermediate floor subassembly.

In a still further aspect, a sill assembly includes an upper inboard load structure, a lower inboard load structure, and an outboard load structure. The lower inboard load structure is arranged below the upper inboard load structure. The outboard load structure vertically overlaps the upper inboard load structure and the lower inboard load structure, and is positioned proximate thereto to transfer force thereto from outboard loading.

BRIEF DESCRIPTION OF THE DRAWINGS

FIG. 7 is an exploded view of a floor assembly of the floor structure of FIG. 2.

FIG. 8 is an assembled view of the floor assembly shown in FIG. 7.

FIG. 10 is a partial cross-sectional view of an upper floor subassembly in a first state during a second method of assembly in which an adhesive layer is applied to a core.

FIG. 11 is another partial cross-sectional view of the upper floor subassembly shown in FIG. 10 in a second state during the second method of assembly.

FIG. 12 is another partial cross-sectional view of the upper floor subassembly shown in FIG. 10 in a third state during the second method of assembly.

FIG. 13 is a cross-sectional view of the upper floor subassembly shown in FIG. 10 in a fourth state during the second method of assembly.

FIG. 14 is a cross-sectional view of the upper floor subassembly shown in FIG. 10 in an assembled state resulting from the second method of assembly.

FIG. 25 is a partial cross-sectional view of an upper floor subassembly according to another embodiment.

FIG. 26 is a partial cross-sectional view of a lower plate according to an embodiment.

FIG. 27 is a partial cross-sectional view of a lower plate according to an embodiment.

FIG. 28 is a partial cross-sectional view of an upper floor subassembly according to another embodiment.

FIG. 32 is a partial cross-sectional view of an upper floor subassembly according to another embodiment.

FIG. 33 is a partial cross-sectional view of an upper floor subassembly according to another embodiment.

FIG. 36 is a partial cross-sectional view of an upper floor subassembly according to another embodiment.

FIG. 37 is a partial cross-sectional view of an upper floor subassembly according to another embodiment.

FIG. 41 is an upper, front, left perspective assembled view of the sill assembly shown in FIG. 40.

DETAILED DESCRIPTION

Figure 1:
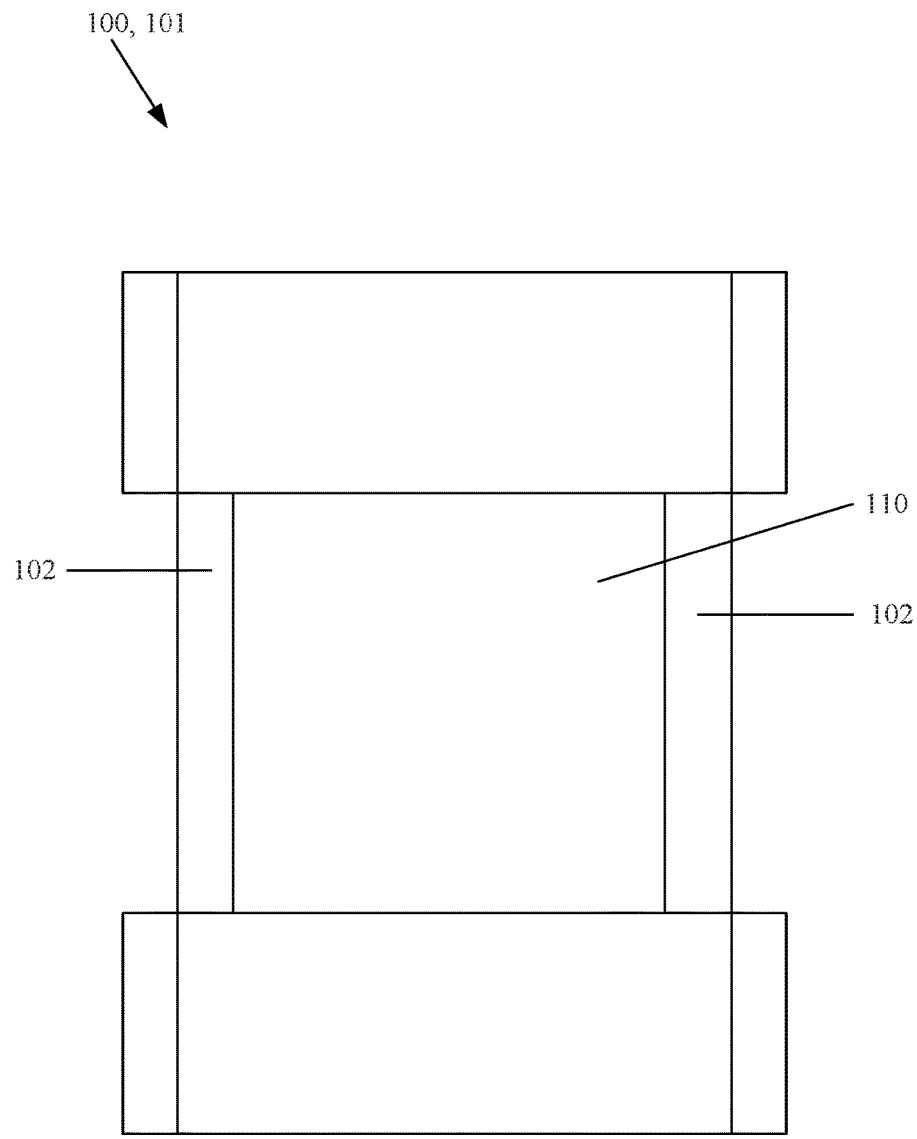
FIG. 1 is a top schematic view of a vehicle according to an embodiment.
Figure 2:
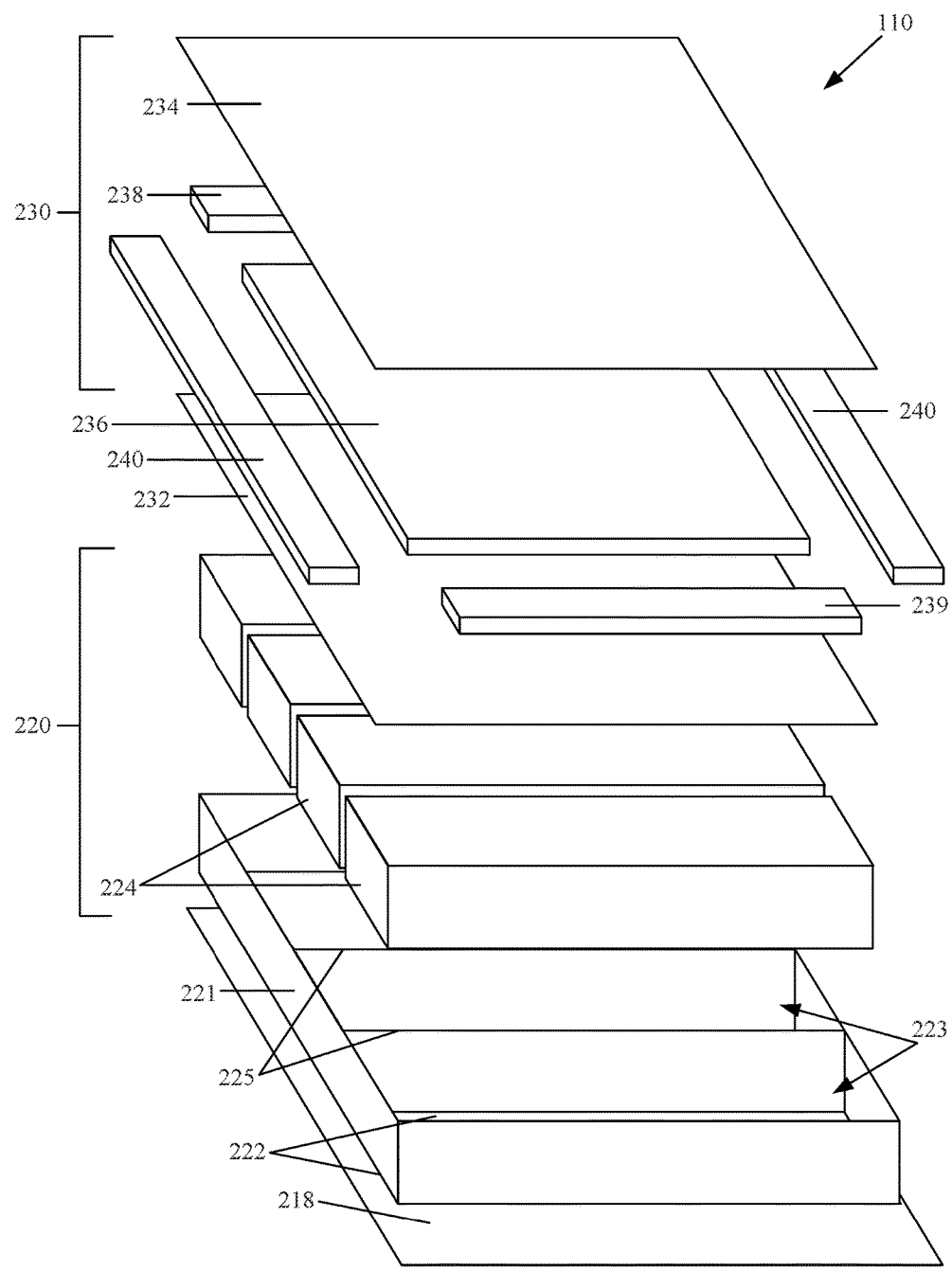
FIG. 2 is an upper, left, front perspective view of a floor structure of the vehicle of FIG. 1

Referring to FIG. 1, a vehicle 100 includes a floor assembly 101 having an inner floor assembly 110 (e.g., inner floor structure) and two sill assemblies 102 (e.g., beam or sill structure) that are each coupled to one of two outboard sides of the inner floor assembly 110.

Referring to FIGS. 2-5, the inner floor assembly 110 (e.g., primary or inner floor structure or assembly) generally includes an intermediate floor subassembly 220 (e.g., battery housing, middle or intermediate floor structure or assembly) and an upper floor subassembly 230 (e.g., upper floor panel, structure, or assembly) above the intermediate floor subassembly 220. The inner floor assembly 110 may additionally include a lower floor subassembly 218 (e.g., lower or protection panel, structure, or assembly) positioned below the intermediate floor subassembly 220. It should be noted, however, that the upper floor subassembly 230 may be used independent of the intermediate floor subassembly 220.

The inner floor assembly 110 is configured to house or contain batteries 224 (e.g., battery assemblies) therein. When the upper floor subassembly 210 is coupled to the intermediate floor subassembly 220 (e.g., with elongated, vertical fasteners 426), the upper floor subassembly 230 is positioned over and/or encloses the batteries 224 in the inner floor assembly 110. The upper floor subassembly 230 is configured to provide a substantially flat (e.g., planar) upper surface, while minimizing the height of the upper floor subassembly 230 and inner floor assembly 110, which may provide for a desired interior aesthetic, while maximizing space for storing the batteries 224. That is, the upper surface of the upper floor subassembly 230 forms the uppermost rigid surface of the inner floor assembly 110 (which may be covered by compliant surface materials, such as carpeting, fabric, or padding).

The inner floor assembly 110 is configured to distribute forces from outboard loading at concentrated locations. The upper floor subassembly 230 is configured with stiffened outboard regions that resist or limit bending or deformation about vertical axes, and which distribute forces from the outboard loading across the upper floor subassembly 230. The sill assemblies 102 are additionally configured to absorb force via deformation and also transfer force to the upper floor subassembly 230 and/or to the lower floor subassembly 218. This allows for the omission or reconfiguring of cross-car beams (i.e., beams extending in the inboard/outboard direction across vehicles) that are typically positioned at an intermediate fore-aft position of conventional vehicles. Omission and/or reconfiguring of such cross-car beams may increase available space for positioning the batteries 224 under the upper floor subassembly 230 and/or within the inner floor assembly 110.

The inner floor assembly 110 additionally forms a substantially rigid assembly that resists bending moments about horizontal axes (e.g., twisting) from unequal forces being applied at different portions of the inner floor assembly 110 (e.g., as the vehicle 100 corners, passes over bumps, etc.). Resisting bending moments about horizontal axes is facilitated by the upper floor subassembly 230 and the lower floor subassembly 218 being spaced apart by the intermediate floor subassembly 220 and being coupled to each other with fasteners 462 at intermediate locations. Additionally, the sill assemblies 102 are coupled to the upper floor subassembly 230 and the lower floor subassembly 218 at outboard locations to prevent shearing (e.g., lateral sliding or shifting) therebetween, which further resists bending of the inner floor assembly 110 about horizontal axes.

The intermediate floor subassembly 220 includes a peripheral structure 221 and a lower panel 222, which cooperatively form an interior space having one or more compartments 223 into which one or more batteries 224 may be positioned. The batteries 224 have a width that is less than the upper floor subassembly 230. Inner cross-members 225 may span between outboard sides of the peripheral structure 221 to divide the interior space into more than one compartment 223 (e.g., three of the inner cross-members 225 forming four compartments 223 as shown). The inner cross-members 225 may additionally function to stiffen the inner floor assembly 110 to prevent or limit bending about horizontal axes (as described above) and to prevent buckling in vertical and inboard directions.

The lower floor subassembly 218 may be configured as one or more continuous plate members (e.g., a steel or aluminum plate that has been stamped, rolled, extruded, or otherwise formed) or may be another structure (e.g., planar structure), such as a sandwich structure composite (e.g., configured similar to the upper floor subassembly 230) or other assembly. The lower floor subassembly 218, in addition to providing structural rigidity to the inner floor assembly 110 as described above, also provides a protective barrier to the underside of the intermediate floor subassembly 220 and the batteries 224 contained therein.

Figure 6:
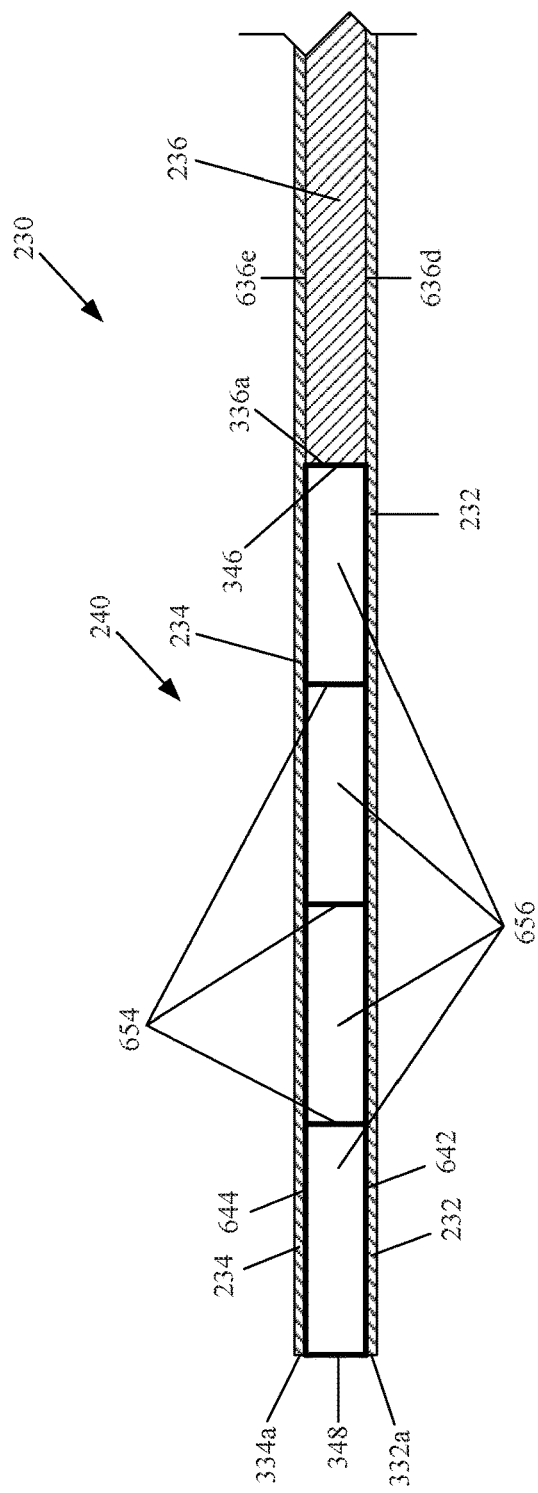
FIG. 6 is a detail cross-sectional view of the floor structure taken along line 6 in FIG. 4.

Referring to FIG. 6, the upper floor subassembly 230 is a sandwich structure composite assembly that generally includes a lower plate 232 (e.g., lower or bottom sheet, facesheet, skin, member, etc.), an upper plate 234 (e.g., top or upper sheet, facesheet, skin, member, etc.), a core 236, and two outboard structures 240 (e.g., left and right members, extrusions, or assemblies). The outboard structures 240 are positioned at outboard locations of the upper floor subassembly 230 and function to stiffen the upper floor subassembly 230 along outboard edges thereof between forward and rearward ends thereof (e.g., to substantially continuously stiffen the upper floor subassembly). The upper floor subassembly 230 may additionally include a forward structure 238 and a rearward structure 239 (e.g., members or assemblies).

The core 236 and the two outboard structures 240 of the upper floor subassembly 230 are positioned vertically between and affixed to the lower plate 232 and the upper plate 234. The core 236 is positioned laterally between the two outboard structures 240. For example, as discussed in further detail below, an upper surface of the lower plate 232 is coupled to (e.g., affixed, bonded, adhered, or substantially continuously coupled) to lower surfaces of each of the core 236 and the two outboard structures 240, while the lower surface of the upper plate 234 is coupled to upper surfaces of each of the core 236 and the two outboard structures 240. With the lower plate 232 and the upper plate 234 having their upper and lower surfaces, respectively, coupled (e.g., affixed, bonded, adhered, or substantially continuously coupled) to lower and upper surfaces, respectively, of the core 236 and the two outboard structures 240, the upper floor subassembly 230 is configured to bend as a unit about horizontal axes. Relative lateral sliding (e.g., shearing) is prevented between the lower plate 232 and the upper plate 234 with each of the core 236 and the two outboard structures 240. In embodiments that include the forward structure 238 and the rearward structure 239, the lower plate 232 and the upper plate 234 may similarly be coupled (e.g., affixed, bonded, adhered, or substantially continuously coupled) to upper and lower surfaces, respectively, thereof, for the upper floor subassembly 230 to bend as a unit with relative lateral sliding (e.g., shearing) therebetween being prevented.

The two outboard structures 240 of the upper floor subassembly 230, in cooperation with the lower plate 232 and the upper plate 234, strengthen outboard regions of the upper floor subassembly 230 generally along an entire, or substantial majority of a, fore-aft length of the upper floor subassembly 230. Each outboard structure 240 and/or outboard regions of the lower plate 232 and the upper plate 234 absorb an outboard impact or load along the length of the upper floor subassembly 230 and distribute the resultant force inboard across the upper floor subassembly 230 (e.g., to inboard portions of the lower plate 232 and the upper plate 234) and to other structures of the vehicle 100 (e.g., the intermediate floor subassembly 220). The outboard structures 240 in combination with the lower plate 232 and the upper plate 234, thus, cooperatively resist inboard deflection and/or deformation from the outboard impact, for example, about a vertical axis. The core 236 is made of or otherwise provides a lower cost, lighter weight, and/or weaker material than the outboard structures 240 in inboard regions of the upper floor subassembly 230. The core 236 prevents vertical deflection or compression between the lower plate 232 and the upper plate 234 and also prevents translational sliding (e.g., shearing) therebetween as mentioned previously. The forward structure 238 and the rearward structure 239 are also configured to transfer the force of an outboard impact across the upper floor subassembly 230, including forces from concentrated outboard impacts proximate forward and rearward ends of the upper floor subassembly 230.

Referring to FIGS. 3-6, each outboard structure 240 of the upper floor subassembly 230 is a generally rigid, elongated member that extends in a fore-aft direction of the vehicle 100. Each outboard structure 240 may, for example, be a unitary, extruded aluminum (e.g., 2024, 6062, or 7075 aluminum, or other suitable material) component that may also be machined. That is, each outboard structure 240 may be a metal extrusion or metal member, such as an aluminum extrusion. According to other embodiments, the outboard structures 240 may be made from multiple components that are coupled together (e.g., multiple extrusions stir welded together), be made from other materials, and/or be made from other manufacturing methods. While the outboard structures 240 are depicted as having a constant wall thickness (e.g., approximately 4 mm, 3 mm, or 2 mm), the outboard structures 240 may instead have a varying wall thickness (e.g., narrowing moving inboard in a stepped or tapering fashion, such as from approximately 4 mm to 2 mm).

Each outboard structure 240 of the upper floor subassembly 230 includes an inboard edge 346 (shown in phantom lines in FIG. 3), an outboard edge 348, a forward edge 350, and a rearward edge 352 (see, e.g., FIG. 3), along with a lower surface 642 and an upper surface 644 (see, e.g., FIG. 6). The outboard structure 240 additionally includes a plurality of webs 654 that extend vertically to form chambers or cavities 656 (e.g., multiple chambers) between the lower surface 642 and the upper surface 644, which extend in the fore-aft direction (i.e., the direction of extruding).

A width of the outboard structure 240, as measured between the inboard edge 346 and the outboard edge 348, is greater than a height of the outboard member 248, as measured between the lower surface 642 and the upper surface 644, over a majority of the fore-aft length of the outboard structure 240 (i.e., between the forward edge 350 and the rearward edge 352). For example, the width of the outboard structure 240 is approximately twice its thickness or more (e.g., between approximately two and fifteen, such as between five and ten, times the thickness). The thickness of the outboard structure 240 may be substantially constant across its width. For example, the thickness of the outboard structure 240 may be between approximately 15 and 33 mm (e.g., approximately 22 mm) and have a width of between approximately 200 and 300 mm (e.g., approximately 240 mm). According to other embodiments, the outboard structure may have a width that is between approximately one and three times its thickness, such as having a width of between approximately 40 mm and 80 mm (e.g., 50 mm) and a thickness of between approximately 15 and 33 mm (e.g., approximately 22 mm). According to still further embodiments, the outboard structure 240 may have a variable thickness that lessens in a stepped or tapered manner moving in an inboard direction. Variations of the outboard structure 240 are discussed in further detail below.

The fore aft-length of the outboard structure 240 is greater than its width. In one example, the length of the outboard structure 240 is approximately twice its maximum width or more (e.g., between approximately two and ten times the width). For example, the outboard structure 240 may have a length of between approximately 1000 mm and 2000 mm (e.g., approximately 1700 mm). The width may be between 200 mm and 300 mm. In another example, the length of the outboard structure is between approximately ten and twenty-five times its width, such as having a length of between approximately 1000 mm and 2000 mm and a width of between approximately 40 mm and 80 mm (e.g., 50 mm). According to other embodiments, the dimensions (i.e., thickness, width, length, and ratios thereof) may be different (e.g., smaller, larger, variable, etc.) as may be appropriate for different applications.

The inboard edge 346 of the outboard structure 240 is substantially vertical and extends substantially straight in a fore-aft direction. The inboard edge 346 is positioned proximate an outboard edge 336a of the core 236. The inboard edge 346 may additionally abut and/or be coupled to the outboard edge 336a of the core 236, or may be spaced apart therefrom at a constant or varying distance in an inboard-outboard direction. The inboard edge 346 may be formed during an extruding process of the outboard structure 240 and/or be machined. According to other embodiments, the inboard edge 346 may extend vertically at a non-vertical and/or varying angle, extending at a different angle or varying angles relative to the fore-aft direction.

The outboard edge 348 of the outboard structure 240 may be straight in the fore-aft direction as shown, or may follow a curved or convoluted profile corresponding to the sill assembly 102 and a desired outer aesthetic of the vehicle. The outboard edge 348 may be formed during extruding of the outboard structure 240, or may be machined to form a curved or convoluted profile thereof. In regions of a curved profile, the edges of the lower surface 642 and the upper surface 644 may be disconnected with no web or other portion of the outboard structure 240 extending vertically therebetween.

The webs 654 of the outboard structure 240 are substantially vertical and extend substantially straight in the fore-aft direction and in parallel with the inboard edge 346. While the webs 654 are shown as defining four cavities 656 (e.g., with two external webs 654 forming the inboard edge 346 and the outboard edge 348, and three internal webs 654) in FIG. 6, the outboard structure 240 may include any suitable number of webs 654 (e.g., three of the webs 654 to form two of the cavities 656, and two, four, five, or more of the webs 654 to form other numbers of the cavities 656). Further, while the webs 654 are shown as being equally spaced so as to define the cavities 656 with generally equal cross-sectional sizes, the webs 654 may be spaced differently to provide the cavities 656 with different cross-sectional sizes. Still further, while the webs 654 are depicted as being substantially vertical, they may extend at different angles relative to vertical and/or be connected to each other (e.g., forming a corrugated pattern).

The core 236 of the upper floor subassembly 230, as referenced above, is lighter weight (e.g., lower density), less expensive, and/or weaker material than that of the outboard structures 240, the lower plate 232, and/or the upper plate 234. In one example, the core 236 is an aluminum honeycomb sheet or panel having cells (e.g., voids) whose axes extend substantially vertically between the lower plate 232 and the upper plate 234 (see also FIG. 15). According to other embodiments, the core 236 may be another material, such as a honeycomb sheet or panel formed from another material (e.g., another metal, a polymer, etc.), a metal extrusion (e.g., having thinner upper and lower surfaces and/or webs than the outboard structure 240), a polymer foam (e.g., rigid foam panel, injected curable foam), a metal foam (e.g., aluminum foam), wood (e.g., balsa wood), an egg crate-type structure (e.g., stamped or 3-dimensional profile), a corrugated structure (e.g., 2-dimensional profile), or other suitable structure or material. The core 236 may also comprise multiple sheets, plates, or members that are positioned laterally adjacent, stacked vertically, and/or coupled to each other. Variations of the core 236 are discussed in further detail below.

The core 236 has two outboard edges 336a, a forward edge 336b, a rearward edge 336c, a lower surface 636d, and an upper surface 636e. The outboard edges 336a extend substantially straight and parallel with each other in the fore-aft direction, or with another profile, to correspond with the inboard edges 346 of the outboard structures 340. For example, the core 236 may have a width of between approximately 500 and 800 mm (e.g., approximately 650 mm). The forward edge 336b and the rearward edge 336c extend substantially straight and parallel with each other in the inboard-outboard direction, or with another profile, to correspond with a rearward edge 238a of the forward structure 238 and a forward edge 339a of the rearward structure 239, respectively.

Figure 15:
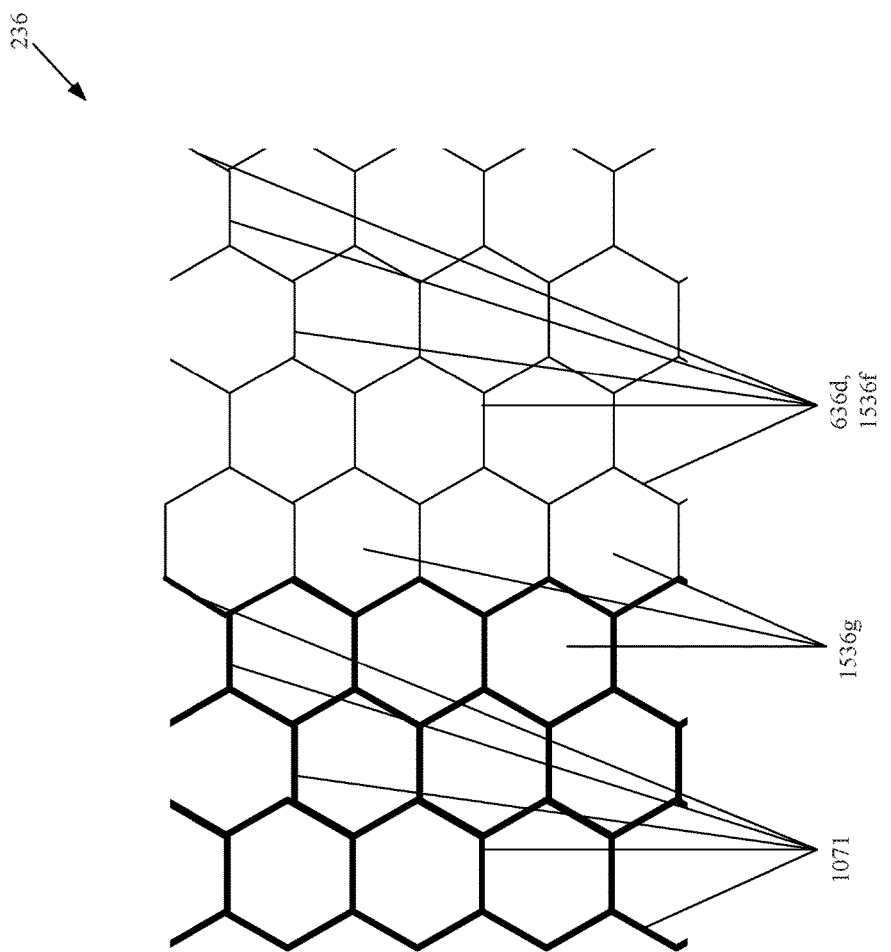
FIG. 15 is a partial top view of the upper floor subassembly as shown in FIG. 10 with the adhesive layer shown partially applied to the core.

In embodiments in which the core 236 comprises a honeycomb structure, the outboard edges 336a, the forward edge 336d, and the rearward edge 336c are formed cooperatively by partial (e.g., cut) vertical walls that define the cells 1536g partially formed at outer ends of the honeycomb structure, as opposed to having a continuous edge or peripheral surface (see FIG. 15). Furthermore, the lower surface 636d and the upper surface 636e are formed cooperatively by the edges 1536f at upper and lower ends, respectively, of the vertical walls that define the cells 1536g of the honeycomb structure, as opposed to having a continuous surface.

The core 236 is coplanar (i.e., having a common horizontal plane extending therethrough) with the outboard structures 240 and has a thickness that is measured in a substantially vertical direction between the lower surface 636d and the upper surface 636e. The thickness of the core 236 has a thickness that is constant across its width and that is the same as the thickness of the outboard structure 240 adjacent thereto. This allows for the lower plate 232 and the upper plate 234 to have a substantially constant thickness across their widths and lengths, such that the upper floor subassembly 230 has a substantially constant thickness across its width and length, and/or to have substantially planar upper and lower surfaces. For example, the core 236 may have a thickness of between approximately 15 and 30 mm (e.g., approximately 22 mm). According to other embodiments, as discussed in further detail below, the core 236 may have a thickness that increases in a tapering or stepped fashion moving inboard and/or laterally toward a center of the upper floor subassembly 230.

The forward structure 238 and the rearward structure 239 of the upper floor subassembly 230 are each a generally rigid, elongated member that extends in the inboard-outboard direction of the vehicle 100. The forward structure 238 and the rearward structure 239 may, for example, each be a unitary, extruded aluminum component that may also be machined. According to other embodiments, the forward structure 238 and the rearward structure 239 may be made from multiple components that are coupled together, be made from other materials, and/or be made from other manufacturing methods.

The forward structure 238 and the rearward structure 239 are coplanar with the outboard structures 240 and the core 236. The forward structure 238 is positioned forward of the core 236 with its rearward edge 338a positioned proximate the forward edge 336d of the core 236, while the rearward structure 239 is positioned rearward of the core 236 with its forward edge 339a positioned proximate the rearward edge 336c of the core 236. The rearward edge 338a of the forward structure 238 and the forward edge 339a of the rearward structure 239 may abut and/or be coupled to the forward edge 336d and the rearward edge 336c, respectively, of the core 236 (e.g., using an expanding splice adhesive), or may be spaced apart therefrom a constant or varying distance in the fore-aft direction.

Figure 3:
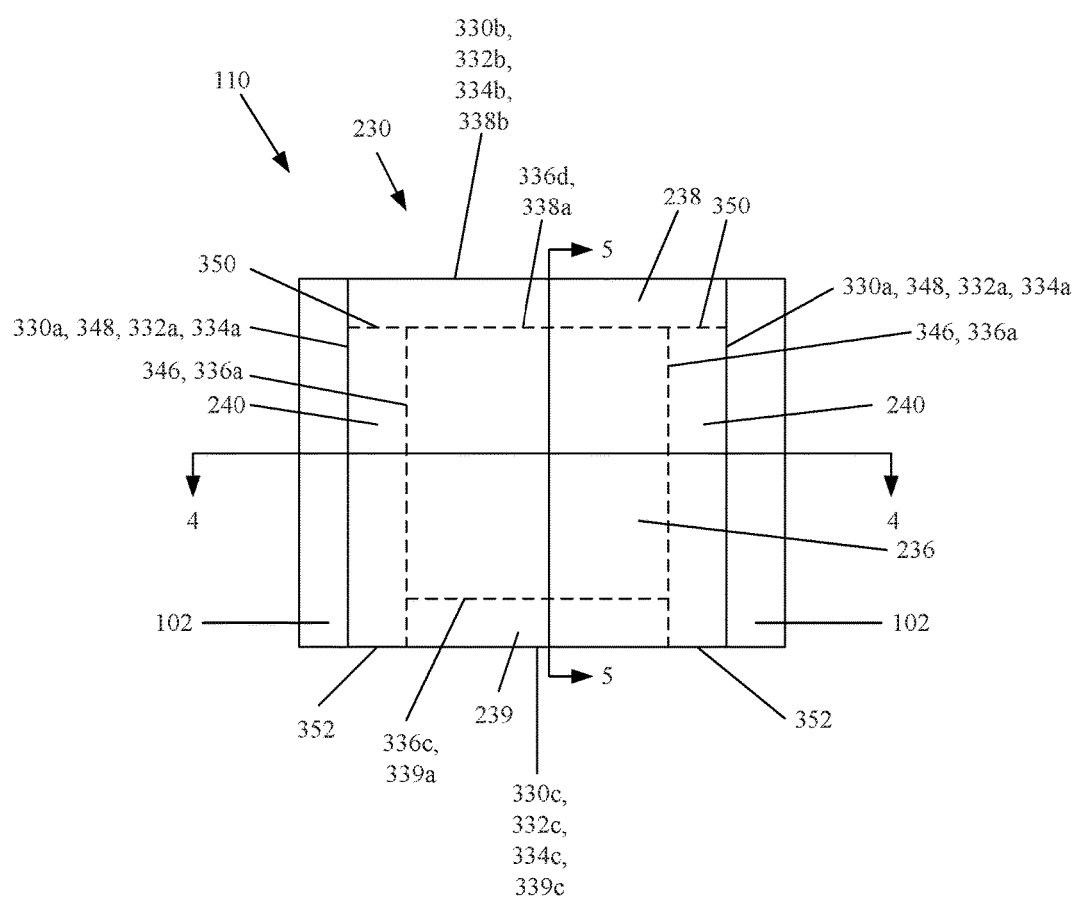
FIG. 3 is a top plan view of the floor structure of FIG. 2.
Figure 4:
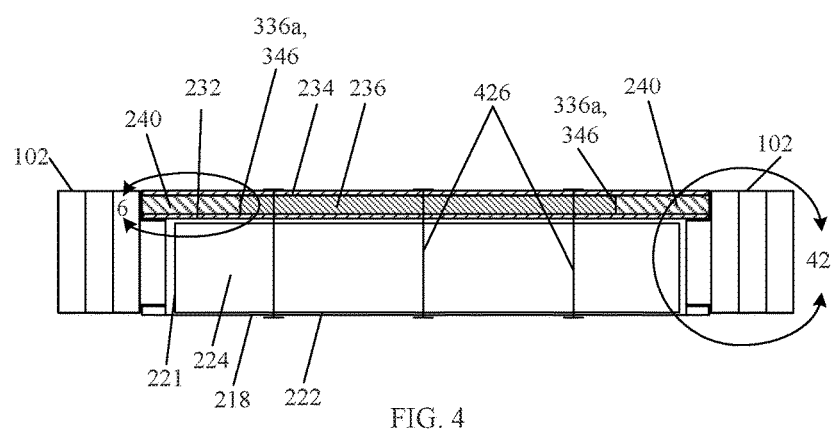
FIG. 4 is a cross-sectional view of the floor structure taken along line 4-4 in FIG. 3.
Figure 5:
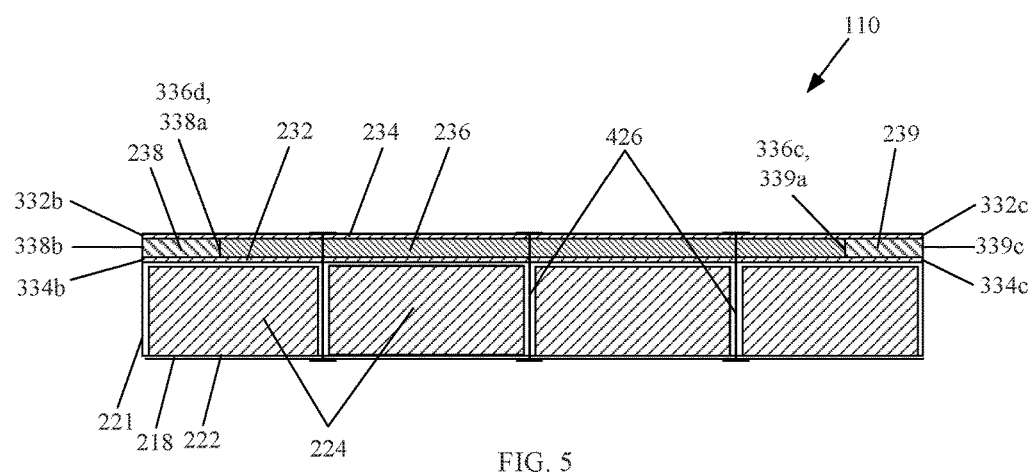
FIG. 5 is a cross-sectional view of the floor structure taken along line 5-5 in FIG. 3.

The forward structure 238 and/or the rearward structure 239 may extend between and to the outboard edges 348 of the outboard structures 240, as is shown for the forward structure 238 in FIG. 3, or may extend between and to the inboard edges 346 of the outboard structures 240, as is shown for the rearward structure 239 in FIG. 3. As shown, the outboard structures 240 extend a substantial majority of the fore-aft length of the upper floor subassembly 230 by extending by extending to the forward structure 238.

The forward structure 238 and the rearward structure 239 have a thickness between their lower and upper surfaces (not labeled), which may be the same as the thickness of the outboard structure 240 and/or the core 236 in adjacent regions. This allows for the lower plate 232 and the upper plate 234 to have a substantially constant thickness across their widths, resulting in the upper floor subassembly 230 having a substantially constant thickness across its width and length, and/or have substantially planar upper and lower surfaces. Alternatively, the thickness of the outboard structures 240 may be less than that of the core 236, which allows for dimensional variation (e.g., warping, twisting, etc.) of the outboard structures 240, while still maintaining a constant thickness for the upper floor subassembly 230.

The lower plate 232 and the upper plate 234 of the upper floor subassembly 230 are each a generally rigid, planar member that spans substantially the entire fore-aft and inboard-outboard directions of the upper floor subassembly 230. Each of the lower plate 232 and the upper plate 234 may, for example, be a unitary aluminum sheet of constant thickness (e.g., 2024, 6062, or 7075 aluminum, other aluminum material, or other suitable material). In other embodiments, the lower plate 232 and the upper plate 234 may be made of or include other materials, such as composite materials. For example, the lower plate 232 and/or the upper plate 234 may be made of or include carbon fiber, such as loose or woven carbons fibers set in a polymer (e.g., cured resin). According to other embodiments, as discussed in further detail below, the lower plate 232 and the upper plate 234 may be made from multiple members assembled together, be made from different materials, and/or have varying thicknesses (e.g., thinning in a tapering or stepped fashion moving inboard).

As referenced above, the core 236, the forward structure 238, the rearward structure 239, and the outboard structures 240 are arranged vertically between the lower plate 232 (i.e., above the lower plate 232) and the upper plate 234 (i.e., below the upper plate 234). The lower plate 232 and the upper plate 234 have substantially the same peripheral shape, which has a width extending between the outboard edges 332a, 334a, respectively, thereof, and a length extending between the forward edges 332b, 334b and the rearward edges 332c, 334c, respectively, thereof.

The outboard edges 332a, 334a of the lower plate 232 and the upper plate 234, respectively, follow the outboard edges of 348 of the outboard structures 240. In embodiments in which the outboard edges 348 of the outboard structures 240 are straight and parallel, the outboard edges 332a, 334a on left and right sides of the lower plate 232 and the upper plate 234 are also straight and parallel with each other, resulting in the lower plate 232 and the upper plate 234 having constant widths along a majority of their fore-aft lengths. In embodiments in which the outboard edges 348 of the outboard structures 240 are not parallel or follow a curved or convoluted profile, the lower plate 232 and the upper plate 234 have varying widths along their fore-aft lengths.

Similarly, the forward edges 332b, 334b of the lower plate 232 and the upper plate 234 follow a forward edge 338b of the forward structure 238, and the rearward edges 332c, 334c of the lower plate 232 and the upper plate 234 follow a rearward edge 339c of the rearward structure 239. In embodiments in which the forward edge 338b of the forward structure 238 and the rearward edge 339c of the rearward structure 239 are straight and parallel, the forward edges 332b, 334b and the rearward edges 332c, 334c of the lower plate 232 and the upper plate 234 are also straight and parallel with each other, resulting in the lower plate 232 and the upper plate 234 having constant lengths along a majority of their widths. In embodiments in which the forward edge 338b of the forward structure 238 and/or the rearward edge 339c of the rearward structure 239 are not parallel or follow a curved or convoluted profile, the lower plate 232 and the upper plate 234 have varying lengths across their widths.

The lower plate 232 and the upper plate 234 additionally have a constant thickness that, in conjunction with the thicknesses of the core 236, the forward structure 238, the rearward structure 239, and the outboard structures 240, results in the upper floor subassembly 230 having a constant thickness. For example, the lower plate 232 and/or the upper plate 234 may have a thickness of between approximately 1 mm and 4 mm (e.g., approximately 1.5 mm). In combination with the outboard structures 240 and the core, the upper floor subassembly 230 may have a thickness of between approximately 17 mm and 38 mm (e.g., approximately 25 mm). Alternatively, the lower plate 232, the upper plate 234, the core 236, the forward structure 238, the rearward structure 239, and/or the outboard structures 240 may alternatively vary in a cooperative manner to achieve a constant or variable thickness of the upper floor subassembly 230.

Figure 9:
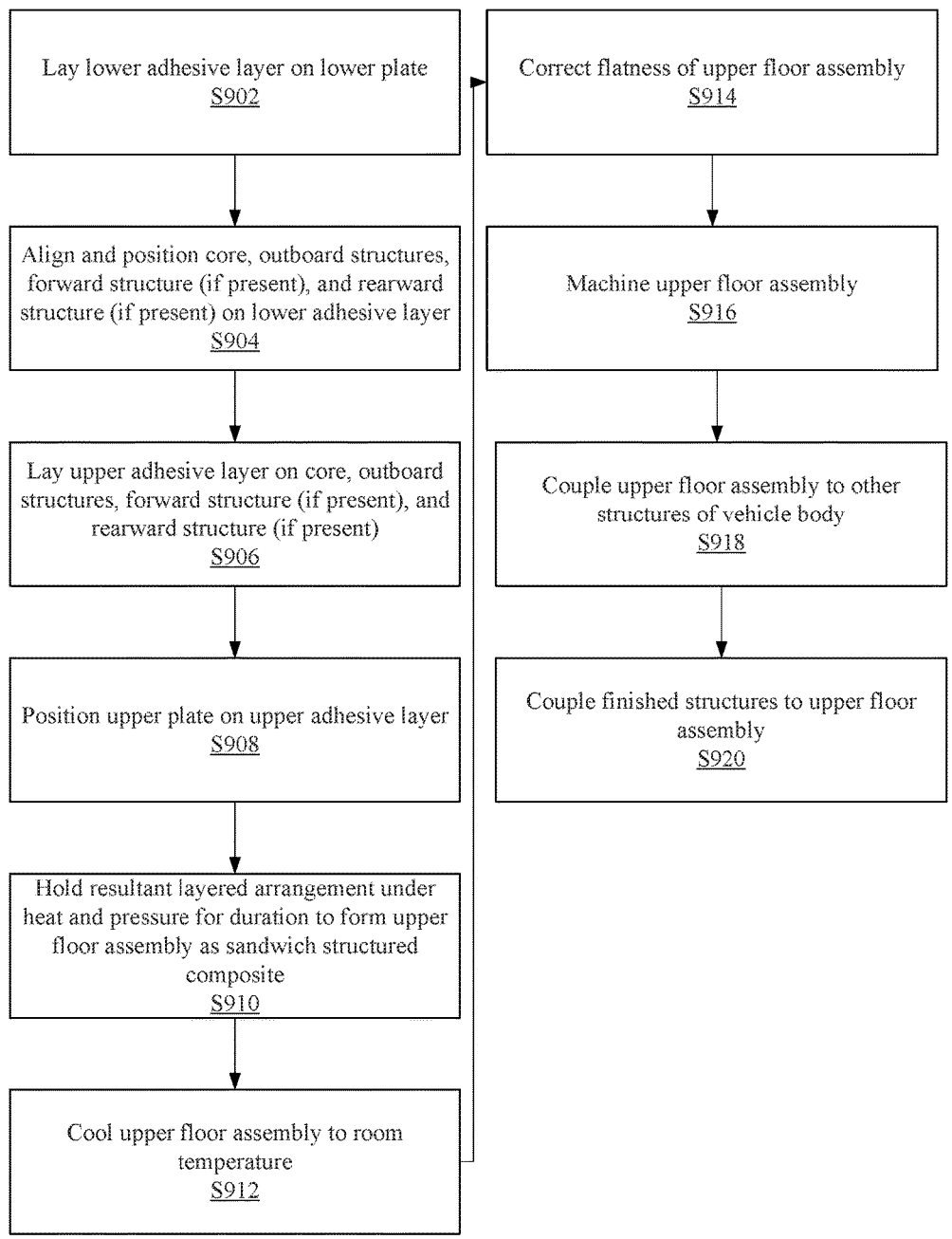
FIG. 9 is a flow chart for a method of assembling the floor structure shown in FIGS. 2, 7, and 8.

With reference to FIGS. 7-9, and as mentioned above, the upper surface of the lower plate 232 is coupled (e.g., affixed, bonded, adhered, or substantially continuously coupled) to the lower surfaces of the core 236, the forward structure 238, and the rearward structure 239, as well as to the lower surfaces 642 of the outboard structures 240. The lower surface of the upper plate 234 is also coupled (e.g., affixed, bonded, adhered, or substantially continuously coupled) to the upper surfaces of the core 236, the forward structure 238, and the rearward structure 239, as well as to the upper surfaces 644 of the outboard structures 240. In this manner, the upper floor subassembly 230 is configured as a sandwich structure composite.

According to one embodiment, the lower plate 232 and the upper plate 234 are affixed using one or more types of adhesives. For example, as shown in FIGS. 7-8, which are disassembled and assembled cross-sectional views taken along line 4-4 in FIG. 3, a lower adhesive layer 761 (e.g., a lower layer of adhesive), such as a film adhesive (e.g., a heat activated adhesive), affixes (e.g., bonds, adheres, etc.) the lower plate 232 to the core 236 and the outboard structures 240. An upper adhesive layer 762 (e.g., an upper layer of adhesive), such as another film adhesive, affixes (e.g., bonds, adheres, etc.) the upper plate 234 to the core 236 and the outboard structures 240. The lower adhesive layer 761 and the upper adhesive layer 762 have widths and lengths equal to those of the lower plate 232 and the upper plate 234, as well as the combined widths and lengths of the core 236 and the outboard structures 240, so as to affix (e.g., adhere, bond, couple, etc.) the lower plate 232 and the upper plate 234 over an entirety or substantial majority of their respective interfacing surfaces therebetween (i.e., upper and lower surfaces).

A splice adhesive 763 may also be positioned between the core 236 and the outboard structures 240, which affixes (e.g., bonds, adheres, etc.) the outboard edge 336a and the inboard edge 346, respectively, thereof to each other. The splice adhesive 763 may also expand laterally between the outboard edge 336a of the core 236 (e.g., into partial cells of the honeycomb structure) and the inboard edge 346 of the outboard structures 240, respectively, and vertically between the lower plate 232 and the upper plate 234 to form a bond therebetween.

As shown in FIG. 9, in conjunction with FIGS. 7-8, a method is provided for assembling the upper floor subassembly 230. In a first operation S902, the lower adhesive layer 761 is placed (e.g., laid) on the lower plate 232. In a second operation S904, the core 236, the outboard structures 240, and the splice adhesives 763 are aligned with each other and placed on the lower adhesive layer 761. Additionally, the forward structure 238 and the rearward structure 239, if included, may also be aligned with the core 236 and the outboard structures 240. In a third operation S906, the upper adhesive layer 762 is laid on upper surfaces of the core 236 and the outboard structures 240, as well as the forward structure 238 and the rearward structure 239 if present. In a fourth operation S908, the upper plate 234 is aligned with and positioned on the upper adhesive layer 762. In a fifth operation S910, the resultant layered arrangement is then held under heat (e.g., 175 degrees Celsius, as may be appropriate for the adhesives) and pressure for a duration (e.g., 60 minutes, as may be appropriate for the adhesives). During the fifth operation S910, the lower adhesive layer 761, the upper adhesive layer 762, and the splice adhesive 763 cure to form the upper floor subassembly 230 as a sandwich structure composite. The heat and pressure applied during the fifth operation S910 may, for example, be performed with static presses (e.g., that move an upper and/or lower heated platen vertically), or via a rolling press having upper and lower belts that apply pressure as the upper floor subassembly 230 (or components thereof) are moved by the belts through a heated environment. In a sixth operation S912, the upper floor subassembly 230 is then cooled to room temperature.

In subsequent operations, the upper floor subassembly 230 is further processed. In a seventh operation S914, after the upper floor subassembly 230 is formed, flatness tolerance (e.g., flatness) of the upper floor subassembly 230, if appropriate, may be subsequently corrected (e.g., using a press, rolling, and/or extruding type processes). In an eighth operation S916, the upper floor subassembly 230 is machined. For example, the upper floor subassembly 230 may be machined to achieve a desired outer profile by cutting peripheral edges of its various components (e.g., lower plate 232, upper plate 234, outboard structures 240, etc.) to be coextensive with each other and to form outboard edges 330a, a forward edge 330b, and/or a rearward edge 330c of the upper floor subassembly 230. The upper floor subassembly 230 may also be machined to facilitate the coupling of other structures thereto, for example, by machining apertures or other mounting features into and/or through the upper floor subassembly 230. Such machining may be performed, for example, with a cutting blade, drill bit, CNC router, water jet, laser cutter, or other suitable machining device. Instead, or additionally, the various components of the upper floor subassembly may be machined prior to the first operation S902. The eighth operation S916 occurs prior to or after the correcting of the flatness tolerance of the upper floor subassembly 230. In a ninth operation S918, the upper floor subassembly 230 is then coupled to other structures of the vehicle 100, such as the intermediate floor subassembly 220 or the sill assembly 102 to form the inner floor assembly 110, or other body structure. In a tenth operation S920, other finished structures and/or vehicle components, such as a vehicle seat, are coupled to the upper floor subassembly 230.

As shown in FIGS. 10-14, an upper floor subassembly 1430 is configured substantially similar to the upper floor subassembly 230 but uses other types of adhesives instead of or in addition to the film adhesives discussed above. For example, a lower adhesive layer 1071 couples the lower surface 636d of the core 236 to the lower plate 232, an upper adhesive layer 1172 couples the upper surface 636e of the core 236 to the upper plate 234, and lower adhesive beads 1173 and upper adhesive beads 1274 (lower and upper beads of adhesive) couple the lower surface 642 of the outboard structure 240 to the lower plate 232 and couple the upper surface 344 of the outboard structure 240 to the upper plate 234.

The lower adhesive layer 1071 and/or the upper adhesive layer 1172 may be a film adhesive, or may be a liquid or paste adhesive that is applied to the core 236. For example, as shown in FIG. 15, when the core 236 has a honeycomb structure, or other structure having a discontinuous upper surface, the lower adhesive layer 1071 or the upper adhesive layer 1172 is applied to the edges 1536$f$ (e.g., upper and lower edges) of vertical walls that define the cells 1536$g$ of the honeycomb structure of the core 236. By applying the adhesive to the edges 1536$f$ of the vertical walls defining the cells 1536$g$, the amount of adhesive used may be lessened and the resultant weight of the upper floor subassembly 230 lessened, as compared to using a film or other uninterrupted type of adhesive. The lower adhesive layer 1071 and the upper adhesive layer 1172, thereby, include adhesive only where the core 236 contacts the lower plate 232 or upper plate 234 and regions immediately therearound. The lower adhesive layer 1071 and the upper adhesive layer 1172 may be considered substantially continuously coupled to the lower plate 232 and the upper plate 234, respectively, despite the adhesive being interrupted above/below the cells 1536$g$ (i.e., between the edges 1536$f$ of the vertical walls).

Figure 16:
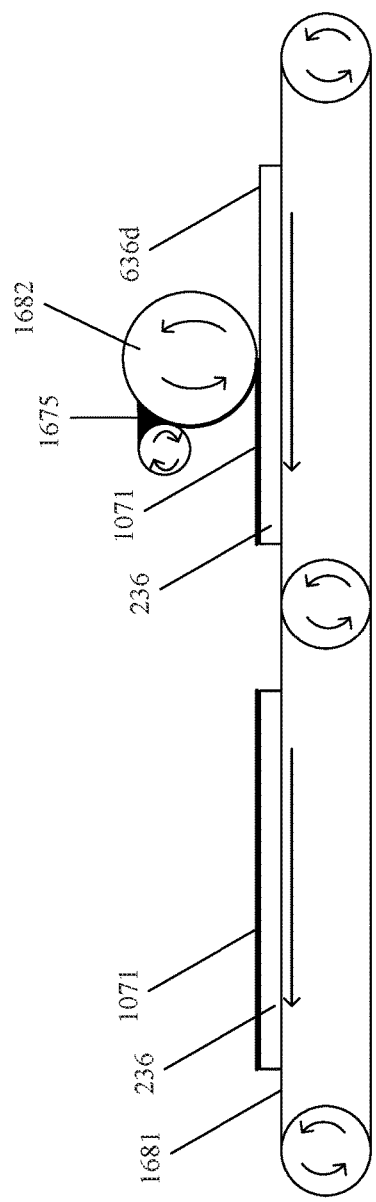
FIG. 16 is a side view of the partial upper floor subassemblies shown in FIGS. 10 and 15 with the adhesive layer having been applied and being applied to the core.

With reference to FIG. 16, the liquid or paste adhesive may be applied to the core 236, for example, using a roll coating process in a mass production environment. The cores 236 for the upper floor subassemblies 230 are carried successively by a conveyer 1681, and an adhesive 1675 (e.g., paste or liquid adhesive) is distributed via one or more rollers 1682 to the then-current upper surface of the core 236 (e.g., the lower surface 636$d$, as shown). For example, the roll coating process may be a reverse roll coating process in which the roller 1682 rotates in an opposite direction of travel of the conveyer 1681, so as to wipe or otherwise apply the adhesive 1675 to the core 236.

The lower adhesive beads 1173 (e.g., first group of beads) couple the upper surface of the lower plate 232 to the lower surface 642 of the outboard structure 640 (see, e.g., FIG. 11), and the upper adhesive beads 1274 (e.g., second group of beads) couple the upper surface 644 of the outboard structure 240 to a lower surface of the upper plate 234 (see, e.g., FIG. 12). The lower adhesive beads 1173 and the upper adhesive beads 1274 are of a liquid or paste adhesive. The lower adhesive beads 1173 and the upper adhesive beads 1274 may, for example, extend in the direction of elongation of the outboard structure 240. The lower adhesive beads 1173 and the upper adhesive beads 1274 are of a liquid or paste adhesive (e.g., heat curable).

When the outboard structure 240 is placed on the lower adhesive beads 1173, the adhesive thereof spreads laterally between the upper surface of the lower plate 232 and the lower surface 642 of the outboard structure 640 (see, e.g., FIGS. 12-13). When spread, the adhesive of the lower adhesive beads 1173 may merge with (e.g., bleed into) the adhesive of adjacent ones of the lower adhesive beads 1173 to form a coating (e.g., a substantially continuous coating) of adhesive 1473' (see, e.g., FIG. 14), or may maintain a slight lateral gap between the lower adhesive beads 1173 (see, e.g., FIGS. 12-13). Similarly, as the upper plate 234 is first placed and subsequently pressed on the upper adhesive beads 1274, the adhesive of the upper adhesive beads 1274 spreads laterally and may merge with (e.g., bleed into) the adhesive of adjacent ones of the upper adhesive beads 1274 to form a coating (e.g., a substantially continuous coating) of adhesive 1474' (see, e.g., FIG. 14), or may maintain a slight lateral gap between the upper adhesive beads 1274 (see, e.g., FIG. 13). Even if a lateral gap exists between the lower adhesive beads 1173 or the upper adhesive beads 1274 in the finished upper floor subassembly 1430, the lower surface 642 and the upper surface 644 of the outboard structure 240 may still be considered substantially continuously coupled to the lower plate 232 and the upper plate 234, respectively.

Each of the lower adhesive beads 1173 and the upper adhesive beads 1274 are provided in such a volume as to couple the mating surfaces of the outboard structure 240 with the lower plate 232 and the upper plate 234, while also providing the upper floor subassembly 1430 with a substantially constant thickness. Thus, the volume of the lower adhesive beads 1173 and the upper adhesive beads 1274 and the thickness of the outboard structure 240 are configured cooperatively relative to the thickness of the lower adhesive layer 1071, the upper adhesive layer 1172, and the core 236 to achieve a substantially constant thickness throughout the upper floor subassembly 1430.

Figure 17:
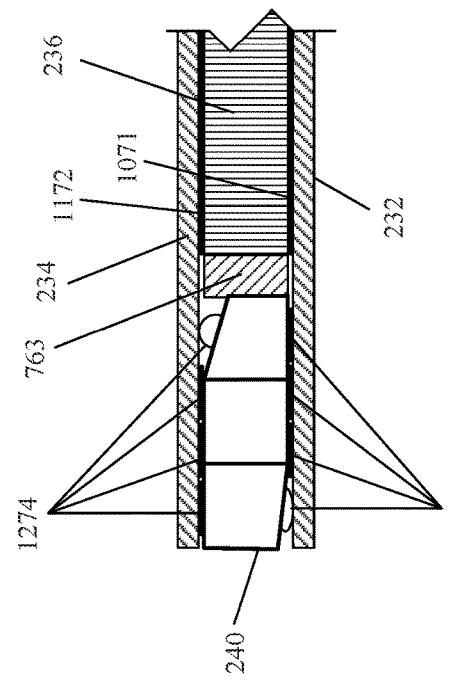
FIG. 17 is a partial cross-sectional view of the upper floor subassemblies shown in FIG. 15 in which an outboard structure has dimensional variance.

Furthermore, the lower adhesive beads 1173 and the upper adhesive beads 1274 may be provided with a sufficient size to account for warping (e.g., twisting) or other dimensional variations of the outboard structure 240 caused by an extrusion process thereof, while still coupling (e.g., substantially continuously coupling) the outboard structure 240 to the lower plate 232 and the upper plate 234. For example, as shown in FIG. 17, the outboard structure 240 may warp or twist resulting in a varied thickness moving in the inboard-outboard direction (i.e., transverse to the direction of extruding). Depending on the thickness and slope of the outboard structure 240 at varying inboard-outboard locations, the lower adhesive beads 1173 and the upper adhesive beads 1274 spread laterally (i.e., in the inboard-outboard direction) to varying degrees. To ensure a constant thickness of the upper floor subassembly 1430 despite such possible dimensional variations of the outboard structure 240, the outboard structure 240 has a nominal thickness (i.e., design thickness) that is less than the thickness of the core 236, since the core 236 dimensions may be more easily controlled (e.g., by machining, extruding, etc.). The resultant volumes between the outboard structures 240 and the lower plate 232 and the upper plate 234 are filled, wholly or partially, by the adhesive of the lower adhesive beads 1173 and the upper adhesive beads 1274, respectively. While lateral gaps of varying degree may exist between the lower adhesive beads 1173 that are adjacent to each other or the upper adhesive beads 1274 that are adjacent to each other, the lower surface 642 and the upper surface 644 of the outboard structure 240 may still be considered to be substantially continuously coupled to the lower plate 232 and the upper plate 234, respectively.

Figure 18:
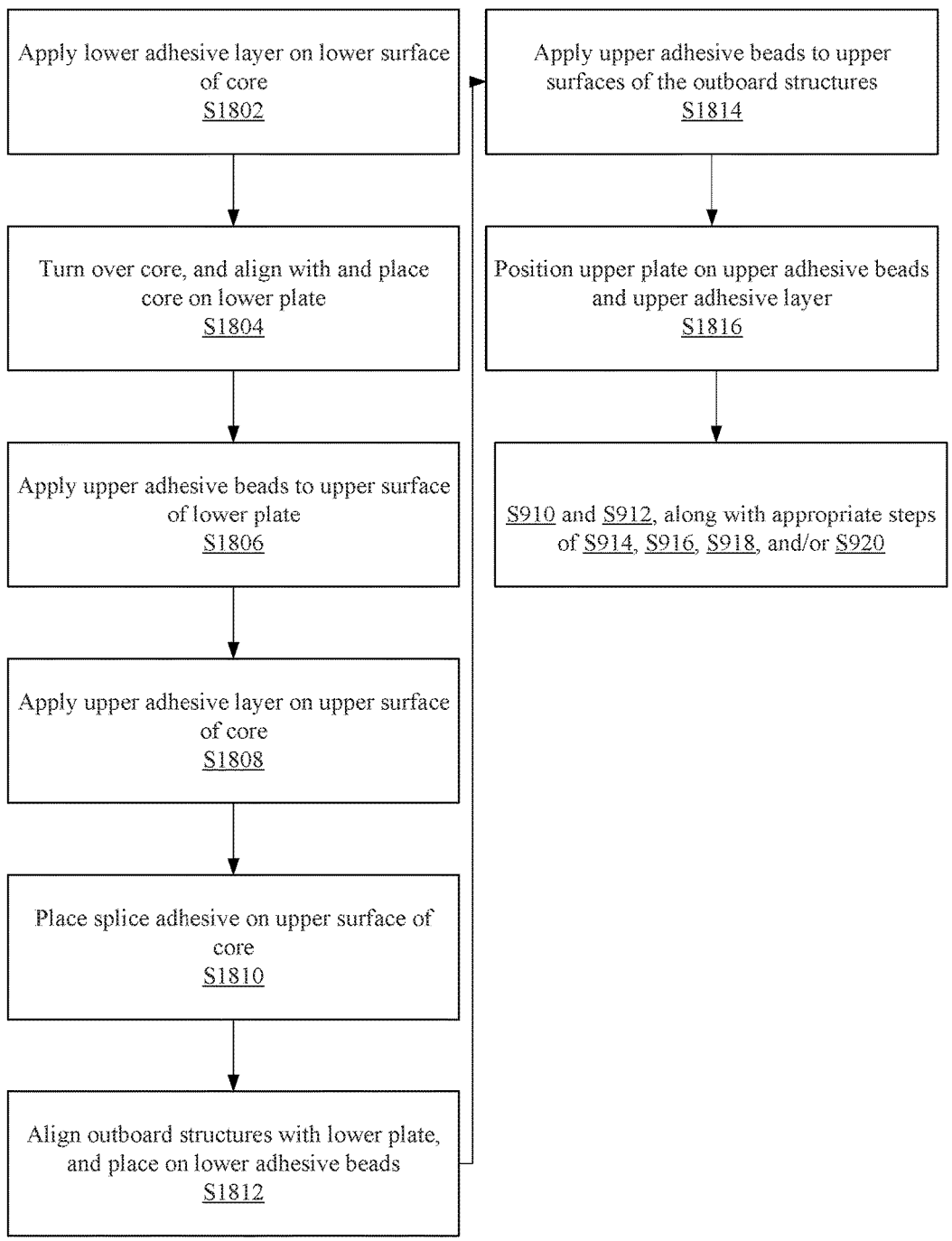
FIG. 18 is a flow chart for the second method of assembling the floor structure shown in FIGS. 2 and 15.
Figure 19:
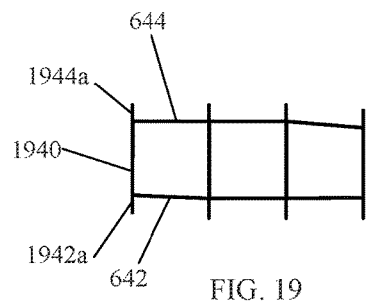
FIG. 19 is a cross-sectional view of another outboard structure shown in a first state.

With reference to FIG. 18, a variation of the method described above and shown in FIG. 9 is used with paste or liquid adhesives. In a first operation S1802, the lower adhesive layer 1071 (e.g., paste, liquid, or film adhesive layer) is applied to the lower surface 636$d$ of the core 236, while facing upward (see FIG. 10). In a second operation S1804, the core 236 is turned over, then aligned with and placed on the lower plate 232. In a third operation S1806, the lower adhesive beads 1173 are placed on the lower plate 232 (see FIG. 11). In a fourth operation S1808, the upper adhesive layer 1172 is applied to the upper surface 636$e$ of the core 236, which may occur before, after, or simultaneously with the third operation S1806. In a fifth operation S1810, the splice adhesive 763 is positioned on the lower plate 232, which may occur before, after, or simultaneously with the third operation S1806 and/or the fourth operation S1808. In a sixth operation S1812, the outboard structures 240 are aligned with the lower plate 232 and placed on the lower adhesive beads 1173, which occurs after the third operation S1806, but may occur before, after, or simultaneously with the fourth operation S1808 and/or the fifth operation S1810. In a seventh operation S1814, the upper adhesive beads 1274 are applied to the upper surfaces 644 of the outboard structures 240, which occurs after the sixth operation S1812. In an eighth operation S1816, the upper plate 234 is aligned with and positioned on the upper adhesive beads 1274 and the upper adhesive layer 1172. Operations S910 (i.e., apply heat and pressure for a duration to the layered arrangement to form the upper floor subassembly 1430) and S912 (i.e., cooling the upper floor subassembly 130) are then performed, as described previously, along with any appropriate operations of S914 (i.e., correcting the flatness tolerance of the upper floor subassembly 1430), S916 (i.e., machining the upper floor subassembly 1430), S918 (coupling the upper floor subassembly 1430 to the intermediate floor subassembly 220 or other structures of the vehicle), and/or S920 (coupling other finished structures to the upper floor subassembly 1430).

Figure 20:
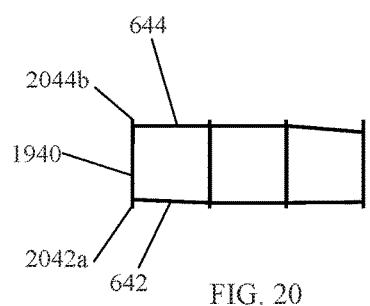
FIG. 20 is a cross-sectional view of the outboard structure of FIG. 19 shown in a second state.

With reference to FIGS. 19-24, according to an alternative embodiment, an upper floor subassembly 2230 (shown partially in FIG. 22) is configured substantially similar to the upper floor subassemblies 230 and 1430 described previously, but includes outboard structures 1940 in place of the outboard structures 240. The outboard structure 1940 is configured substantially similar to the outboard structure 240 but includes a plurality of lower protrusions 1942a (e.g., ribs) that extend downward from the lower surface 642 a predetermined height, and a plurality of upper protrusions 1944a (e.g., ribs) that extend upward from the upper surface 644 the predetermined height or another height. The lower protrusions 1942a and the upper protrusions 1944a may, for example, be formed as the outboard structure 1940 is extruded. After extruding, the lower protrusions 1942a and the upper protrusions 1944a may be machined to account for any dimensional variation (e.g., warping, twisting, etc.) resulting from the extruding process that formed the outboard structure 240. As shown in FIG. 20, after machining, lower edges 2042b of the lower protrusions 1942a define a lower plane along the length and width of the outboard structure 240, while upper edges 2044b of the upper protrusions 1944a define an upper plane that is substantially parallel with the lower plane. The thickness of the outboard structure 240 resulting therefrom is that between the lower and upper planes defined by the lower edges 2042b and the upper edges 2044b of the lower protrusions 1942a and the upper protrusions 1944a.

Figure 21:
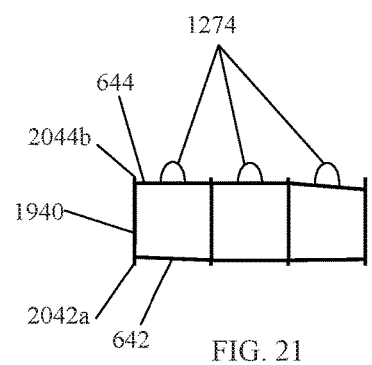
FIG. 21 is a cross-sectional view of the outboard structure shown in FIG. 20 with adhesive beads applied thereto.
Figure 22:
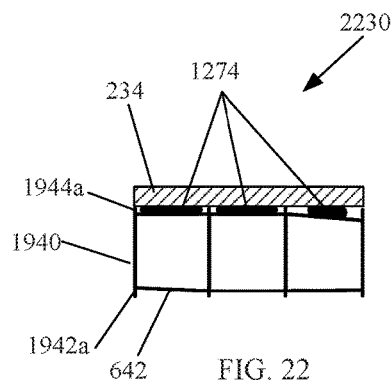
FIG. 22 is a partial cross-sectional view of an upper floor subassembly incorporating the outboard structure shown in FIGS. 20-21.

Adhesive beads (e.g., upper adhesive beads 1274) are positioned between the lower protrusions 1942a and the upper protrusions 1944a in the manner described previously. As shown in FIGS. 21 and 22, the upper adhesive beads 1274 are positioned on the upper surface 644 between the upper protrusions 1944a of the outboard structure 240. As the upper plate 234 is positioned on the upper adhesive beads 1274 and the upper edges 2044b of the upper protrusions 1944a engage the upper plate 234, the adhesive thereof spreads laterally between the upper protrusions 1944a by varying amounts depending on the vertical gap between the upper plate 234 (i.e., at the upper plane formed by the upper edges 2044b of the upper protrusions 1944a) and the upper surface 644. Lower adhesive beads 1173 (not shown) may be similarly positioned and spread between the lower protrusions 1942a. The upper floor subassembly 2230, which incorporates the outboard structures 1940, may be assembled in accordance with the process described with respect to FIG. 18, or suitable variation thereof.

Figure 23:
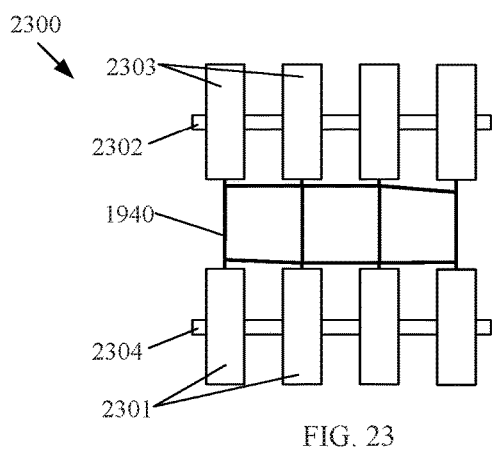
FIG. 23 is a front view of a machine transforming the outboard structure from the state shown in FIG. 19 into the state shown in FIG. 20.
Figure 24:
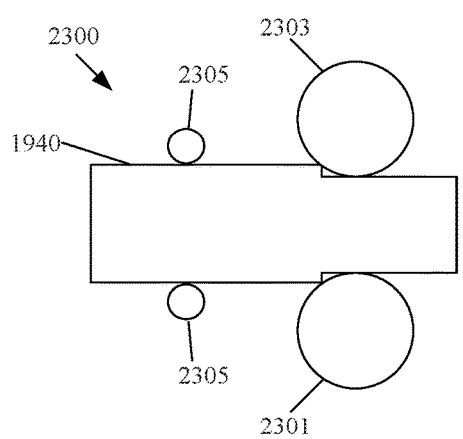
FIG. 24 is a side view of the machine shown in FIG. 23 transforming the outboard structure from the state shown in FIG. 19 into the state shown in FIG. 20.

With reference to FIGS. 23-24, as referenced above, the outboard structures 1940 are machined to form the lower edges 2042b and the upper edges 2044b of the lower protrusions 1942a and the upper protrusions 1944a with parallel lower and upper planes. Each outboard structure 1940 is fed into a cutting machine 2300 having a plurality of lower blades 2301 corresponding in number to the plurality of lower protrusions 1942a and which rotate about a common axis, such as being coupled to a lower rigid shaft 2302. The machine additionally includes a plurality of upper blades 2303 corresponding in number to the plurality of upper protrusions 1944a, which rotate about another common axis, such as being coupled to an upper rigid shaft 2304. The lower rigid shaft 2302 and the upper rigid shaft 2304 are spaced apart, such that tips of the lower blades 2301 and the upper blades 2303 are spaced apart a distance to achieve a desired thickness of the outboard structure 1940. As each outboard structure 1940 is fed through the cutting machine 2300 (e.g., between rollers 2305), the lower blades 2301 and the upper blades 2303 remove material from the lower protrusions 1942a and the upper protrusions 1944a to form the lower edges 2042b and the upper edges 2044b defining the lower and upper planes. The thickness of the outboard structure 1940 resulting therefrom (i.e., between the lower and upper planes defined by the lower edges 2042b and the upper edges 2044b) may, for example, be substantially equal to the thickness of the core 236.

As referenced above, alternative upper floor subassemblies may be configured substantially similar to the upper floor subassemblies 230, 1230, and 2230 discussed above but which include a lower plate, upper plate, and core with varying thicknesses, as opposed to the lower plate 232, the upper plate 234, and/or the core 236 having constant thicknesses. The resultant upper floor subassemblies may still have a substantially constant thickness and a planar upper surface, or may vary slightly in thickness to have a slightly curved or staggered upper surface.

With reference to FIG. 25, which is a cross-sectional detail view similar to FIG. 6, an upper floor subassembly 2530 includes a lower plate 2532, an upper plate 2534, a core 2536, and an outboard structure 2540. The upper floor subassembly 2530 additionally includes a second outboard structure on its right (not shown) and may also include a forward structure and a rearward structure (not shown; refer to the discussion of the forward structure 238 and the rearward structure 239 above). As compared to the upper floor subassembly 230, the lower plate 2532 and the upper plate 2534 are configured to bear a greater portion of outboard loading than the lower plate 232 and the upper plate 234, and the outboard structure 2540 bears a lesser portion of the outboard loading than the outboard structure 240. In particular, the lower plate 2532 and the upper plate 2534 have a greater thickness at outboard regions thereof as compared to the lower plate 232 and the upper plate 234, respectively, while the outboard structure 2540 has a lesser thickness than the outboard structure 240. The upper floor subassembly 2530 has the same or comparable thickness as the upper floor subassembly 230. The outboard structure 2540 may also have a lesser width (e.g., approximately 50 mm) than the outboard structure 240, and correspondingly changed ratios of width to thickness and to length.

The lower plate 2532 thins in a stepped fashion moving in an inboard direction. For example, the lower plate 2532 may have regions of four different thicknesses on its left side (shown) and on its right side (not shown). An outboard region 2532a is the thickest region (e.g., having a thickness of approximately 6 mm and a width of approximately 75 mm). A first inboard region 2532b is adjacent the outboard region 2532a and is the next thickest (e.g., having a thickness of approximately 4.5 mm and a width of approximately 75 mm). A second inboard region 2532c is adjacent the first inboard region 2532b and is the next thickest (e.g., having a thickness of approximately 3.0 mm and a width of approximately 75 mm). An innermost region is adjacent to the second inboard region 2532c and an opposite second inboard region (not shown), and is the thinnest region (e.g., having a thickness of approximately 1.5 mm and a width of approximately 600 mm).

The upper plate 2534 similarly includes an outboard region 2534a, a first inboard region 2534b, a second inboard region 2534c, and an innermost region 2534d of corresponding thicknesses and lateral positioning. According to other embodiments, the lower plate 2532 and the upper plate 2534 may include more or fewer regions of different thicknesses, have regions of different thicknesses (e.g., more or less than 6.0 mm, 4.5 mm, etc.), and/or have different widths (e.g., the various regions have widths that are more or less than 75 mm and/or different from each other).

The core 2536 includes regions of various thicknesses that correspond to the varying thicknesses of the lower plate 2532 and the upper plate 2534, such that the upper floor subassembly 2530 may have a substantially constant thickness. For example, the core 2536 may include an outboard region 2536a that is laterally adjacent to and/or coupled to the outboard structure 2540, is positioned vertically between the outboard regions 2532a, 2534a of the lower plate 2532 and the upper plate 2534, respectively, and is the thinnest (e.g., 13 mm). A first inboard region 2536b is positioned laterally adjacent to the outboard region 2536a, is positioned vertically between the first inboard regions 2532b, 2534b of the lower plate 2532 and the upper plate 2534, respectively, and is the next thinnest (e.g., 16 mm). A second inboard region 2536c is positioned laterally adjacent to the first inboard region 2536b, is positioned vertically between the second inboard regions 2532c, 2534c of the lower plate 2532 and the upper plate 2534, respectively, and is the next thinnest (e.g., 19 mm). Finally, an innermost region 2536d is positioned laterally adjacent to the second inboard region 2536c, is positioned vertically between the second inboard regions 2532c, 2534c of the lower and upper plates 2532, 2534, respectively, and is the thickest (e.g., 22 mm). The core 2536 is made of a material as described previously for the core 236 (e.g., honeycomb structure, foam, wood, etc.).

Each of the lower plate 2532 and the upper plate 2534 may be manufactured with varying thicknesses according to various methods. For simplicity, the various methods that follow are discussed with reference only to the lower plate 2532, or variations thereof, but are also applicable for manufacturing the upper plate 2534.

In a first method, the lower plate 2532 is machined or milled from a single sheet or blank of material (e.g., 2024, 6062, or 7075 aluminum). The blank has a constant thickness equal to that of the thickest region (e.g., the outboard region 2532a). The blank has a peripheral shape equal to that of the finished upper floor subassembly 2530, or of the dimensions of the sandwich structure composite prior to machining to achieve the final dimensions of the finished upper floor subassembly 2530. The blank is machined or milled (e.g., via a chemical milling process) to achieve regions of desired thickness.

In a second method, the lower plate 2532 is rolled from one or more sheets or blanks of material. During a strip rolling process, one or more rollers presses the blank as it is moved past the rollers, thereby causing the material to flow generally perpendicular to the rolling direction, which thins and widens the blank in the region being pressed. The rollers may be arranged successively and in overlapping regions, so as to flow the material outwardly to achieve a region of desired thickness and width. Multiple blanks may thereafter be coupled together at their edges (e.g., via spin welding) to form the lower plate 2532.

The strip rolling process, by itself, provides a cross-sectional profile that is constant along the length (i.e., in the fore-aft direction) of the lower plate 2532. However, the blanks and/or the lower plate 2532 before and/or after the strip rolling process may undergo a flexible rolling process in which rollers vary pressure applied to the blanks as they pass, which achieves variable thickness along the length of the lower plate 2532.

With reference to FIG. 26, as an alternative to the lower plate 2532 being formed from a continuous blank, a lower plate 2632 may be formed from one or more sheets of material that are overlaid and coupled to each other to achieve regions of desired thickness and width. A left side of the lower plate 2632 includes an outboard region 2632a, a first inner region 2632b, a second inner region 2632c, and an innermost region 2632d that step down in thickness (refer above to the discussion of the lower plate 2532 and its regions 2532a, 2532b, 2532c, and 2532d). The various regions are formed by a lower sheet 2632e, a first inner sheet 2632f, a second inner sheet 2632g, and an innermost sheet 2632h, which have different widths and are stacked on top of and coupled to each other (e.g., bonded or adhered to each other using an adhesive). The sheets 2632e, 2632f, 2632g, and 2632h may, for example, be formed of blanks of a common material (e.g., 2024, 6062, or 7075 aluminum) and/or common thickness (e.g., 1.5 mm). Alternatively, the sheets 2632e, 2632f, 2632g, and 2632h may have thicknesses and/or materials different from each other (e.g., different grades or alloys of aluminum).

With reference to FIG. 27, as another alternative to the lower plate 2532, a lower plate 2732 may be formed from one or more blanks or sheets of varied thickness that are coupled at their edges to each other to achieve regions of desired thickness and width. A left side of the lower plate 2732 includes an outboard region 2732a, a first inner region 2732b, a second inner region 2732c, and an innermost region 2732d that step down in thickness (refer above to the discussion of the lower plate 2532 and its regions 2532a, 2532b, 2532c, and 2532d). The various regions are formed by an outboard sheet 2732e, a first inner sheet 2732f, a second inner sheet 2732g, and an innermost sheet 2732h, which are coupled to each other at their edges (e.g., via spin welding). The sheets 2732e, 2732f, 2732g, 2732h may, for example, be formed of blanks of a common material (e.g., 2024, 6062, or 7075 aluminum, or other suitable material) and desired varying thickness (e.g., equal increments in thickness), or may be formed of different materials (e.g., different grades or alloys of aluminum).

With reference to FIG. 28, as an alternative to the upper floor subassembly 2530 in which the outboard structure 2540 is arranged between the outboard regions 2532a, 2534a of the lower plate 2532 and the upper plate 2534, an upper floor subassembly 2830 may instead have the outboard regions 2532a, 2534a of the lower plate 2532 and the upper plate 2534 coupled directly to each other at mating surfaces thereof (e.g., bonded or adhered using an adhesive). The upper floor subassembly 2830, thereby, omits the outboard structures 2540 from the upper floor subassembly 2530. The upper floor subassembly 2830 may, instead of including the lower plate 2532 and the upper plate 2534, include the lower plate 2632 or the lower plate 2732, and similarly formed upper plates.

Referring again to FIG. 25, as referenced above, in embodiments of the upper floor subassembly (e.g., 2530, 2830) having lower and upper plates (e.g., 2532 and 2534, 2632, 2730) of varying thickness, the core 2536 also varies in thickness. The regions 2536a, 2536b, 2536c, 2536d of the core 2536 having varied thickness may be formed, for example, from a core 2536 that is unitary and machined or otherwise reduced to an appropriate thickness, as is shown in FIG. 25.

Figure 29:
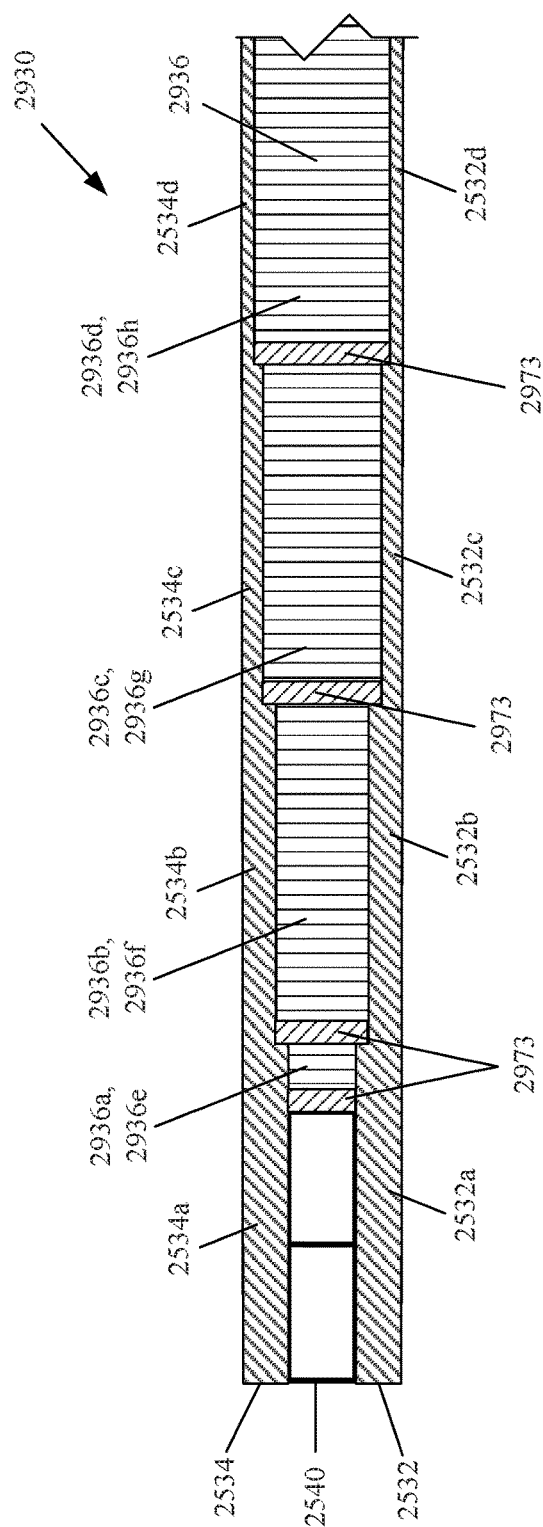
FIG. 29 is a partial cross-sectional view of an upper floor subassembly according to another embodiment.

Referring to FIG. 29, as a first alternative to the core 2536, an upper floor subassembly 2930 includes a core 2936 having multiple core members of varying thickness to achieve different regions of varying thickness (refer to the discussion of the regions 2536a, 2536b, 2536c, 2536d of the core 2536 above). An outboard region 2936a of the core 2936 is formed by an outboard core member 2936e that is the thinnest of the core members. A first inner region 2936b of the core 2936 is formed by a first inner core member 2936f having the next least thickness. A second inner region 2936c of the core 2936 is formed by a second inner core member 2936g having the next least thickness. Finally, an innermost region 2936d of the core 2936 is formed by an innermost core member 2936h that is the thickest of the core members. Adjacent core members are coupled to each other with a splice adhesive 2973. Each of the core members 2936e, 2936f, 2936g, 2936h may be formed of materials as described previously (e.g., a honeycomb structure, foam, wood, etc.). As described above with respect to the splice adhesive 763, the splice adhesive 2973 may be configured to expand into the partial cells of the honeycomb structure forming each of the core members 2936e, 2936f, 2936g, 2936h.

Figure 30:
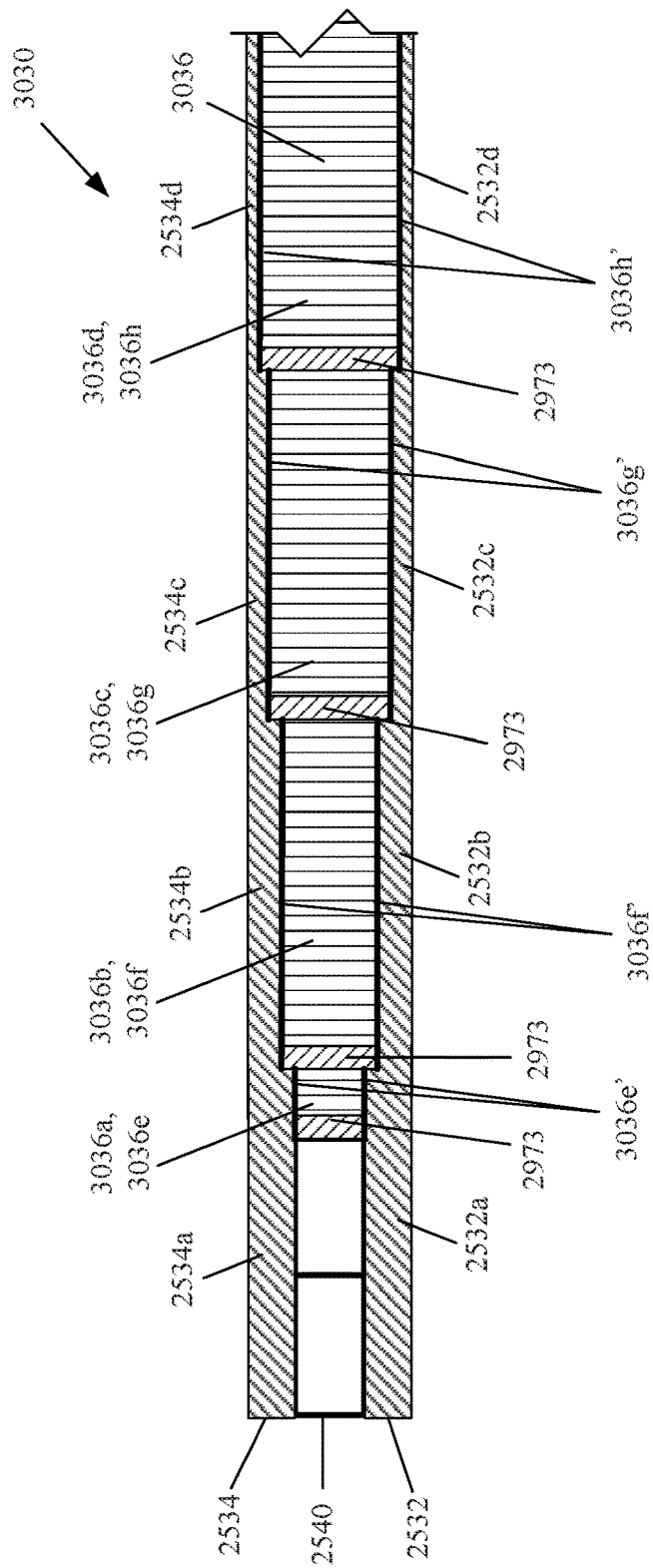
FIG. 30 is a partial cross-sectional view of an upper floor subassembly according to another embodiment.

Referring to FIG. 30, as a second alternative to the core 2536, an upper floor subassembly 3030 includes a core 3036 having multiple core members of varying thickness and upper and lower plate members associated with each core member to achieve different regions of varying thickness (refer again to the discussion of the regions 2536a, 2536b, 2536c, 2536d of the core 2536 above). An outboard region 3036a of the core 3036 is formed by an outboard core member 3036e having upper and lower plates 3036e' coupled thereto (e.g., bonded or adhered using adhesives). A first inner region 3036b of the core 3036 is formed by a first inner core member 3036f having upper and lower plates 3036f' coupled thereto. A second inner region 3036c of the core 3036 is formed by a second inner core member 3036g having upper and lower plates 3036g' coupled thereto. Finally, an innermost region 3036d of the core 3036 is formed by an innermost core member 3036h having lower and upper plates 3036h' coupled thereto. Each of the core members 2936e, 2936f, 2936g, 2936h may be formed of materials as described previously (e.g., a honeycomb structure, foam, wood, etc.). Each of the plates 3036e', 3036f, 3036g', 3036h' may be formed of the same material forming the lower plate 2532 (e.g., 2024, 6062, or 7075 aluminum, or other suitable material), or other suitable sheet material. Adjacent core members are coupled to each other with the splice adhesive 2973.

Figure 31:
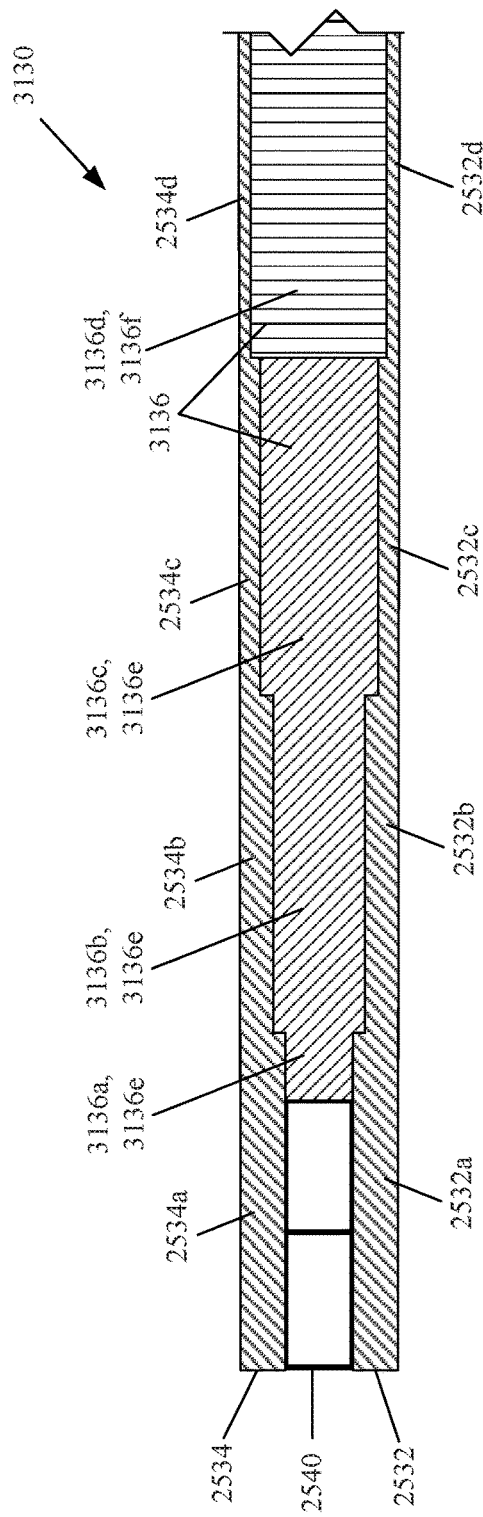
FIG. 31 is a partial cross-sectional view of an upper floor subassembly according to another embodiment.

Referring to FIG. 31, as a third alternative to the core 2536, an upper floor subassembly 3130 includes a core 3136 having multiple core members of different materials to achieve different regions of varying thickness (refer again to the discussion of the regions 2536a, 2536b, 2536c, 2536d of the core 2536 above). An outboard core member 3136e is, for example, a foam material and forms an outboard region 3136a, a first inner region 3136b, and a second inner region 3136c of the core 3136 of different thicknesses. An inner core member 3136f is, for example, a honeycomb material and forms an inner region 3136d of the core 3136 having a constant thickness. The outboard core member 3136e may, for example, be injected and cured between the lower plate 2532 and the upper plate 2534 and into the partial cells of the honeycomb structure of the inner core member 3136f, or may be coupled thereto with a splice adhesive (not shown).

Referring to FIG. 32, an upper floor subassembly 3230 includes a lower plate 3232 and an upper plate 3234, which thin in a tapered or gradual fashion moving inboard. A core 3236 thickens in a corresponding tapered or gradual fashion, such that the upper floor subassembly 3230 has a substantially constant thickness. Each of the lower plate 3232 and the upper plate 3234 may, for example, be formed of a tailor rolled blank of suitable material (e.g., 2024, 6062, or 7075 aluminum, or other suitable material) having a thickness that reduces moving inboard from outboard edges thereof, or may be formed from multiple tailor rolled blanks (e.g., blanks that reduce in thickness moving inboard and are welded to each other at inner edges thereof). The lower plate 3232 and the upper plate 3234 may have a constant thickness at inboard locations thereof. The core 3236 may be formed of a single material (e.g., honeycomb structure, foam, wood, etc.), or may include an outboard core member of foam having variable thickness corresponding to the lower plate 3232 and the upper plate 3234 and an inboard core member of a honeycomb structure having a constant thickness and coupled at its edge to the outboard core member (e.g., similar to the core 3136).

Referring to FIG. 33, an upper floor subassembly 3330 includes a lower plate 3332 and an upper plate 3334, which thin in a stepped (as shown) or tapered (not shown) manner moving inboard. The lower plate 3332 and the upper plate 3334 are, however, spaced apart a constant distance by the core 3336 and the outboard structure 2540. As a result, the upper floor subassembly 3330 has a variable thickness that reduces gradually moving in an inboard direction, for example, from approximately 25-34 mm at an outboard edge to approximately 16-25 mm at an innermost region. Carpet, fabric, foam, or other materials may be arranged above the upper plate 3334, so as to camouflage, mask, or otherwise conceal the upper floor subassembly 3330 having a varied thickness and/or non-planar upper surface.

The lower plate 3332 and the upper plate 3334 may be manufactured according to the various methods described above for the lower plate 2532 (e.g., machining and/or chemical milling). Alternatively, the lower plate 3332 and/or the upper plate 3334 may be substituted for plates constructed in the manner of the lower plate 2632 (i.e., having sheets stacked on top of and coupled to each other), or the lower plate 2732 (i.e., having sheets of varying thickness that are welded to each other).

Figure 34:
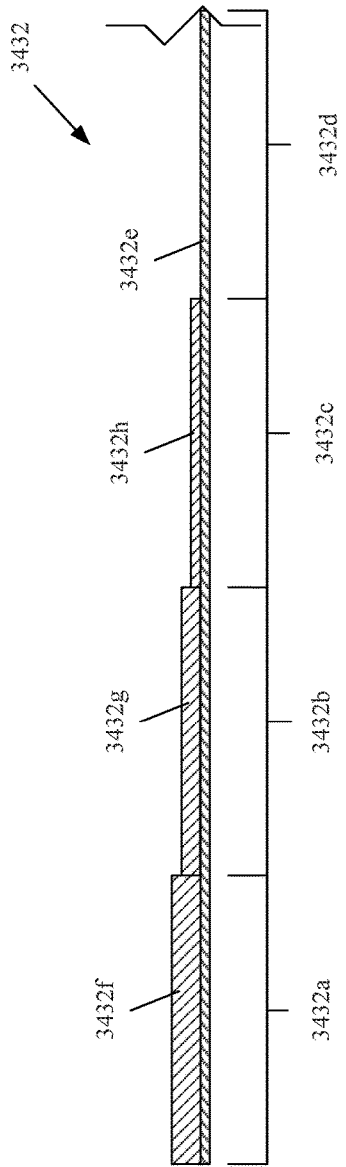
FIG. 34 is a partial cross-sectional view of a lower plate according to another embodiment.

Referring to FIG. 34, according to a still further alternative, the lower plate 3332 and/or the upper plate 3334 may be substituted for a plate 3432. The plate 3432 is configured with regions 3432a, 3432b, 3432c, 3432d of varying thickness (refer to the discussion of regions 2532a, 2532b, 2532c, and 2532d of the lower plate 2532 above). The plate 3432 includes a base or innermost sheet 3432e, which forms the thickness of the innermost region 3432d of the plate 3432 and may span the width of the upper floor subassembly 3330. The plate 3432 additionally includes an outboard sheet 3432f, a first inner sheet 3432g, and a second inner sheet

3432*h*, which are of decreasing thickness (e.g., 4.5 mm, 3 mm, and 1.5 mm, respectively). The sheets 3432*f*, 3432*g*, 3432*h* are welded together at adjacent edges thereof, and are stacked on top of and coupled to the base sheet 3432*e* (e.g., bonded or adhered thereto with an adhesive). The base sheet 3432*e* may, for example, be made from a higher grade and/or more expensive material (e.g., aluminum alloy) than each of the outboard sheet 3432*f*, the first inner sheet 3432*g*, and the second inner sheet 3432*h*.

Figure 35:
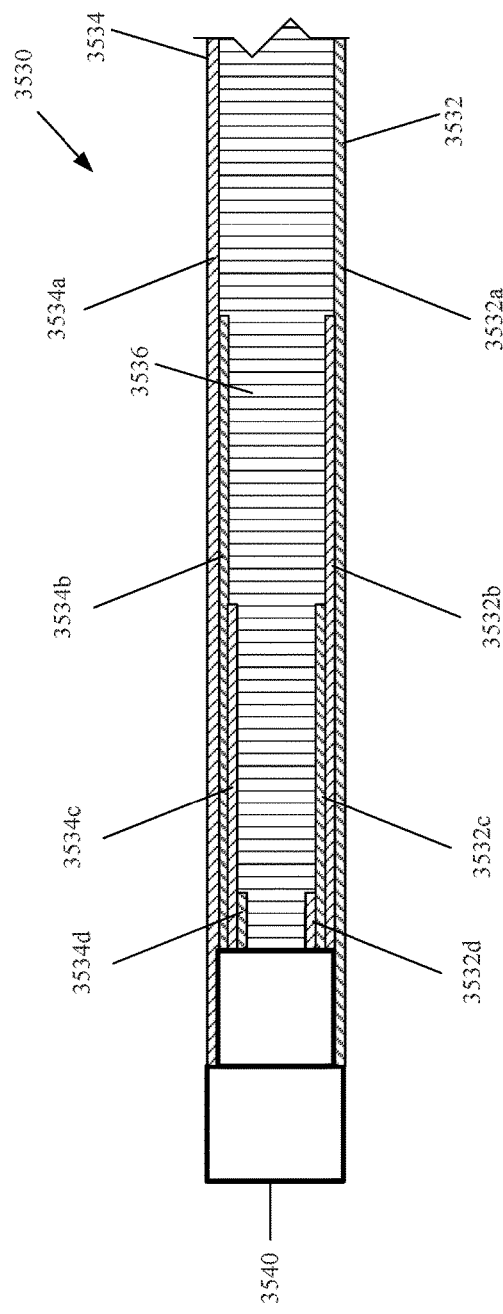
FIG. 35 is a partial cross-sectional view of an upper floor subassembly according to another embodiment.

Referring to FIG. 35, according to a still further embodiment, an upper floor subassembly 3530 includes outboard structures 3540 having variable thickness (e.g., narrowing in a stepped fashion moving inboard). The lower plate 3532 and the upper plate 3534 are configured with variable thickness to receive a portion (as shown) or all of the outboard structure 3540 therebetween, such that the upper floor subassembly 3530 has a constant thickness. The lower plate 3532 may, for example, be formed from a plurality of sheets stacked on top of and coupled to each other and the outboard structure 3540. In particular, a base sheet 3532*a* is coupled to a lower surface of a thin portion of the outboard structure 3540. A first inner sheet 3532*b*, a second inner sheet 3532*c*, and a third inner sheet 3532*d* of varying widths are stacked on top of and coupled to each other and the base sheet 3532*a*, and also abut and/or are coupled to an inward edge of the outboard structure 3540 (e.g., with an adhesive). In this manner, the lower plate 3532 varies in thickness, thinning in a stepped manner moving inboard from the outboard structure 3540. The upper plate 3534 is configured similar to the lower plate 3532. The core 3536 may be configured with variable thickness in the various manners described previously for other cores (e.g., 2536, 2936, 3036, 3136).

Figure 38:
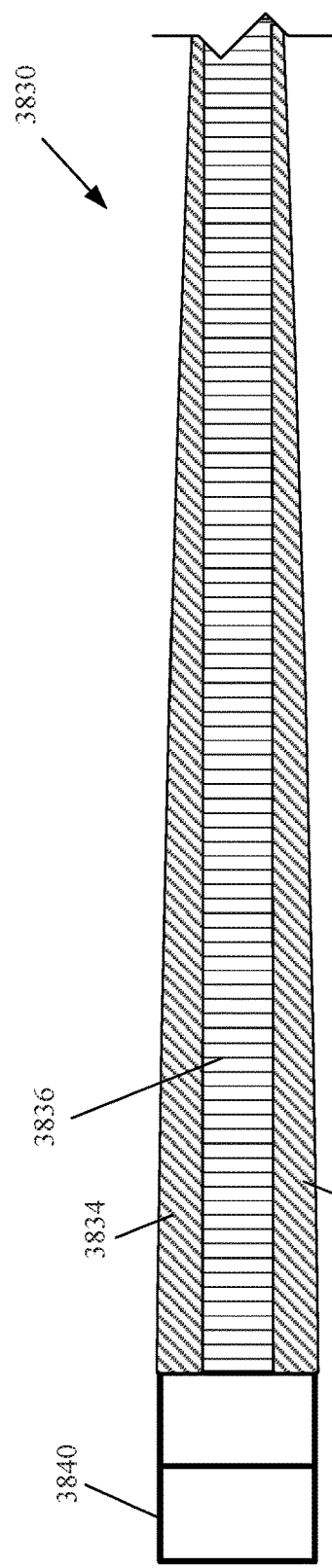
FIG. 38 is a partial cross-sectional view of an upper floor subassembly according to another embodiment.

Other embodiments of upper floor subassemblies having lower and upper plates that thin gradually, similar to the lower plate 3232, are depicted in FIGS. 36-38. As shown in FIG. 36, an upper floor subassembly 3630 includes lower and upper plates 3632, 3634 having flat outer surfaces and curved (or otherwise tapered) inner surfaces. The upper floor subassembly 3630 additionally includes a core 3636 (e.g., a multicomponent core) having an outboard core member of foam that tapers, and an inboard core member of a honeycomb structure of constant thickness. The lower and upper plates 3632, 3634 and the core 3636 abut and/or are coupled to an inward edge of the outboard structure 3640.

As shown in FIG. 37, an upper floor subassembly 3730 includes lower and upper plates 3732, 3734 having curved (or otherwise tapered) outer surfaces and curved (or otherwise tapered) inner surfaces. The upper floor subassembly 3730 additionally includes a core 3736 (e.g., a multicomponent core) having an outboard core member of foam that tapers, and an inboard core member of a honeycomb structure of constant thickness. The lower and upper plates 3732, 3734 and the core 3736 abut and/or are coupled to an inward edge of the outboard structure 3740.

As shown in FIG. 38, an upper floor subassembly 3830 includes lower and upper plates 3832, 3834 having curved (or otherwise tapered) outer surfaces and flat lower surfaces. The upper floor subassembly 3830 additionally includes a single component core 3836 of a honeycomb structure of constant thickness. The lower and upper plates 3732, 3734 and the core 3736 abut and/or are coupled to an inward edge of the outboard structure 3740.

For each of the embodiments discussed above, prior to assembling the lower plate and/or upper plate into the finished upper floor subassemblies, the plates may be subject to further treatments, such as heat treatment (e.g., to strengthen weld joints between blanks or sheets), solution heat treatment, quenching, annealing, galvanizing, coating, or other finished treating. Those plates that include adhesives, depending on the adhesive properties, may not be subject to certain further treatments.

Each embodiment of the upper floor subassemblies discussed in conjunction with FIGS. 25-38, which include various plate and core configurations with varied thicknesses, may be assembled according to the methods previously described with respect to FIG. 9 and FIG. 18 or variations thereof. For example, film adhesive, adhesive beads, and/or splice adhesives may be used in conjunction with heating and pressing as may be appropriate to couple (e.g., substantially continuously couple) mating surfaces of their respective components.

Figure 39:
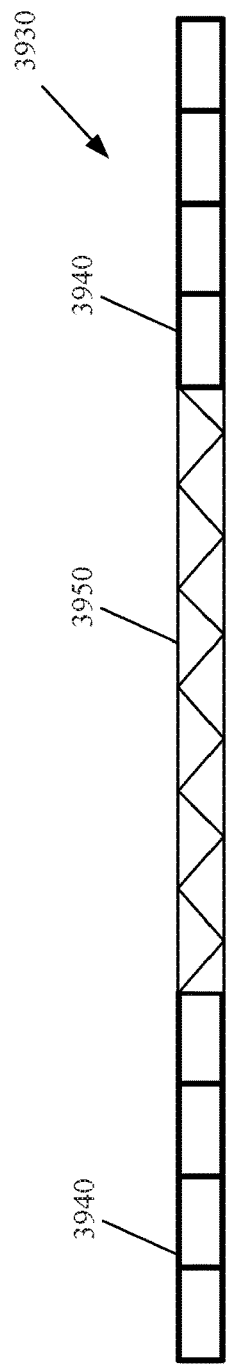
FIG. 39 is a partial cross-sectional view of an upper floor subassembly according to another embodiment.

Referring to FIG. 39, according to yet a still further embodiment, an upper floor structure 3930 includes outboard structures 3940 and inboard structures 3950 that are welded together at adjacent edges. The outboard structures 3940 may, for example, be extrusions that have greater stiffness (e.g., due to geometry or gauge) bending about a vertical axis than the inboard structures 3950. The outboard structures 3940 and/or the inboard structures 3950 may, for example, be extrusions of an aluminum material.

Referring to FIGS. 1, 3, 4, and 40-43, the sill assembly 102 is positioned generally outboard of and is coupled to the lower floor subassembly 218 and the upper floor subassembly to form the inner floor assembly 110. The sill assembly 102 is configured to absorb energy and distribute force to the inner floor assembly 110 arising from an outboard loading event. For example, the sill assembly 102 is configured to plastically deform to absorb energy, and engages the upper floor subassembly 230 and the lower floor subassembly 218 to transfer force thereto. As noted previously, the upper floor subassembly 230 is configured with stiff outboard regions to resist or limit bending or deformation about vertical axes. The lower floor subassembly 218 is, by being a generally continuous plate member, also able to resist or limit bending or deformation about vertical axes. Thus, the sill assembly 102, in conjunction with the upper floor subassembly 230 and the lower floor subassembly 218, helps prevent intrusion into the compartments 223 of the intermediate floor subassembly 220, collapse of the compartments 223, and/or impact with the one or more batteries 224 from an outboard loading event.

The sill assembly 102 may be configured to efficiently absorb energy over a collapsible width (e.g., stroke) thereof in the inboard-outboard direction, while limiting peak observed forces. More particularly, with energy absorbed being equal to the force observed times a duration of a loading event (e.g., the area under a curve of a force vs. time plot), the sill assembly 102 is configured to quickly elevate and maintain the level of forces observed over the duration of the outboard loading event (e.g., reaching a nearly square force vs. time plot), while limiting peak observed forces. To this end, the sill assembly 102 is tuned with compressive strength in the inboard-outboard direction (i.e., inboard or lateral compressive strength) that may vary at different locations moving inboard-outboard, fore-aft, and up/down (i.e., different inboard-outboard locations, different fore-aft locations, and/or different vertical locations), such as by increasing in inboard compressive strength moving outboard, decreasing moving in a fore-aft direction away from a central fore-aft location corresponding to a center of gravity of the vehicle, and/or increasing moving upward. Inboard or lateral compressive strength is the local and/or regional capacity (e.g., of a region, structure, or member of the sill 102) to withstand loading that originates from an outboard location relative to the vehicle 100 or sill assembly 102 and is applied to the sill in an inboard direction that is substantially horizontal and substantially perpendicular to a direction of travel of the vehicle 100. The sill assembly 102 may additionally have bending stiffness about vertical axes that increases moving outboard. Bending stiffness or flexural rigidity about vertical axes is that capacity (e.g., of a region, structure, or member of the sill 102) to resist against bending deformation thereof about a vertical axis, and may also be referred to as horizontal bending stiffness.

The inboard compressive strength and/or bending stiffness of the sill assembly 102 may vary at different inboard-outboard locations, so as to more efficiently absorb and distribute loading over a collapsible width (e.g., stroke) of the sill assembly 102 in the inboard-outboard direction, while minimizing peak observed forces. By having greater bending stiffness about vertical axes moving outboard (e.g., in adjacent inboard/outboard regions that extend in the fore-aft direction, such as a majority (e.g., 50% or more) or substantial majority (e.g., 75% or more) of a fore-aft length of the sill 102), outboard portions of the sill assembly 102 spread and distribute force from outboard loading to inboard portions of the sill assembly 102. By additionally having decreasing inboard compressive strength moving inboard (e.g., in adjacent inboard/outboard locations or in adjacent inboard/outboard regions extending in the fore-aft direction, such as majority (e.g., 50% or more) or substantial majority (e.g., 75% or more) of a fore-aft length of the sill 102), the weaker inboard portions of the sill assembly 102 absorb energy by more fully deforming (e.g., collapsing) earlier in an inboard direction (e.g., compressible width) across a greater fore-aft distance (e.g., length) than the stronger outboard portions, which may reduce peak observed forces.

The compressive strength of the sill assembly 102 may also vary at different fore-aft locations. For example, the sill assembly 102 may be compressively stronger at a fore-aft location corresponding to a center of gravity of the vehicle 100 and compressively weaker forward and/or rearward thereof. Off-center outboard loading results in more energy transfer to kinetic rotation of the vehicle 100 than on-center outboard loading, which lessens the amount of energy to be absorbed by deformation of the sill assembly 102. Thus, the sill assembly 102 may be tuned with less compressive strength at off-center locations to deform more fully over the collapsible width of the sill assembly 102 and, thereby, reduce peak observed forces with off-center outboard loading.

The compressive strength of the sill assembly 102 may also vary at different vertical locations. For example, the sill assembly 102 may be compressively stronger at upper locations than at lower locations to distribute more force from outboard loading to the upper floor subassembly 230 than to the lower floor subassembly 218, which may be less capable of absorbing energy and/or distributing forces from outboard loading than the upper floor subassembly 230.

Referring to FIGS. 40-42B, the sill assembly 102 is divided into an intermediate sill region 4202a (e.g., a first, primary, and/or energy-absorbing region or portion), an inboard sill region 4202b (e.g., a second and/or coupling region or portion), and/or an outboard sill region 4202c (e.g., a third and/or force-spreading region or portion), which extend in a fore-aft direction of the vehicle and include various components as discussed in further detail below.

The intermediate sill region 4202a is configured to deform (e.g., collapse, compress, etc.) in an inboard direction to absorb energy from the outboard loading, as well as engage the inner floor assembly 110 (e.g., the upper floor subassembly 230 and the lower floor subassembly 218) to transfer force from the outboard loading thereto (e.g., around the intermediate floor subassembly 220 and the batteries 224 contained thereby). The intermediate sill region 4202a may be laterally divided into two or more subregions having different compressive strength and/or bending characteristics to absorb energy and/or distribute forces in different manners (e.g., to limit peak observed forces as described above). For example, as shown, the intermediate sill region 4202a may include an outboard subregion 4202a' (e.g., first subregion) and an inboard subregion 4202a" (e.g., second subregion). The outboard subregion 4202a' has greater inboard compressive strength than the inboard subregion 4202a" at proximate (e.g., adjacent) locations and/or elongated regions (e.g., majority or substantial majority of the fore-aft length of the sill 102, as described above) thereof, which allows the inboard subregion 4202a" to deform (e.g., collapse) to absorb energy earlier than the outboard subregion 4202a'. Additionally, the outboard subregion 4202a' may have greater bending stiffness about a vertical axis than the inboard subregion 4202a" (e.g., in adjacent regions extending a majority or substantial majority of the fore-aft length of the sill 102) by which the outboard subregion 4202a' spreads force in a fore-aft direction along and inboard to the inboard subregion 4202a". In other embodiments, the intermediate sill region 4202a may include more laterally divided subregions that also increase in compressive strength and bending stiffness moving in an outboard direction.

The inboard sill region 4202b is arranged inboard of the intermediate sill region 4202a and is configured to couple the sill assembly 102 to the inner floor assembly 110.

The outboard sill region 4202c is arranged outboard of the intermediate sill region 4202a and is configured to distribute localized force from outboard loading across the intermediate sill region 4202a. More particularly, the outboard sill region 4202c includes or is configured to removably receive (e.g., receive various members of movable door structures) members or assemblies that have greater compressive strength and/or have greater bending stiffness about vertical axes, compared to the intermediate sill region 4202a (e.g., in adjacent locations and/or regions extending a majority or substantial majority of the fore-aft length of the sill 102). As such, the outboard sill region 4202c distributes force in a fore-aft direction across the intermediate sill region 4202a, such that the intermediate sill region 4202a absorbs energy by more fully deforming prior to the outboard sill region 4202c.

The intermediate sill region 4202a, the inboard sill region 4202b, and the outboard sill region 4202c are formed by various components and/or structures of the sill assembly 102. The sill assembly 102 includes an outboard load structure 4003 (e.g., first load transfer or energy absorbing structure or member), as well as an upper inboard load structure 4004 (e.g., second load transfer structure or member) and a lower inboard load structure 4005 (e.g., third load transfer structure or member), which form the intermediate sill region 4202a. The sill assembly 102 additionally includes an outer casing 4006 (e.g., outer sill shell or casing) that substantially surrounds the outboard load structure 4003, the upper inboard load structure 4004, and the lower inboard load structure 4005, and which may form the inboard sill region 4202b of the sill assembly 102. The sill assembly 102 may additionally include an outboard partition 4007a (e.g., first partition, divider, planar, or sheet structure or member) and an inboard partition 4008a (e.g., second partition, divider, planar, or sheet structure or member) between the various regions/subregions and structures of the sill assembly 102.

The outboard load structure 4003 is, for example, a stamped aluminum member having a plurality of corrugations 4003a (e.g., outboard corrugations). The corrugations 4003a include upright segments 4003b that extend between upper segments 4003c and lower segments 4003d thereof. The upright segments 4003b, the upper segments 4003c, and the lower segments 4003d may each be planar segments (as shown), which extend substantially perpendicular to a fore-aft direction of the vehicle 100 (e.g., within ten degrees of perpendicular). According to other embodiments, the corrugations 4003a may be configured in other manners, for example, by including curved segments, including a combination of curved and planar segments, and/or extending at different angles relative to the fore-aft direction of the vehicle 100.

Figure 40:
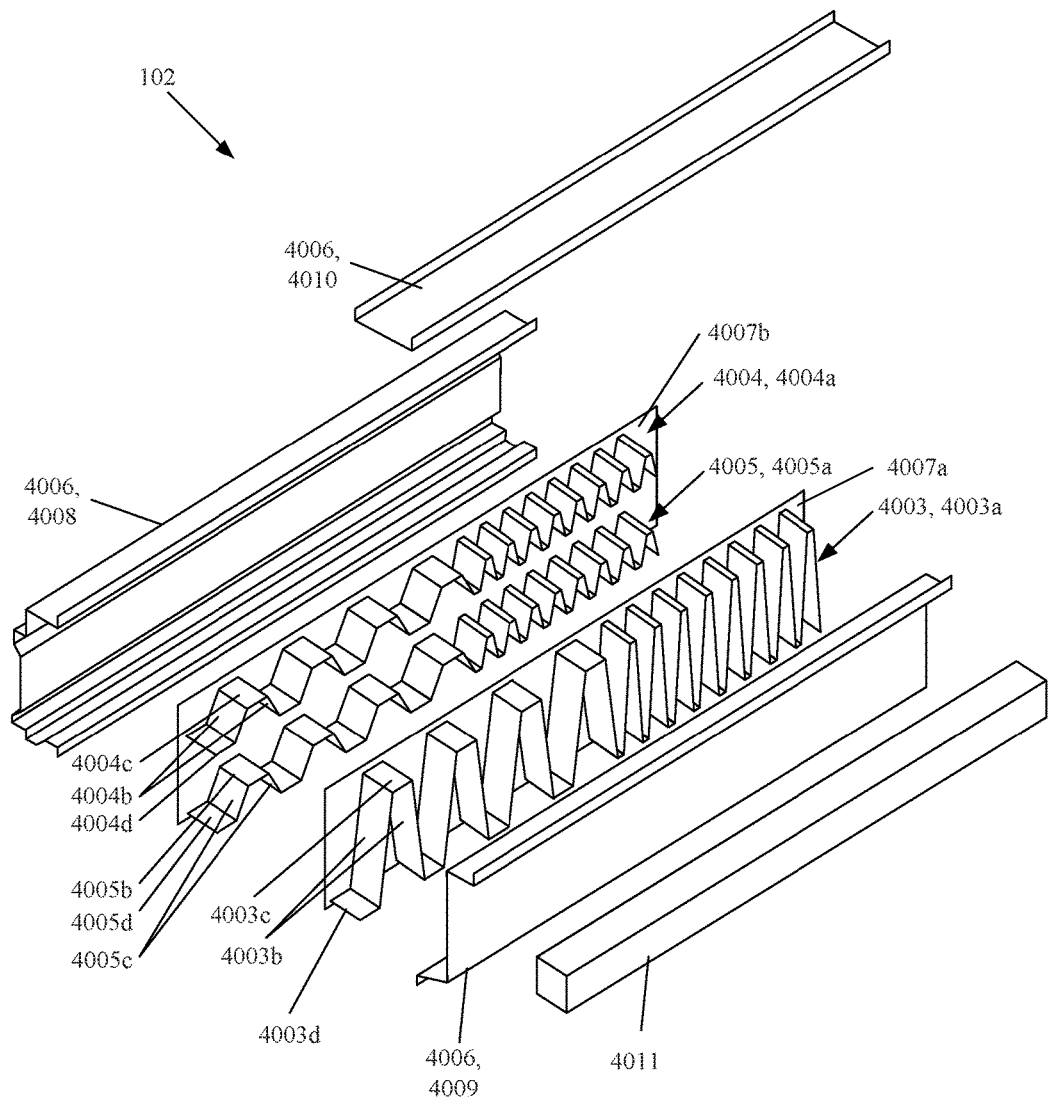
FIG. 40 is an upper, front, left perspective exploded view of a sill assembly according to an embodiment.
Figure 43:
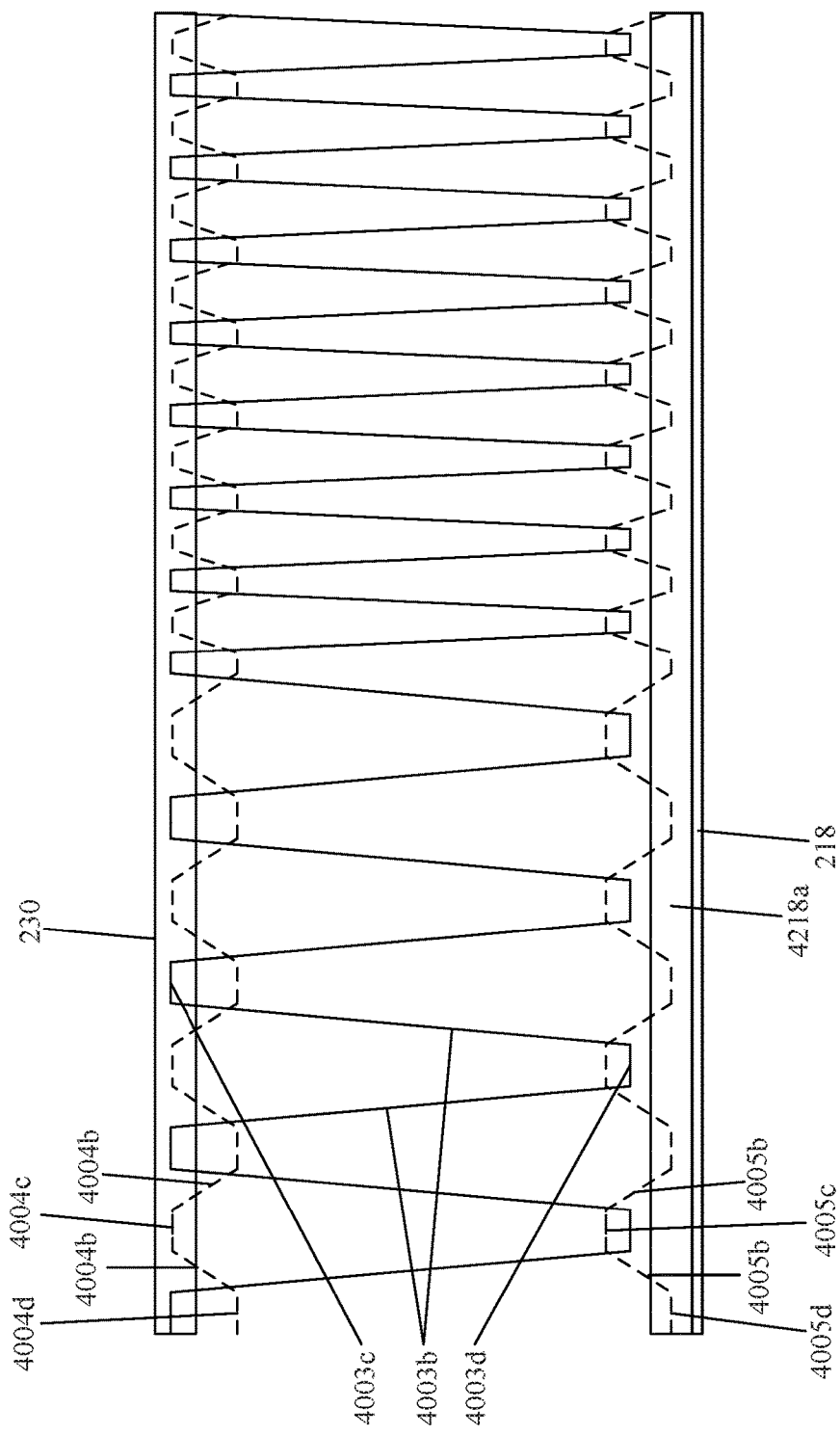
FIG. 43 is a partial side view of the floor assembly shown in FIG. 40, which depicts overlapping and intersection relationships of load structures of the sill assembly.

The outboard load structure 4003 is additionally configured to have varying inboard compressive strength at different fore-aft locations along a length thereof. For example, as shown in FIGS. 40 and 43, the corrugations 4003a have different densities with the upright segments 4003b being positioned closer to each other (e.g., by having upper segments 4003c and/or lower segments 4003d that are shorter in length), which results in different densities of material and resultant inboard compressive strength at various locations of the outboard load structure 4003. For example, as shown in FIG. 41, the corrugations 4003a have two different densities, being less dense with resultantly lesser inboard compressive strength in a forward region (left as shown) and being more dense with resultantly greater inboard compressive strength in a rearward region (right as shown). According to other embodiments, the outboard load structure 4003 may be provided with varying stiffness in other manners, for example, by having different wall thicknesses (e.g., gauges of the segments 4003b, 4003c, 4003d) at different locations and/or by varying in stiffness in a more progressive manner (e.g., having progressively decreasing stiffness or density moving away from the lateral position of the center of gravity of the vehicle 100).

The outboard load structure 4003 may be provided in other forms. For example, the outboard load structure 4003 may instead comprise multiple components (e.g., multiple aluminum stampings), be formed from different manufacturing methods (e.g., extruding, molding, etc.), be formed from different materials (e.g., steel, metallic or non-metallic foams, or plastics, such as PA6, reinforced with carbon or glass), have different shapes (e.g., a honeycomb structure or other structure having a substantially uniform cross-sectional shape, or an egg-crate structure or other structure having a non-uniform cross-sectional shape), etc.

The outboard partition 4007a is coupled to and supports the outboard load structure 4003. The outboard partition 4007a is located between the outboard subregion 4202a' and the inboard subregion 4202a" of the intermediate sill region 4202a of the sill assembly 102. The outboard partition 4007a is a generally planar member (e.g., stamped aluminum) to which is coupled an inboard side or edges of the outboard load structure 4003. For example, the outboard load structure 4003 may be coupled to the outboard partition 4007a via adhesive bonding, spot welding, or any other suitable coupling method. During an outboard loading event, friction between the outboard load structure 4003 and the outboard partition 4007a (e.g., due to compression therebetween) may additionally function to maintain the outboard load structure 4003 in a generally fixed position relative to the outboard partition 4007a. As discussed in further detail below, the outboard partition 4007a additionally functions to locate the outboard load structure 4003 within the sill assembly 102 and the inner floor assembly 110, including relative to the upper inboard load structure 4004 and the lower inboard load structure 4005. The outboard partition 4007a may also function as a bearing (e.g., load distributor) between the outboard load structure 4003 and the upper inboard load structure 4004 and the lower inboard load structure 4005, as well as to couple upper and lower portions of the outer casing 4006 to each other and prevent separation therebetween.

The upper inboard load structure 4004 and the lower inboard load structure 4005 are located in the inboard subregion 4202a" of the intermediate sill region 4202a of the sill assembly 102. The upper inboard load structure 4004 is positioned in an upper subregion 4202d of the sill assembly 102. The upper inboard load structure 4004 is spaced above and forms a vertical gap with the lower inboard load structure 4005, which is in a lower subregion 4202e of the sill assembly 102. The upper inboard load structure 4004 and the lower inboard load structure 4005 are each stamped aluminum members having corrugations 4004a, 4005a, respectively (e.g., inboard corrugations, or upper and lower inboard corrugations, respectively). The corrugations 4004a, 4005a may be configured similar to the corrugations 4003a of the outboard load structure 4003 by having upright segments 4004b, 4005b that extend between upper segments 4004c, 4005c and lower segments 4004d, 4005d, such segments being planar (as shown), extending substantially perpendicular to a fore-aft direction of the vehicle 100, and having varying stiffness along a fore-aft direction (e.g., due to increasing density and/or material thickness). The corrugations 4004a, 4005a, however, extend shorter vertical distances and are less stiff than the corrugations 4003a of the outboard load structure 4003.

Furthermore, the upper inboard load structure 4004 and the lower inboard load structure 4005 may be configured relative to each other to absorb energy and to distribute force from outboard loading to the upper floor subassembly 230 and the lower floor subassembly 218. For example, the upper inboard load structure 4004 (and thereby the upper subregion 4202d) has different (e.g., greater or lesser) inboard compressive strength than the lower inboard load structure 4005 (and thereby the lower subregion 4202e), so as to distribute more force to the upper floor subassembly 230 than the lower floor subassembly 218 or vice versa. For example, the upper inboard load structure 4004 may be configured to transfer between approximately 60% and 75% of inboard loading to the upper floor subassembly 230 and the lower inboard load structure 4005 may be configured to transfer the remaining force (e.g., 25% to 40% of the inboard loading) to the lower floor subassembly 218, or vice versa. The distribution of force between the upper inboard load structure 4004 and the lower inboard load structure 4005 may, for example, be configured according to the height of the inboard loading relative to the upper floor subassembly 230 and the lower floor subassembly 218, and the relative strengths of the upper floor subassembly 230 and the lower floor subassembly 218 (e.g., to prevent buckling thereof), and may be adjusted according to the compressive strengths of the upper inboard load structure 4004 and the lower inboard load structure 4005.

One or more of the upper inboard load structure 4004 and the lower inboard load structure 4005 may be configured in the alternative manners described above for the outboard load structure 4003, including instead comprising multiple components (e.g., multiple aluminum stampings), being formed from different manufacturing methods (e.g., extruding, molding, etc.), being formed from different materials (e.g., steel, metallic or non-metallic foams, or plastics, such as PA6 reinforced with carbon or glass), having different shapes (e.g., a honeycomb structure or other structure having a substantially uniform cross-sectional shape, or an egg-crate structure or other structure having a non-uniform cross-sectional shape), etc. The upper inboard load structure 4004 and the lower inboard load structure 4005 may instead be provided as a unitary structure, for example, by having upper and lower load regions that are interconnected by an intermediate web or other structure.

The inboard partition 4007b is coupled to the upper inboard load structure 4004 and the lower inboard load structure 4005. The inboard partition 4007b is located between the inboard sill region 4202b and the intermediate sill region 4202a. The inboard partition 4007b is configured similar to the outboard partition 4007a as a generally planar member (e.g., stamped aluminum) to which is coupled an inboard side or edges of the upper inboard load structure 4004 and the lower inboard load structure 4005. For example, the upper inboard load structure 4004 and the lower inboard load structure 4005 may be coupled to the inboard partition 4007b via adhesive bonding, spot welding, or any other suitable coupling method. During an outboard loading event, friction of the upper inboard load structure 4004 and the lower inboard load structure 4005 with the inboard partition 4007b (e.g., due to compression therebetween) may additionally function to maintain the upper inboard load structure 4004 and the lower inboard load structure 4005 in generally fixed positions relative to the inboard partition 4007b.

As discussed in further detail below, the inboard partition 4007b may, like the outboard partition 4007a, additionally function to locate the upper inboard load structure 4004 and the lower inboard load structure 4005 within the sill assembly 102 and the inner floor assembly 110, including relative to the upper floor subassembly 230 and the lower floor subassembly 218. The inboard partition 4007b may also function as a bearing (e.g., load distributor) between the upper inboard load structure 4004 and the upper floor subassembly 230, as well as between the lower inboard load structure 4005 and the lower floor subassembly 218. The inboard partition 4007b also couples upper and lower portions of the outer casing 4006 to each other and prevents separation therebetween.

Figure 42A:
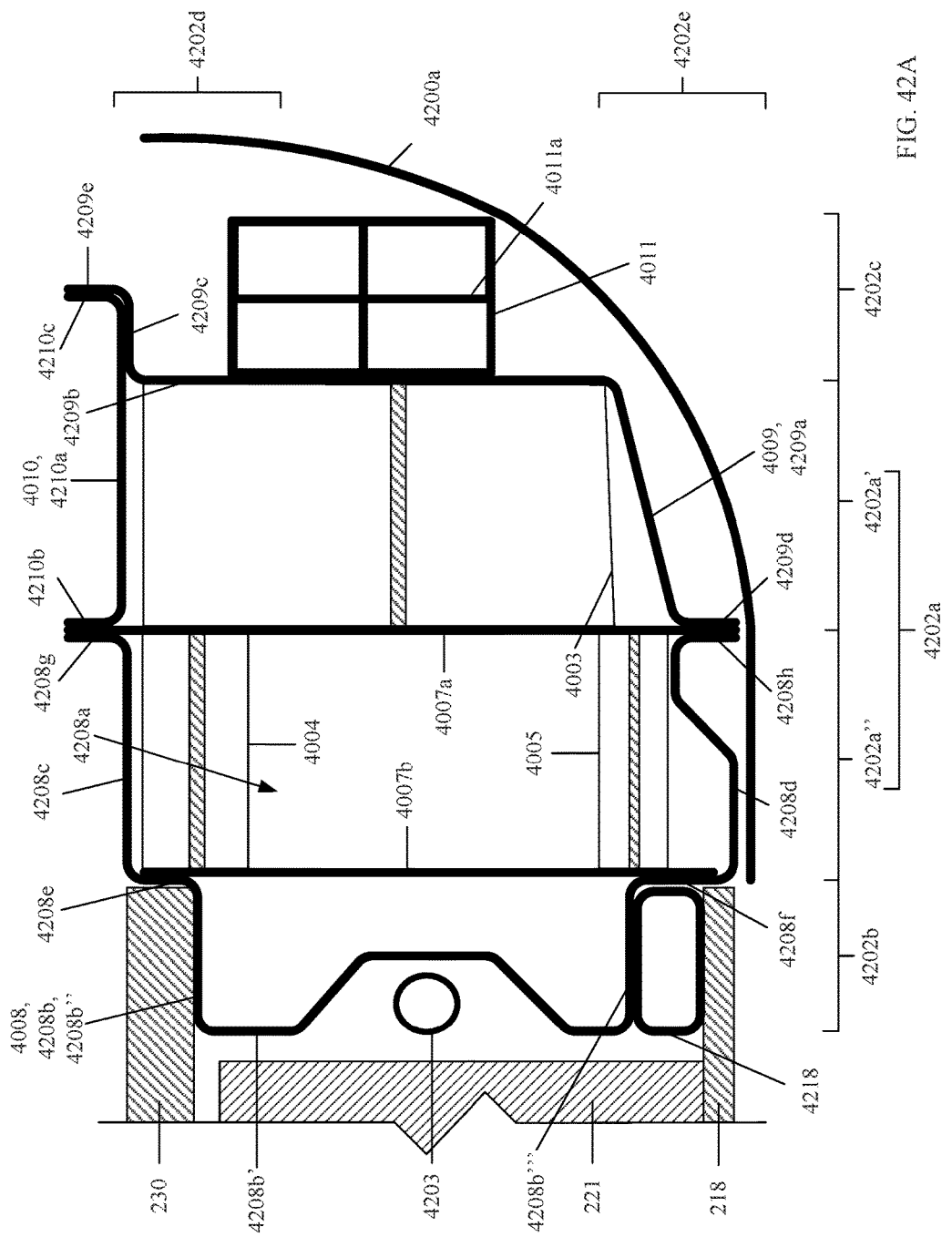
FIG. 42A is a detail cross-sectional view of the floor assembly taken along line 42 in FIG. 4.

The outboard load structure 4003 is configured to transfer force from outboard loading to the upper inboard load structure 4004 and the lower inboard load structure 4005, which in turn transfer force to the upper floor subassembly 230 and the lower floor subassembly 218, respectively. As shown in FIG. 42A, the outboard load structure 4003 is in close lateral proximity (i.e., in an inboard-outboard direction) with the upper inboard load structure 4004 and the lower inboard load structure 4005 (e.g., with the outboard partition 4007a, and a minimal or no gap therebetween), such that outboard loading is nearly immediately transferred to the upper inboard load structure 4004 and the lower inboard load structure 4005. The upper inboard load structure 4004 and the lower inboard load structure 4005 are similarly in close lateral proximity to the upper floor subassembly 230 and the lower floor subassembly 218, respectively, such as with the inboard partition 4007b therebetween and a minimal gap (e.g., to facilitate assembly while accounting for manufacturing variability).

Furthermore, the outboard load structure 4003 is configured to have greater inboard compressive strength and/or bending stiffness about a vertical axis than the upper inboard load structure 4004 and the lower inboard load structure 4005 individually and cooperatively (e.g., at corresponding/adjacent locations and/or elongated regions thereof extending a majority or substantial majority of the fore-aft length of the sill 102), which as described above, spreads outboard loading from the outboard load structure 4003 to the upper inboard load structure 4004 and the lower inboard load structure 4005, which deform more fully first.

Referring to FIGS. 42A-43, the outboard load structure 4003 also vertically overlaps the upper inboard load structure 4004 and the lower inboard load structure 4005 vertically. The corrugations 4003a of the outboard load structure 4003 cross or overlap the corrugations 4004a of the upper inboard load structure 4004 and the corrugations 4005a of the lower inboard load structure 4005. The upper inboard load structure 4004 and the lower inboard load structure 4005 in turn vertically overlap the upper floor subassembly 230 and the lower floor subassembly 218 (or a member 4218a thereof, discussed further below), respectively. These vertically overlapping and crossing relationships allow the force from outboard loading to be transferred in an inboard-outboard direction from the outboard load structure 4003, through the upper inboard load structure 4004 and the lower inboard load structure 4005, to the upper floor subassembly 230 and the lower floor subassembly 218.

More particularly, the outboard load structure 4003 (e.g., the corrugations 4003a thereof) extends upward into the upper subregion 4202d of the sill assembly 102, such that an upper end of the outboard load structure 4003 (e.g., the upper segments 4003c thereof) is at a vertical position above a lower end of the upper inboard load structure 4004 (e.g., formed by the lower segments 4004d and/or portions of the upright segments 4004b of the corrugations 4004a thereof). Portions of the upright segments 4003b of the outboard load structure 4003 may also be at vertical positions above the lower end of the upper inboard load structure 4004. In this manner, the outboard load structure 4003 vertically overlaps the upper inboard load structure 4004. The vertical position of the upper end of the outboard load structure 4003 may also be above (e.g., vertically overlaps) a lower end of the upper floor subassembly 230 (as shown), or may be at a vertical position below the lower end of the upper floor subassembly 230 such that the upper inboard load structure 4004 spans a vertical distance between the upper end of the outboard load structure 4003 and the upper floor subassembly 230.

The upper inboard load structure 4004 also extends upward, such that an upper end thereof (e.g., formed by the upper segments 4004c and/or portions of the upright segments 4004b) is at a vertical position above a lower end of the upper floor subassembly 230 (e.g., the outboard edge 330a thereof). In this manner, the upper inboard load structure 4004 vertically overlaps the upper floor subassembly 230.

The outboard load structure 4003 (e.g., the corrugations 4003a thereof) also extends downward into the lower subregion 4202e of the sill assembly 102, such that a lower end of the outboard load structure 4003 (e.g., the lower segments 4003d thereof) is at a vertical position below an upper end of the lower inboard load structure 4005 (e.g., formed by the upper segments 4005c and/or portions of the upright segments 4005b of the corrugations 4005a thereof). Portions of the upright segments 4003b may also be at vertical positions below the upper end of the lower inboard load structure 4005. In this manner, the outboard load structure 4003 vertically overlaps the lower inboard load structure 4005. The vertical position of the lower end of the outboard load structure 4003 may be above an upper end of the lower floor subassembly 218 (or the member 4218a thereof; as shown) such that the lower inboard load structure 4005 spans a vertical distance between the lower segments 4003d and the lower floor subassembly 218, or may be at a vertical position below the upper end of the lower floor subassembly 218.

The lower inboard load structure 4005 in turn extends downward, such that the lower end thereof (e.g., formed by the lower segments 4004d and/or portions of the upright segments 4004b) is at a vertical position below an upper end of the lower floor subassembly 218. For example, the lower floor subassembly 218 includes one or more of the members 4218a fixedly coupled at an outboard edge thereof, which forms an upright bearing surface that receives thereagainst force from the lower inboard load structure 4005. The members 4218a are elongated (e.g., extruded) to extend in the fore-aft direction. In this manner, the lower inboard load structure 4005 vertically overlaps the lower floor subassembly 218.

Figure 42B:
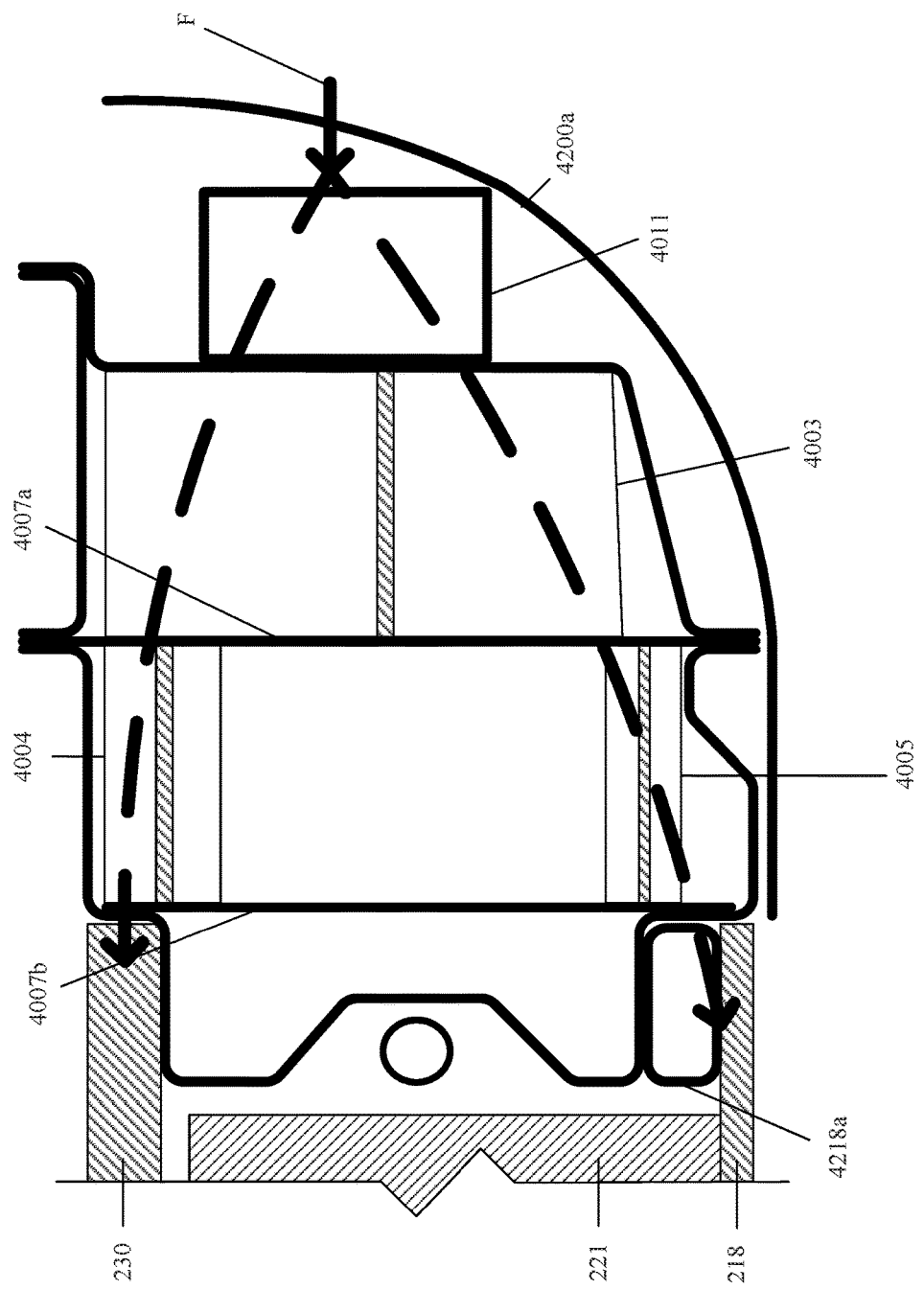
FIG. 42B is the detail view from FIG. 42A illustrating force transfer from outboard loading.
Figure 42C:
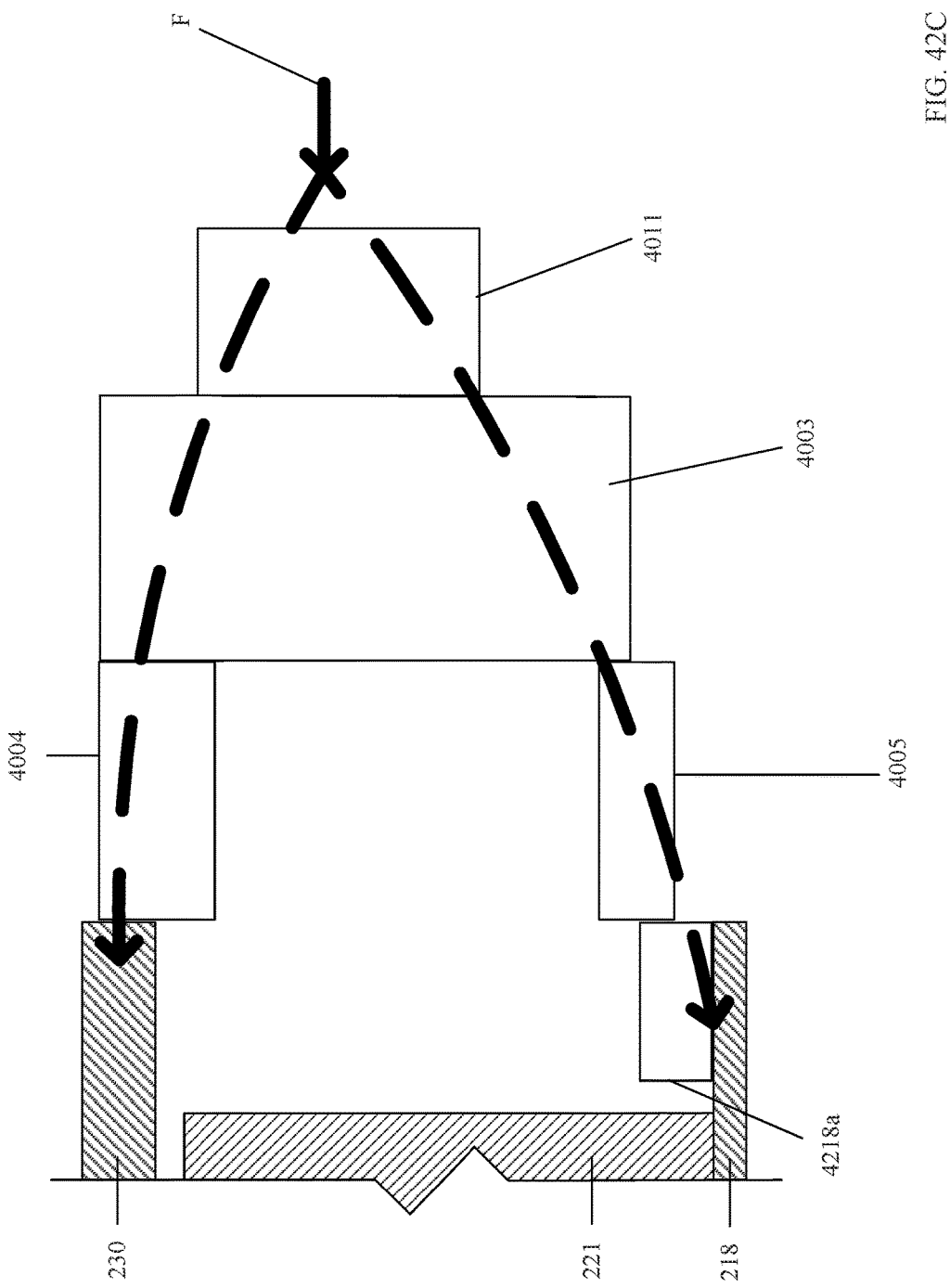
FIG. 42C is a simplified cross-sectional view of FIGS. 42A and 42B illustrating force transfer.
Figure 42D:
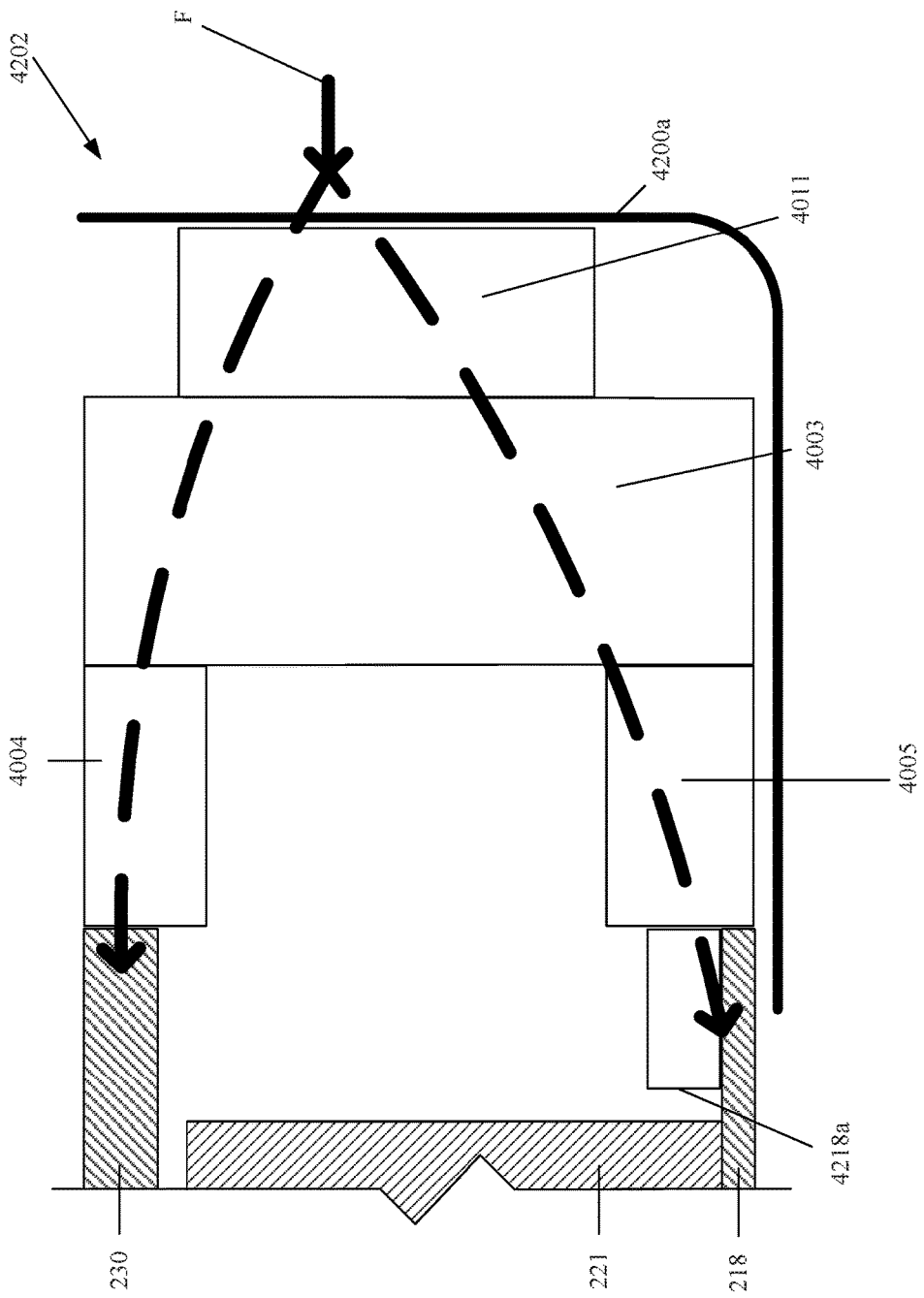
FIG. 42D is a cross-sectional view similar to FIG. 42C, which illustrates the floor assembly with an alternative sill assembly.

Furthermore, the vertical spacing between the upper and lower inboard load structures 4005 allows force to be distributed upward and downward to the upper floor subassembly 230 and the lower floor subassembly 218 around (i.e., above and below) intermediate floor subassembly 220, including the compartments 223 containing the batteries 224. As a result, substantially greater amounts of force are transferred to the upper floor subassembly 230 and the lower floor subassembly 218 than to the intermediate floor subassembly 220. For example, as shown in FIG. 42B, a force F from outboard loading is distributed upward and inboard from the beam structure 4011 (discussed in further detail below), through the outboard load structure 4003, through the upper inboard load structure 4004, and to the upper floor subassembly 230. Similarly, the force F is distributed downward and inboard from the beam structure 4011, through the outboard load structure 4003, through the lower inboard load structure 4005, and to the lower floor subassembly 218. FIG. 42C is a simplified cross-sectional drawing of the sill assembly 102 illustrating force transfer to the upper floor assembly 230 and the lower floor subassembly 218. FIG. 42D depicts an alternative sill assembly 4202 in which the outboard load structure 4003 extends further downward to overlap the lower floor subassembly 218 for more direct load transfer and/or otherwise includes the outer sill structure 4200a with a tighter radius transitioning from below the sill assembly 4202 to upward alongside the sill assembly 4202.

As shown in FIG. 43, the corrugations 4003a of the outboard load structure 4003 cross the corrugations 4004a of the upper inboard load structure 4004 at point locations that are below (e.g., at a lower elevation) than the upper floor subassembly 230. The corrugations 4003a of the outboard load structure 4003 also cross the corrugations 4005a of the lower inboard load structure 4005 at point locations that are above (e.g., at a higher elevation) than the lower floor subassembly 218 (e.g., the member 4218a thereof). The outboard partition 4007a is arranged between the outboard load structure 4003 and the upper inboard load structure 4004, as well as the lower inboard load structure 4005. The outboard partition 4007a functions to locate the outboard load structure 4003 relative to the upper inboard load structure 4004 and the lower inboard load structure 4005 and also functions as a bearing member therebetween. As a bearing member, the outboard partition 4007a distributes force from the corrugations 4003a of the outboard load structure 4003 across broader portions of the corrugations 4004a of the upper inboard load structure 4004 and the corrugations 4005a of the lower inboard load structure 4005 away from the point locations.

The inboard partition 4007b is similarly arranged between the outboard load structure 4003 and the upper inboard load structure 4004 and the lower inboard load structure 4005, functions to locate the upper inboard load structure 4004 and the lower inboard load structure 4005, and functions as a bearing member. In other embodiments, the corrugations 4003a, 4004a, 4005a may directly engage each other, the upper floor subassembly 230, and/or the lower floor subassembly 218, for example, with the outboard partition 4007a and/or the inboard partition 4007b being omitted or discontinuous.

Figure 44:
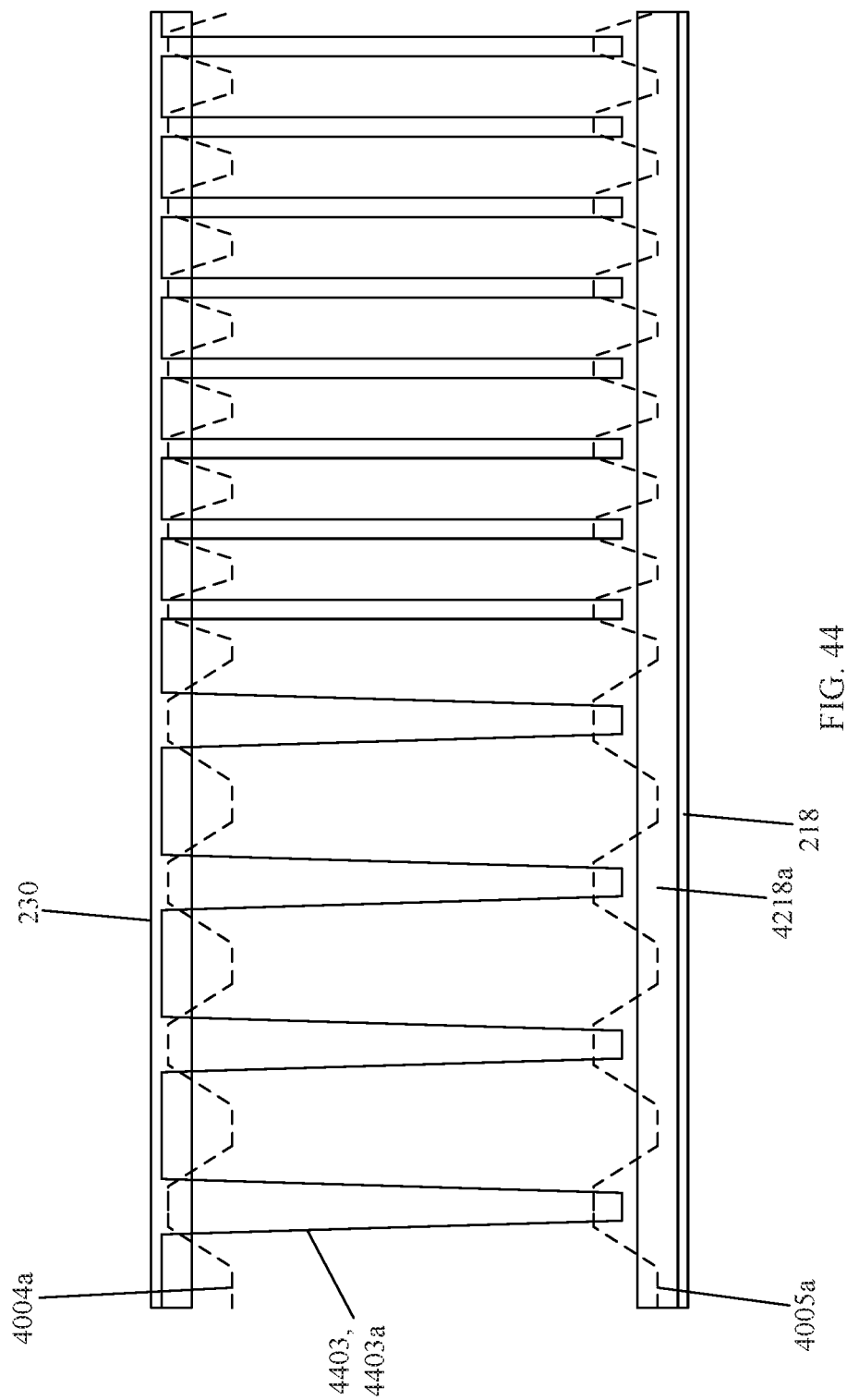
FIG. 44 is a partial side view of the floor assembly shown in FIG. 40, which depicts overlapping and intersection relationships of load structures of another sill assembly.
Figure 45:
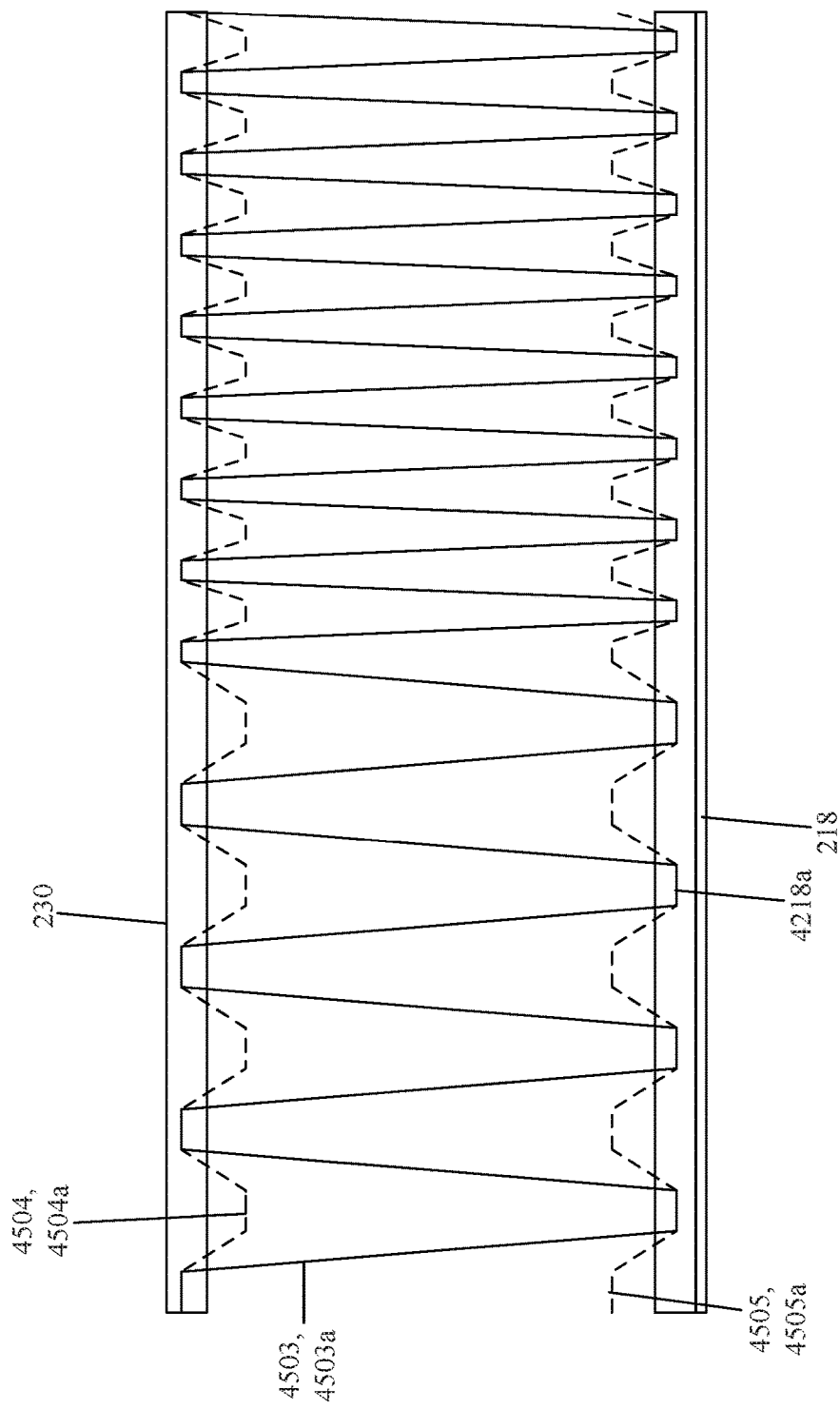
FIG. 45 is a partial side view of the floor assembly shown in FIG. 40, which depicts overlapping and intersection relationships of load structures of another sill assembly.

Alternatively, the corrugations 4003a of the outboard load structure 4003 may be configured relative to the corrugations 4004a of the upper inboard load structure 4004 and the corrugations 4005a of the lower inboard load structure 4005 in other manners. As shown in FIG. 44, corrugations 4403a of an outboard load structure 4403 (e.g., member) intersect or cross the corrugations 4004a of the upper inboard load structure 4004 at point locations at an upper elevation corresponding to the upper floor subassembly 230 and may also extend upward past the upper inboard load structure 4004. The corrugations 4403a may instead or additionally be configured to cross the corrugations 4005a of the lower inboard load structure 4005 at point locations at a lower elevation above the lower floor subassembly 218 (or the member 4218a thereof). Alternatively, the corrugations may extend to a lower elevation below the lower floor subassembly 218 (or the member 4218 thereof) and/or extend downward past the lower inboard load structure 4005 (not shown). In another example shown in FIG. 45, corrugations 4503a of an outboard structure 4503 and corrugations 4504a, 4505a of upper and lower inboard structures 4504, 4505 have substantially coincident patterns, such that the upper and/or lower segments of the corrugations 4503a of the outboard structure 4503 intersect (e.g., cross) the corrugations 4504a, 4505a at line locations (e.g., collinear or otherwise overlapping over straight and/or curved profile of the corrugations 4504a, 4505a), rather than point locations.

In embodiments in which one or more of the outboard load structure 4003, the upper inboard load structure 4004, and/or the lower inboard load structure 4005 are configured in other manners (e.g., honeycomb, molded, or foam structures), the outboard load structure 4003 is configured in a similar, suitable manner to vertically overlap and transfer force to the upper inboard load structure 4004 and the lower inboard load structure 4005. The upper inboard load structure 4004 and the lower inboard load structure 4005 are also configured in a similar, suitable manner to overlap and transfer force to the upper floor subassembly 230 and the lower floor subassembly 218 (or the member 4218a thereof), respectively.

The outer casing 4006, in conjunction with the outboard partition 4007a and the inboard partition 4008a, couple the outboard load structure 4003 to the upper inboard load structure 4004 and the lower inboard load structure 4005, and also maintains substantial alignment therebetween during outboard loading events. The outer casing 4006 may additionally function to couple the sill assembly 102 to the inner floor assembly 110.

Referring again to FIGS. 40-42B, the outer casing 4006 generally includes an inboard casing structure 4008, an outboard casing structure 4009, and an upper casing structure 4010. The inboard casing structure 4008, the outboard casing structure 4009, and the upper casing structure 4010 are continuous members (e.g., stamped aluminum), but may each be made from multiple components, be combined or consolidated into fewer components (e.g., combining the outboard casing structure 4009 and the upper casing structure 4010), be made from other manufacturing methods (e.g., extruding), and/or be made from other materials (e.g., steel, composites, etc.).

The inboard casing structure 4008 defines a recess 4208a in which is received the upper inboard load structure 4004, the lower inboard load structure 4005, and the inboard partition 4007b coupled thereto. More particularly, the inboard casing structure 4008 includes an inboard segment 4208b, and an upper segment 4208c extending in an outboard direction from an upper end of the inboard segment 4208b, and a lower segment 4208d extending in an outboard direction from a lower end of the inboard segment 4208b, which cooperatively define the recess 4208a.

The inboard segment 4208b of the inboard casing structure 4008 forms the inboard sill region 4202b of the sill assembly 102. The inboard segment 4208b protrudes in an inboard direction and is positioned vertically between the upper floor subassembly 230 and the member 4218a of the lower floor subassembly 218 and is coupled thereto. More particularly, the inboard segment 4208b includes an inboard portion 4208b', an upper portion 4208b" extending outboard (e.g., horizontally) from an upper end of the inboard portion 4208b', and a lower portion 4208b'" extending outboard (e.g., horizontally) from a lower end of the inboard portion 4208b'. The upper portion 4208b" extends substantially parallel with and adjacent to the upper floor subassembly 230 (e.g., the lower plate 232 thereof) and is coupled thereto (e.g., with elongated fasteners, adhesives, welding, or other suitable method). The lower portion 4208b'" extends substantially parallel with and adjacent to the member 4218a of the lower floor subassembly 218 and is coupled thereto (e.g., with elongated fasteners, adhesives, welding, or other suitable method). The inboard portion 4208b' forms an upright wall and may protrude outboard, so as to create a void between the peripheral structure 221 of the intermediate floor subassembly 220, through which conduits and/or wiring 4203 (e.g., to carry fluid, electricity, and/or data signals) may extend along the fore-aft direction of the vehicle 100. The sill assembly 102 may be positioned and/or coupled to the inner floor assembly 110 after the wiring 4203 is positioned, such that the wiring 4203 does not require being fished or threaded in the void formed by the inboard portion 4208b' of the inboard segment 4208 of the inboard casing structure 4008.

The inboard casing structure 4008 additionally includes an upper intermediate segment 4208e and a lower intermediate segment 4208f. The upper intermediate segment 4208e extends substantially vertically upward from the inboard segment 4208b (e.g., from the upper portion 4208b" thereof) to the upper segment 4208c. The lower intermediate segment 4208f extends substantially vertically downward from the inboard segment 4208b (e.g., from the lower portion 4208b'" thereof) to the lower segment 4208d. When assembled to the inner floor assembly 110, the upper intermediate segment 4208e and the lower intermediate segment 4208f are positioned adjacent to the upper floor subassembly 230 and the member 4218a of the lower floor subassembly 218, respectively.

The inboard partition 4007b spans the distance between and is coupled to the upper intermediate segment 4208e and the lower intermediate segment 4208f (e.g., via bonding, spot welding, or other suitable method along vertical interfaces therebetween). The inboard partition 4007b, thereby, prevents relative movement (e.g., separation and/or compression) of the upper intermediate segment 4208e and the lower intermediate segment 4208f (e.g., during outboard loading and/or deformation of the upper inboard load structure 4004 and the lower inboard load structure 4005). The inboard partition 4007b, thereby, also aligns the upper inboard load structure 4004 and the lower inboard load structures 4005 to vertically overlap the upper floor subassembly 230 and the member 4218a of the lower floor subassembly 218 in the manner described above.

The upper segment 4208c of the inboard casing structure 4008 extends in an outboard direction (e.g., substantially horizontally) from the upper intermediate segment 4208e. The upper segment 4208c includes an upper flange 4208g extending upward (e.g., vertically) therefrom and at which the inboard casing structure 4008 terminates. The upper flange 4208g is positioned at an outboard location substantially coincident with an outboard edge of the upper inboard load structure 4004 and the lower inboard load structure 4005. The upper flange 4208g may, as shown, extend above the upper floor subassembly 230, or to an elevation equal to or below the upper floor subassembly 230.

The lower segment 4208d of the inboard casing structure 4008 extends in an outboard direction (e.g., in a convoluted manner) from the lower intermediate segment 4208f. The lower segment 4208d includes a lower flange 4208h extending downward (e.g., vertically) therefrom and at which the inboard casing structure 4008 terminates. The lower flange 4208h is positioned at an outboard location substantially coincident with the outboard edges of the upper inboard load structure 4004 and the lower inboard load structure 4005, as well as the upper flange 4208g. The upper flange 4208g may, as shown, extend downward but not below the lower floor subassembly 218 (e.g., due to the convoluted profile of the lower segment 4208d of the inboard casing structure 4008). The convoluted profile of the lower segment 4208d, for example, allows for a sill cover 4200a to have a curved outer profile protruding inboard from an outboard edge of the sill assembly and above the lower floor subassembly 218.

The outboard partition 4007a spans the distance between and is coupled to the upper flange 4208g and the lower flange 4208h of the inboard segment 4208b of the inboard casing structure 4008 (e.g., via bonding, spot welding, or other suitable method along the vertical interfaces therebetween). The outboard partition 4007a, thereby, prevents relative movement (e.g., separation or compression) of the upper flange 4208g and the lower flange 4208h (e.g., during outboard loading and/or deformation of the outboard load structure 4003). The outboard partition 4007a, thereby, also aligns the outboard load structure 4003 with the upper inboard load structure 4004 and the lower inboard load structure 4005 in the manner described above.

The outboard casing structure 4009 extends outboard and upward from the inboard casing structure 4008 around the outboard load structure 4003. The outboard casing structure 4009 includes a lower segment 4209a extending below the outboard load structure 4003 and an outboard segment 4209b extending upward from an outboard end of the outboard load structure 4003. The outboard casing structure 4009 may additionally include an upper segment 4209c extending outboard from an upper end of the outboard segment 4209b. A lower flange 4209d extends downward (e.g., substantially vertically) from an inboard end of the lower segment 4209a. The lower flange 4209d is coupled to a lower end of the outboard partition 4007a and to the lower flange 4208h of the inboard casing structure 4008 (e.g., via bonding, adhesives, spot welding, or other suitable method), such that the outboard partition 4007a is arranged between (e.g., sandwiched) the inboard casing structure 4008 and the outboard casing structure 4009. An upper flange 4209e extends upward from an outboard end of the upper segment 4209c.

The upper casing structure 4010 extends outboard from the inboard casing structure 4008 to the outboard casing structure 4009 above the outboard load structure 4003. The upper casing structure includes a primary segment 4210a extending above the outboard load structure 4003 (e.g., substantially horizontally), and includes an inboard flange 4210b and an outboard flange 4210c extending upward (e.g., substantially vertically) from inboard and outboard ends of the primary segment 4210a. The inboard flange 4210b is coupled to an upper end of the outboard partition 4007a and the upper flange 4208g of the inboard casing structure 4008 (e.g., via bonding, adhesives, spot welding, or other suitable method), such that the outboard partition 4007a is arranged between (e.g., sandwiched) the inboard casing structure 4008 and the upper casing structure 4010. By also being coupled to the lower flange 4208h of the inboard casing structure 4008 and the lower flange 4209d of the outboard casing structure 4009, the outboard partition 4007a, thereby, prevents relative movement (e.g., separation or compression) of the upper casing structure 4010 (e.g., the inboard flange 4210b thereof) and the outboard casing structure 4009 (e.g., the lower flange 4209f thereof) during outboard loading and/or deformation of the various components of the sill assembly 102. The outboard flange 4210c of the upper casing structure 4010 is also coupled to the upper flange 4209g of the outboard casing structure 4009.

The sill assembly 102 additionally includes, or is configured to releasably receive, a beam structure 4011 in the outboard sill region 4202c. The beam structure 4011 is configured to function as a load spreader that distributes forces from outboard loading across the outboard load structure 4003. The beam structure 4011 has greater inboard compressive strength and greater bending stiffness about a vertical axis (e.g., in adjacent locations and/or elongated regions extending a majority or substantial majority of the fore-aft length of the sill 102), such that the beam structure spreads load in a fore-aft direction and inboard to the outboard load structure 4003. The beam structure 4011 thereby spreads load across the outboard load structure 4003, which deforms more fully in an inboard direction (e.g., collapsible width) along the fore-aft direction (e.g., length) earlier than the beam structure 4011. The beam structure 4011 is positioned to vertically overlap the outboard load structure 4003 (e.g., at an elevation at least partially between the upper segments 4003c and the lower segments 4003d of the corrugations 4003a), and is in close proximity thereto (e.g., being in contact with the outboard casing structure 4009).

Figure 46:
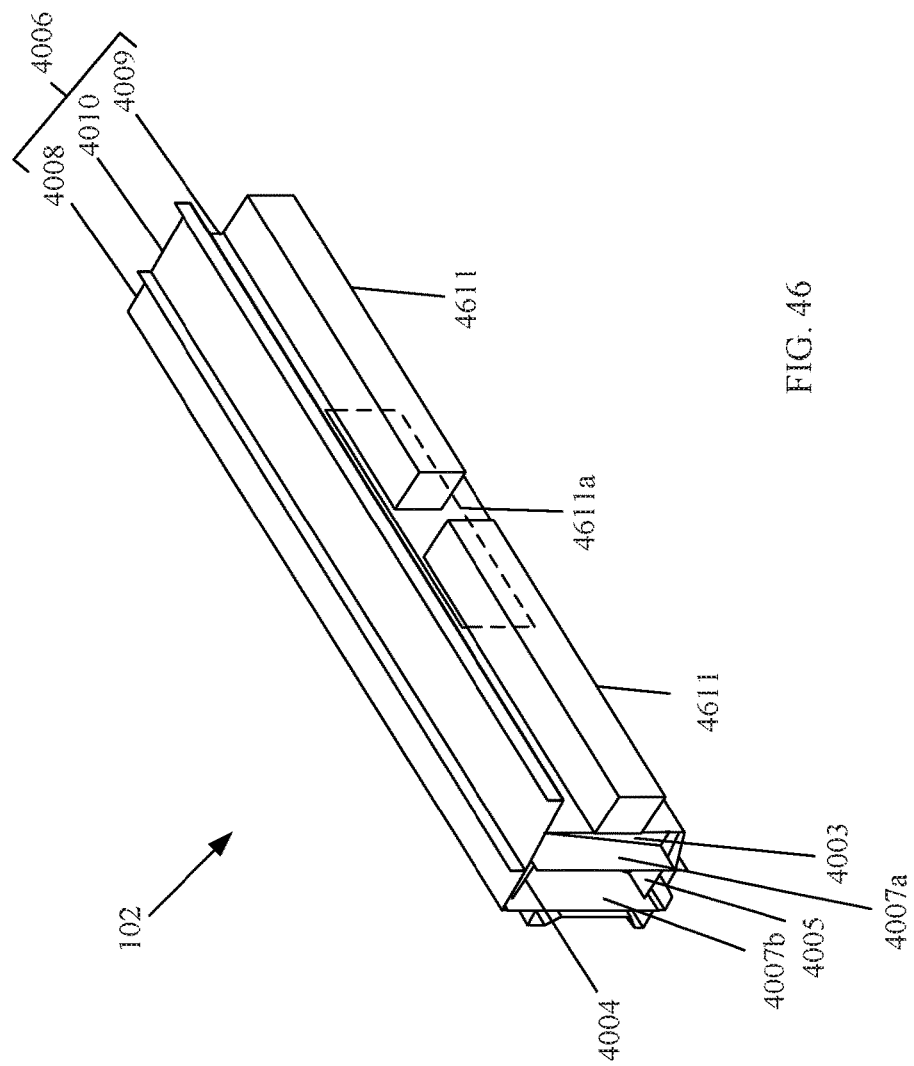
FIG. 46 is an upper, front, left perspective assembled view of a sill assembly according to another embodiment.

The beam structure 4011 may, for example, be an extruded steel member (e.g., boron steel) that extends in a fore-aft direction a substantial majority of a length of the sill assembly 102. The beam structure 4011 may additionally include internal webs 4011a, which stiffen the beam structure 4011. The beam structure 4011 may, however, be configured in other manners, such as comprising multiple components coupled to each other, or being formed from different materials. Furthermore, while the beam structure 4011 is depicted as having a rectangular cross-sectional shape, it may instead have another profile, such as a curved or angled outer profile to account for different contours of the sill cover 4200a. In a still further example, as shown in FIG. 46, the sill assembly 102 may instead include multiple beam members 4611 (e.g., a forward beam member and a rearward beam member) that are included in one or more movable door assemblies (not labeled). The beam members 4611 may, for example, be releasably coupled to another rigid member of the sill assembly 102, such as a latch base 4611a of a cinching latch assembly. This allows for the doors to open and close and also function as a load spreader, in conjunction with the latch base 4611a releasably coupled thereto, to distribute forces from outboard loading across the outboard load structure 4003.

What is claimed is:

1. A floor assembly for a passenger vehicle comprising:
   a lower plate;
   an upper plate;
   a first outboard structure and a second outboard structure positioned vertically between and adhered to the lower plate and the upper plate; and
   a core positioned laterally between the first outboard structure and the second outboard structure, and positioned vertically between and adhered to the lower plate and the upper plate.

2. The floor assembly according to claim 1, wherein the first outboard structure and the second outboard structure are extrusions.

3. The floor assembly according to claim 1, wherein the first outboard structure and the second outboard structure have a thickness and a width, the width is greater than the thickness, and the first outboard structure and the second outboard structure are metal members.

4. The floor assembly according to claim 1, wherein the lower plate and the upper plate each have a thickness that lessens moving in an inboard direction.

5. The floor assembly according to claim 4, wherein the lower plate and the upper plate each are selected from the group consisting of a unitary component, a plurality of plates of varying thicknesses that are edge welded together, and a plurality of plates of varying widths that are stacked on and adhered to each other.

6. The floor assembly according to claim 4, wherein the core has a thickness that increases moving in the inboard direction.

7. The floor assembly according to claim 1, wherein the core is less dense than the first outboard structure and the second outboard structure.

8. The floor assembly according to claim 7, wherein the core comprises multiple components that are coupled to each other.

9. The floor assembly according to claim 8, wherein the multiple components of the core are of different materials.

10. The floor assembly according to claim 1, wherein the first outboard structure and the second outboard structure have a thickness and a width, the width is greater than the thickness, and the first outboard structure and the second outboard structure are metal extrusions;
    wherein the lower plate and the upper plate each have a thickness that lessens moving in an inboard direction;
    wherein the core is less dense than the first outboard structure and the second outboard structure, and the core has a thickness that increases moving in the inboard direction.

11. The floor assembly according to claim 1, further comprising:
    a lower floor assembly;
    wherein the lower plate, the upper plate, the first outboard structure, the second outboard structure, and the core form an upper floor assembly coupled to and positioned above the lower floor assembly; and wherein the lower floor assembly includes one or more compartments for containing one or more batteries.

12. The floor assembly according to claim 11, wherein the first outboard structure and the second outboard structure are positioned at outboard locations opposite each other and are each substantially continuously coupled to both the lower plate and the upper plate, and the upper floor assembly is a sandwich structure composite.

13. The floor assembly according to claim 12, wherein the first outboard structure and the second outboard structure have a thickness and a width, the width is greater than the thickness, and the first outboard structure and the second outboard structure are aluminum extrusions that each have multiple cavities extending in a fore-aft direction.

14. The floor assembly according to claim 13, wherein the lower plate and the upper plate each have a thickness that lessens moving in an inboard direction.

15. The floor assembly according to claim 13, wherein the core has a thickness that increases moving inboard.

16. The floor assembly according to claim 11, wherein the upper floor assembly is coupled to the lower floor assembly to enclose one or more batteries therein.

17. The floor assembly according to claim 16, wherein the upper floor assembly is coupled to the lower floor assembly with elongated fasteners extending vertically through each of the upper floor assembly and the lower floor assembly.

18. The floor assembly according to claim 11, wherein the upper floor assembly has a substantially constant thickness.

* * * * *